United States Patent
Fujie et al.

(10) Patent No.: US 8,845,760 B2
(45) Date of Patent: Sep. 30, 2014

(54) COMPOUND HAVING MULTIMER STRUCTURE OF XANTHENE DERIVATIVE, COLORING COMPOSITION, INK FOR INKJET RECORDING, METHOD OF INKJET RECORDING, COLOR FILTER, AND COLOR TONER

(71) Applicant: FUJIFILM Corporation, Tokyo (JP)

(72) Inventors: Yoshihiko Fujie, Kanagawa (JP); Keiichi Tateishi, Kanagawa (JP); Clive Edwin Foster, Manchester (GB)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/193,046

(22) Filed: Feb. 28, 2014

(65) Prior Publication Data

US 2014/0176653 A1 Jun. 26, 2014

Related U.S. Application Data

(63) Continuation of application No. PCT/JP2012/071852, filed on Aug. 29, 2012.

(30) Foreign Application Priority Data

Aug. 30, 2011 (JP) ................. 2011-188044
Mar. 1, 2012 (JP) ................. 2012-045832

(51) Int. Cl.
  C09B 67/10 (2006.01)
  C09D 11/00 (2014.01)
  C09B 55/00 (2006.01)
  C09D 11/32 (2014.01)

(52) U.S. Cl.
  CPC .............. C09B 55/006 (2013.01); C09D 11/32 (2013.01)
  USPC .............. 8/637.1; 8/576; 8/579; 106/31.13

(58) Field of Classification Search
  USPC .............. 8/637.1, 576, 579; 106/31.13
  See application file for complete search history.

(56) References Cited

U.S. PATENT DOCUMENTS

| | | | |
|---|---|---|---|
| 5,800,996 A | 9/1998 | Lee et al. | |
| 5,863,727 A | 1/1999 | Lee et al. | |
| 5,945,526 A | 8/1999 | Lee et al. | |
| 2003/0095169 A1 | 5/2003 | Ito et al. | |
| 2005/0011410 A1 | 1/2005 | Banning et al. | |
| 2005/0228183 A1 | 10/2005 | Banning et al. | |

FOREIGN PATENT DOCUMENTS

| | | | |
|---|---|---|---|
| EP | 0805190 A2 | 11/1997 | |
| JP | 48-3694 A | 2/1973 | |
| JP | 49-16725 A | 4/1974 | |
| JP | 9-157562 | * 6/1997 | ............ C09D 11/02 |
| JP | 9-157562 A | 6/1997 | |
| JP | 9-255882 A | 9/1997 | |
| JP | 11-227335 A | 8/1999 | |
| JP | 2000-154332 A | 6/2000 | |
| JP | 2003-160749 A | 6/2003 | |
| JP | 2005-15806 A | 1/2005 | |
| JP | 2010-32999 A | 2/2010 | |
| JP | 2010-244027 A | 10/2010 | |

OTHER PUBLICATIONS

STIC Search Report dated May 21, 2014.*
International Search Report dated Dec. 11, 2012 issued in International Application No. PCT/JP2012/071852 (PCT/ISA/210).
Written Opinion dated Dec. 11, 2012 issued in International Application No. PCT/JP2012/071852 (PCT/ISA/237).
Written Opinion dated Dec. 11, 2012 issued by the International Searching Authority in corresponding International Application No. PCT/JP2012/071852 (PCT/ISA/237).

* cited by examiner

Primary Examiner — Eisa Elhilo
(74) Attorney, Agent, or Firm — Sughrue Mion, PLLC

(57) ABSTRACT

There is provided a compound represented by formula (1):

$$(L)_{\overline{m}}\text{—}(D)_n \quad \text{Formula (1)}$$

Formula (2)

[Chemical structure of xanthene derivative with substituents $R^4$ through $R^{24}$, $R^{18}$, $R^{19}$, $R^{20}$, $R^{21}$, $R^{22}$, $R^{23}$, $R^{24}$]

in formula (1), L represents a divalent to tetravalent linking group; D represents a residue obtained by removing 1 to 5 hydrogen atoms from a compound represented by formula (2); m represents an integer of 1 to 10, however, each L may be the same with or different from every other L; n represents an integer of 2 to 10, however, each D may be the same with or different from every other D; and in formula (2), each of $R^4$ to $R^{24}$ independently represents a hydrogen atom or a substituent, provided that formula (2) has at least one or more ionic hydrophilic groups.

10 Claims, No Drawings

COMPOUND HAVING MULTIMER STRUCTURE OF XANTHENE DERIVATIVE, COLORING COMPOSITION, INK FOR INKJET RECORDING, METHOD OF INKJET RECORDING, COLOR FILTER, AND COLOR TONER

CROSS REFERENCE TO RELATED APPLICATION

This is a continuation of International Application No. PCT/JP2012/071852 filed on Aug. 29, 2012, and claims priority from Japanese Patent Application No. 2011-188044 filed on Aug. 30, 2011 and Japanese Patent Application No. 2012-045832 filed on Mar. 1, 2012, the entire disclosures of which are incorporated therein by reference.

TECHNICAL FIELD

The present invention relates to a novel compound having a multimer structure of a xanthene derivative, a coloring composition containing the compound, ink for inkjet recording, a method of inkjet recording, a color filter, and a color toner.

BACKGROUND ART

As is commonly known, an inkjet recording method is a method of performing printing by jetting ink droplets and adhering the droplets to a recording medium, such as paper. This printing method can print an image of high resolution and high quality with an inexpensive apparatus at a high speed and easily, and, in particular in color printing, a technique as an image-forming method capable of substituting for photographs has been developed in recent years.

When a color image is formed by means of an inkjet recording method, at least yellow ink, magenta ink, cyan ink and black ink are generally used. Aqueous inks have been conventionally mainly used as these inkjet inks from the points of the odor and safety such as danger in time of fire fighting. These inks are required to have physical values such as viscosity, surface tension and the like in proper ranges, to be free from nozzle clogging, to be excellent in preservation stability, to be capable of forming a recorded image of high density, and to have properties such as excellent light fastness, water resistance and moisture resistance.

Although most of these performances are satisfied by using aqueous inks comprising water or a mixed liquid of water and a water-soluble organic solvent as the main solvent, tone, brightness, light fastness, water resistance, and moisture resistance are influenced by colorants in many cases, and so various dyes have conventionally been researched.

In particular, in a color recording method using inks of a plurality of colors, uniform characteristics are required of all the inks constituting the color recording. Above all, concerning a magenta dye, there is a problem such that discoloration and tone variation due to ozone and lights (sunlight, a fluorescent lamp, and the like) are conspicuous as compared with other dyes (a cyan dye, a yellow dye). Accordingly, the fact that the ozone resistance and light fastness of magenta ink are inferior to those of other inks results in tone variation of the image as a whole of the printed matter due to discoloration of the magenta ink, and damaging of the quality.

As magenta dyes for inkjet recording, acid dyes which show a good coloring property and have high water solubility, for example, C.I. Acid Reds 52, 249, 289 and the like have been conventionally known. When these dyes are used alone, nozzles are not liable to be clogged since they have high water solubility, but performances such as ozone resistance and light fastness are very low.

Accordingly, patent document 1 discloses a magenta dye ink excellent in light fastness, water resistance, tone, clogging reliability, and the like by using a magenta dye having a triazine side chain of a specific structure.

Also, patent document 2 discloses an inkjet recording liquid of a magenta color containing, as the colorant, a xanthene derivative substituted with an amino group which may have a substituent, and the same patent document describes that the obtained color image is excellent in light fastness and excellent in tone for good color reproducibility.

Patent document 3 discloses a colorant compound of a magenta color having a multimer structure of a xanthene derivative substituted with an amino group which may have a substituent, and the same patent document describes that the compound is excellent in heat stability.

PRIOR ART DOCUMENT

Patent Document

Patent Document 1: JP-A-2003-160749 (the term "JP-A" as used herein refers to an "unexamined published Japanese patent application")
Patent Document 2: JP-A-9-157562
Patent Document 3: JP-A-2005-15806

SUMMARY OF THE INVENTION

Problems that the Invention is to Solve

However, the colorants of patent documents 1 to 3 are required to be further improved in performances for use as inks for inkjet recording (e.g., ozone resistance and light fastness), and there is room for further examination.

An object of the invention is to provide a colorant further improved in image fastness including ozone resistance and light fastness, and further excellent in moisture resistance.

As a result of eager examination based on the above-described circumstances, the present inventors have found that a novel compound having a plurality of specific structures derived from a xanthene structure can further improve performances concerning image fastness such as ozone resistance, light fastness and the like, which is also excellent in moisture resistance. Thus, the invention has been completed.

Means for Solving the Problems

That is, the invention is as follows.

[1] A coloring composition containing a compound represented by formula (1):

[Chem. 1]

$$(L)_{\overline{m}}(D)_n$$  Formula (1)

-continued

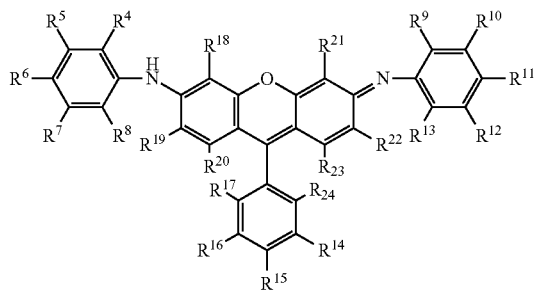
Formula (2)

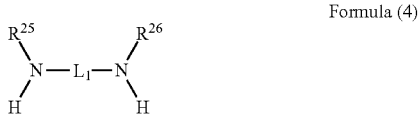
Formula (4)

in formula (1),

L represents a divalent to tetravalent linking group;

D represents a residue obtained by removing 1 to 5 hydrogen atoms from a compound represented by formula (2);

m represents an integer of 1 to 10, provided that each of a plurality of L's may be the same with or different from every other L;

n represents an integer of 2 to 10, provided that each of a plurality of D's may be the same with or different from every other D;

and in formula (2), each of $R^4$ to $R^{24}$ independently represents a hydrogen atom or a substituent, provided that formula (2) has at least one or more ionic hydrophilic groups.

[2] The coloring composition as described in [1], wherein each of $R^4$, $R^8$, $R^9$ and $R^{13}$ in formula (2) independently represents a hydrogen atom or an alkyl group.

[3] The coloring composition as described in [1] or [2], wherein $R^5$ to $R^7$, $R^{10}$ to $R^{12}$, and $R^{14}$ to $R^{23}$ in formula (2) represent a hydrogen atom.

[4] The coloring composition as described in [3], wherein D in formula (1) represents a residue obtained by removing one hydrogen atom from the hydrogen atoms represented by $R^5$ to $R^7$, $R^{10}$ to $R^{12}$, $R^{19}$, $R^{22}$ and $R^{24}$ of the compound represented by formula (2).

[5] The coloring composition as described in [1], wherein the compound represented by formula (1) is a compound synthesized by:

a process of chlorosulfonylating a compound represented by formula (3), a process of reacting the chlorosulfonylated compound with a diamine compound represented by formula (4), and a process of hydrolyzing the residual chlorosulfonyl group:

[Chem. 2]

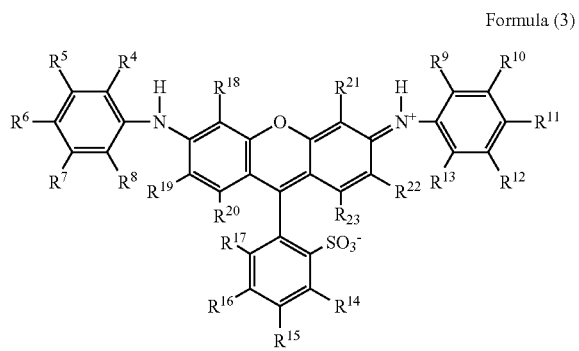
Formula (3)

in formula (3), each of $R^4$ to $R^{23}$ independently represents a hydrogen atom or a substituent; and in formula (4), each or $R^{25}$ and $R^{26}$ independently represents a hydrogen atom or a substituent, and $L_1$ represents a divalent linking group.

[6] An ink for inkjet recording, containing the coloring composition as described in any one of [1] to [5].

[7] An inkjet recording method by using the coloring composition as described in any of [1] to [5] or the ink for inkjet recording as described in [6] to form an image.

[8] A color filter containing the compound represented by formula (1) as described in any one of [1] to [5].

[9] A color toner containing the compound represented by formula (1) as described in any one of [1] to [5].

[10] A compound represented by formula (1):

Formula (1)

Formula (2)

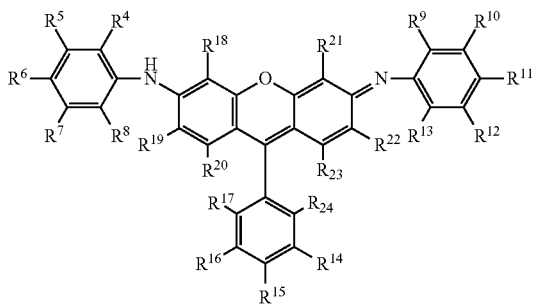

in formula (1),

L represents a divalent to tetravalent linking group;

D represents a residue obtained by removing 1 to 5 hydrogen atoms from a compound represented by formula (2);

m represents an integer of 1 to 10, provided that each of a plurality of L's may be the same with or different from every other L;

n represents an integer of 2 to 10, provided that each of a plurality of D's may be the same with or different from every other D;

and in formula (2), each of $R^4$ to $R^{24}$ independently represents a hydrogen atom or a substituent, provided that formula (2) has at least one or more ionic hydrophilic groups.

Advantage of the Invention

According to the invention, a novel compound having a multimer structure of a specific xanthene derivative which is further improved in performances concerning image fastness such as ozone resistance, light fastness and the like, a coloring composition containing the compound, ink for inkjet recording, and an inkjet recording method are provided. Further, a color filter and a color toner containing the compound are provided.

MODE FOR CARRYING OUT THE INVENTION

The invention will be described in detail below.

In the first place, substituent group A and ionic hydrophilic groups in the invention are defined below.

(Substituent Group A)

The examples of the substituents included in substituent group A include, for example, a halogen atom, an alkyl group, an aralkyl group, an alkenyl group, an alkynyl group, an aryl group, a heterocyclic group, a cyano group, a hydroxyl group, a nitro group, an alkoxy group, an acyloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group, and an ionic hydrophilic group. These substituents may further be substituted, and as further substituents, groups selected from the above-described substituent group A can be exemplified.

In further detail, the examples of the halogen atoms include, for example, a fluorine atom, a chlorine atom, a bromine atom, and an iodine atom.

As the alkyl group, a straight chain, branched, or cyclic, substituted or unsubstituted alkyl group is exemplified, and a cycloalkyl group, a bicycloalkyl group, in which a tricyclic structural alkyl group having more cyclic structures are also included. An alkyl group in the substituent described below (e.g., the alkyl group in an alkoxy group and an alkylthio group) also means the alkyl group of such a concept. In detail, the examples of the alkyl groups preferably include alkyl groups having 1 to 30 carbon atoms, e.g., a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. The examples of the cycloalkyl group preferably include a substituted or unsubstituted cycloalkyl group having 3 to 30 carbon atoms, e.g., a cyclohexyl group, a cyclopentyl group, and a 4-n-dodecylcyclohexyl group. The bicycloalkyl group is preferably a substituted or unsubstituted bicycloalkyl group having 5 to 30 carbon atoms, i.e., a monovalent group obtained by removing one hydrogen atom from bicycloalkane having 5 to 30 carbon atoms, e.g., a bicycle[1,2,2]heptan-2-yl group and a bicycle[2,2,2]octan-3-yl group are exemplified.

As the aralkyl group, a substituted or unsubstituted aralkyl group is exemplified. The substituted or unsubstituted aralkyl group is preferably an aralkyl group having 7 to 30 carbon atoms. The examples thereof include a benzyl group and a 2-phenethyl group.

As the alkenyl group, a straight chain, branched, or cyclic, substituted or unsubstituted alkenyl group is exemplified, in which a cycloalkenyl group and a bicycloalkenyl group are included. In detail, the examples of the alkenyl groups preferably include a substituted or unsubstituted alkenyl groups having 2 to 30 carbon atoms, e.g., a vinyl group, an allyl group, a prenyl group, a geranyl group, and an oleyl group. The cycloalkenyl group is preferably a substituted or unsubstituted cycloalkenyl group having 3 to 30 carbon atoms, i.e., a monovalent group obtained by removing one hydrogen atom from cycloalkene having 3 to 30 carbon atoms, e.g., a 2-cyclopenten-1-yl group and a 2-cyclohexen-1-yl group are exemplified. The bicycloalkenyl group is a substituted or unsubstituted bicycloalkenyl group, preferably a substituted or unsubstituted bicycloalkenyl group having 5 to 30 carbon atoms, i.e., a monovalent group obtained by removing one hydrogen atom from bicycloalkene having one double bond, e.g., a bicycle[2,2,1]hept-2-en-1-yl group and a bicycle[2,2,2]oct-2-en-4-yl group are exemplified.

The alkynyl group is preferably a substituted or unsubstituted alkynyl group having 2 to 30 carbon atoms, e.g., an ethynyl group, a propargyl group, and a trimethylsilylethynyl group are exemplified.

The aryl group is preferably a substituted or unsubstituted aryl group having 6 to 30 carbon atoms, and the examples include a phenyl group, a p-tolyl group, a naphthyl group, an m-chlorophenyl group, and an o-hexadecanoylaminophenyl group.

The heterocyclic group is preferably a monovalent group obtained by removing one hydrogen atom from a 5- or 6-membered, substituted or unsubstituted aromatic or non-aromatic heterocyclic compound, more preferably a 5- or 6-membered aromatic heterocyclic group having 3 to 30 carbon atoms, and the examples include a 2-furyl group, a 2-thienyl group, a 2-pyrimidinyl group, and a 2-benzothiazolyl group.

The alkoxy group is preferably a substituted or unsubstituted alkoxy group having 1 to 30 carbon atoms, and the examples include a methoxy group, an ethoxy group, an isopropoxy group, a t-butoxy group, an n-octyloxy group, and a 2-methoxyethoxy group.

The aryloxy group is preferably a substituted or unsubstituted aryloxy group having 6 to 30 carbon atoms, and the examples include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group having 0 to 20 carbon atoms, and the examples include a trimethylsilyloxy group and a diphenylmethylsilyloxy group.

The heterocyclic oxy group is preferably a substituted or unsubstituted heterocyclic oxy group having 2 to 30 carbon atoms, and the examples include a 1-phenyltetrazol-5-oxy group and a 2-tetrahydropyranyloxy group.

The examples of the acyloxy groups preferably include a formyloxy group, a substituted or unsubstituted alkylcarbonyloxy group having 2 to 30 carbon atoms, and a substituted or unsubstituted arylcarbonyloxy group having 6 to 30 carbon atoms, e.g., an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group having 1 to 30 carbon atoms, and the examples include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group having 2 to 30 carbon atoms, and the examples include a methoxycarbonyloxy group, an ethoxycarbonyloxy group, a t-butoxycarbonyloxy group, and an n-octylcarbonyloxy group.

The aryloxycarbonyloxy group is preferably a substituted or unsubstituted aryloxycarbonyloxy group having 7 to 30 carbon atoms, and the examples include a phenoxycarbonyloxy group, a p-methoxyphenoxycarbonyloxy group, and a p-n-hexadecyloxyphenoxycarbonyloxy group.

The examples of the amino groups include an alkylamino group, an arylamino group and a heterocyclic amino group, preferably an amino group, a substituted or unsubstituted alkylamino group having 1 to 30 carbon atoms, and a substituted or unsubstituted anilino group having 6 to 30 carbon atoms, e.g., a methylamino group, a dimethylamino group, an anilino group, an N-methylanilino group, a diphenylamino group, and a triazinylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms, and the examples include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group having 1 to 30 carbon atoms, and the examples include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group having 2 to 30 carbon atoms, and the examples include a methoxycarbonylamino group, an ethoxycarbonylamino group, a t-butoxycarbonyl-amino group, an n-octadecyloxycarbonylamino group, and an N-methylmethoxy-carbonylamino group.

The aryloxycarbonylamino group is preferably a substituted or unsubstituted aryloxycarbonylamino group having 7 to 30 carbon atoms, and the examples include a phenoxycarbonylamino group, a p-chlorophenoxycarbonylamino group, and an m-n-octyloxyphenoxycarbonylamino group.

The sulfamoylamino group is preferably a substituted or unsubstituted sulfamoylamino group having 0 to 30 carbon atoms, and the examples include a sulfamoylamino group, an N,N-dimethylaminosulfonylamino group, and an N-n-octylaminosulfonylamino group.

The alkyl- or arylsulfonylamino group is preferably a substituted or unsubstituted alkylsulfonylamino group having 1 to 30 carbon atoms, or a substituted or unsubstituted arylsulfonylamino group having 6 to 30 carbon atoms, and the examples include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group having 1 to 30 carbon atoms, and the examples include a methylthio group, an ethylthio group, and an n-hexadecylthio group.

The arylthio group is preferably a substituted or unsubstituted arylthio group having 6 to 30 carbon atoms, and the examples include a phenylthio group, a p-chlorophenylthio group, and an m-methoxyphenylthio group.

The heterocyclic thio group is preferably a substituted or unsubstituted heterocyclic thio group having 2 to 30 carbon atoms, and the examples include a 2-benzothiazolylthio group and a 1-phenyltetrazol-5-ylthio group.

The sulfamoyl group is preferably a substituted or unsubstituted sulfamoyl group having 0 to 30 carbon atoms, and the examples include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N-(N'-phenyl-carbamoyl)sulfamoyl group.

The alkyl- or arylsulfinyl group is preferably a substituted or unsubstituted alkylsulfinyl group having 1 to 30 carbon atoms, or a substituted or unsubstituted arylsulfinyl group having 6 to 30 carbon atoms, and the examples include a methylsulfinyl group, an ethylsulfinyl group, a phenylsulfinyl group, and a p-methylphenylsulfinyl group.

The alkyl- or arylsulfonyl group is preferably a substituted or unsubstituted alkylsulfonyl group having 1 to 30 carbon atoms, or a substituted or unsubstituted arylsulfonyl group having 6 to 30 carbon atoms, and the examples include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms bonded to the carbonyl group via carbon atoms, and the examples include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group having 7 to 30 carbon atoms, and the examples include a phenoxycarbonyl group, an o-chlorophenoxycarbonyl group, an m-nitrophenoxycarbonyl group, and a p-t-butylphenoxycarbonyl group.

The alkoxycarbonyl group is preferably a substituted or unsubstituted alkoxycarbonyl group having 2 to 30 carbon atoms, and the examples include a methoxycarbonyl group, an ethoxycarbonyl group, a t-butoxycarbonyl group, and an n-octadecyloxycarbonyl group.

The carbamoyl group is preferably a substituted or unsubstituted carbamoyl group having 1 to 30 carbon atoms, and the examples include a carbamoyl group, an N-methylcarbamoyl group, an N,N-dimethylcarbamoyl group, an N,N-di-n-octylcarbamoyl group, and an N-(methylsulfonyl)carbamoyl group.

The aryl- or heterocyclic azo group is preferably a substituted or unsubstituted arylazo group having 6 to 30 carbon atoms, or a substituted or unsubstituted heterocyclic azo group having 3 to 30 carbon atoms, and the examples include phenylazo, p-chlorophenylazo, and 5-ethylthio-1,3,4-thiadiazol-2ylazo.

The examples of the imide groups preferably include an N-succinimide group and an N-phthalimide group.

The phosphino group is preferably a substituted or unsubstituted phosphino group having 0 to 30 carbon atoms, and the examples include a dimethylphosphino group, a diphenylphosphino group, and a methylphenoxyphosphino group.

The phosphinyl group is preferably a substituted or unsubstituted phosphinyl group having 0 to 30 carbon atoms, and the examples include a phosphinyl group, a dioctyloxyphosphinyl group, and a diethoxyphosphinyl group.

The phosphinyloxy group is preferably a substituted or unsubstituted phosphinyloxy group having 0 to 30 carbon atoms, and the examples include a diphenoxyphosphinyloxy group and a dioctyloxyphosphinyloxy group.

The phosphinylamino group is preferably a substituted or unsubstituted phosphinylamino group having 0 to 30 carbon atoms, and the examples include a dimethoxyphosphinylamino group and a dimethylaminophosphinylamino group.

The silyl group is preferably a substituted or unsubstituted silyl group having 0 to 30 carbon atoms, and the examples include a trimethylsilyl group, a t-butyldimethylsilyl group, and a phenyldimethylsilyl group.

(Ionic Hydrophilic Group)

The examples of the ionic hydrophilic groups include a sulfo group, a carboxyl group, a thiocarboxyl group, a sulfino group, a phosphono group, a dihydroxyphosphino group, a quaternary ammonium group, and the like, and especially preferably a sulfo group and a carboxyl group. The carboxyl group, the phosphono group and the sulfo group may be in the form of a salt, and the examples of the counter cations to form a salt include an ammonium ion, an alkali metal ion (e.g., a lithium ion, a sodium ion, a potassium ion), and an organic cation (e.g., a tetramethylammonium ion, a tetramethylguanidium ion, tetramethylphosphonium), preferably a lithium salt, a sodium salt, a potassium salt, and an ammonium salt, more preferably a lithium salt and a mixed salt containing a lithium salt as the main component, and most preferably a lithium salt.

Incidentally, when the compound is a salt in the invention, the salt is dissociated in the ink and is present as ion, but it is expressed as "containing a salt" for convenience' sake.

The coloring composition according to the invention contains a compound represented by the following formula (1). The compound represented by formula (1) is a novel compound having a plurality of specific structures derived from a xanthene structure.

The compound represented by formula (1) of the invention is described in detail below.

[Compound Represented by Formula (1)]

The compound represented by formula (1) of the invention includes the compound, the salts thereof, and the hydrates thereof.

Since a plurality of specific xanthene derivative structures are contained in the compound of the invention, although the functional mechanism is unclear, the compound is excellent in image fastness such as ozone resistance and light fastness. Further, by multimerization via linking group L, the molecular weight is increased and molecular migration is restrained under a high humidity condition, and the compound is also excellent in moisture resistance.

[Chem. 4]

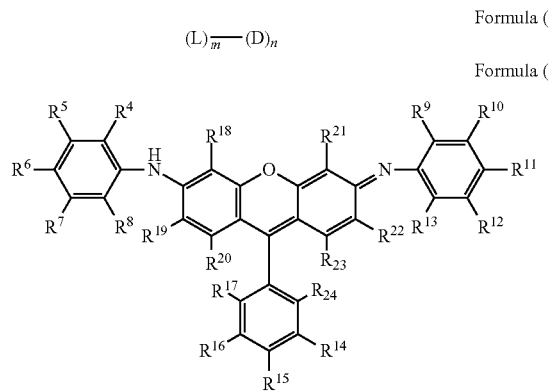

Formula (1)

Formula (2)

In formula (1), L represents a divalent to tetravalent linking group.

D represents a residue obtained by removing 1 to 5 hydrogen atoms from a compound represented by formula (2).

m represents an integer of 1 to 10, provided that each of a plurality of L's may be the same with or different from every other L.

n represents an integer of 2 to 10, provided that each of a plurality of D's may be the same with or different from every other D.

In formula (2), each of $R^4$ to $R^{24}$ independently represents a hydrogen atom or a substituent, provided that formula (2) has at least one or more ionic hydrophilic groups.

m represents an integer of 1 to 10, preferably an integer of 1 to 8, more preferably an integer of 1 to 6, still more preferably an integer of 1 to 4, and especially preferably an integer of 1 to 3. By bringing m into these ranges, it is possible to improve moisture resistance while maintaining the solubility and suppressing the head clogging in inkjet printing.

n represents an integer of 2 to 10, preferably an integer of 2 to 8, more preferably an integer of 2 to 6, and still more preferably an integer of 2 to 4. By bringing n into these ranges, it is possible to improve moisture resistance while maintaining the solubility and suppressing the head clogging in inkjet printing.

In formula (1), L represents a divalent to tetravalent linking group. The examples of the divalent to tetravalent linking groups include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, a heteroarylene group, an ethylene-1,2-diyl group (—CH=CH—), and a group formed by combining these groups, and more preferably a group containing a sulfonyl group (—SO$_2$—), an imino group (—NH—), a methylene group (—CH$_2$—), an ethylene-1,2-diyl group (—CH=CH—), an arylene group, or a heteroarylene group.

L more preferably represents a divalent linking group.

L may have a substituent, and as the examples of the substituents in the case of having a substituent, the above substituent group A can be exemplified, preferably an alkyl group, an aryl group, a heterocyclic group, an alkylamino group, an arylamino group, or an ionic hydrophilic group, and more preferably an arylamino group or an ionic hydrophilic group. These groups may further be substituted with a substituent selected from substituent group A, and more preferably substituted with an ionic hydrophilic group.

L is preferably a linking group represented by the following formula (V1), (V2), (V3) or (V4).

[Chem. 5]

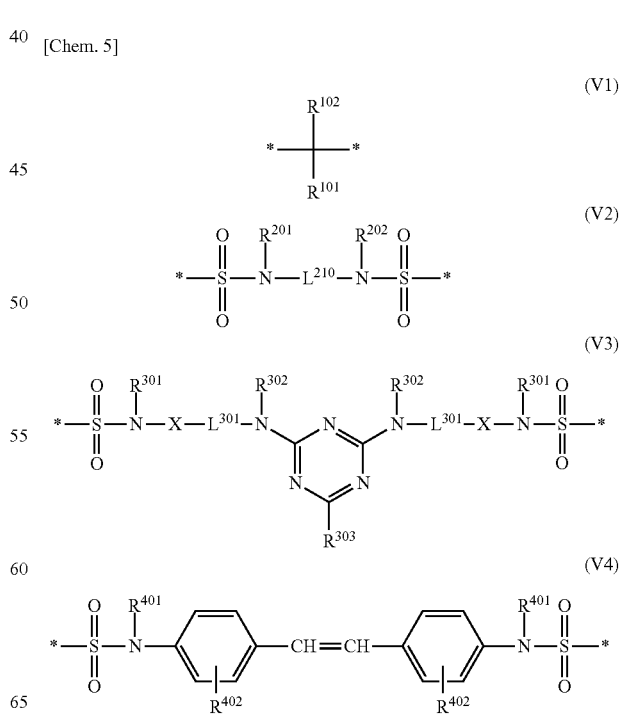

In formula (V1), each of $R^{101}$ and $R^{102}$ independently represents a hydrogen atom or a substituent.

In formula (V2), each of $R^{201}$ and $R^{202}$ independently represents a hydrogen atom or a substituent; and $L^{201}$ represents a divalent linking group.

In formula (V3), each of $R^{301}$, $R^{302}$ and $R^{303}$ independently represents a hydrogen atom or a substituent; X represents an alkylene group having 2 to 20 carbon atoms which may have a substituent; and $L^{301}$ represents a single bond or a divalent linking group.

In formula (V4), each of $R^{401}$ and $R^{402}$ independently represents a hydrogen atom or a substituent.

In formula (V1), each of $R^{101}$ and $R^{102}$ independently represents a hydrogen atom or a substituent, preferably represents a hydrogen atom or substituent group A, more preferably a hydrogen atom, an alkyl group or an aryl group, and especially preferably a hydrogen atom or an alkyl group. $R^{101}$ and $R^{102}$ may be bonded to each other to form a ring.

In formula (V2), each of $R^{201}$ and $R^{202}$ independently represents a hydrogen atom or a substituent.

$L^{201}$ represents a divalent linking group, preferably represents a hydrogen atom or substituent group A, more preferably a hydrogen atom, an alkyl group or an aryl group, and especially preferably a hydrogen atom or an alkyl group. $R^{201}$ and $R^{202}$ may be bonded to each other to form a ring.

$L^{201}$ represents a divalent linking group. The examples of the divalent linking groups include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, and a group formed by combining these groups, preferably an alkylene group having 1 to 20 carbon atoms, a cyclohexylene group, a phenylene group, or a xylylene group, more preferably an alkylene group having 1 to 16 carbon atoms, a cyclohexylene group, a phenylene group, or a xylylene group, and especially preferably an alkylene group having 1 to 8 carbon atoms, a cyclohexylene group, an m-phenylene group, or a xylylene group In formula (V3), each of $R^{301}$ and $R^{302}$ independently represents a hydrogen atom or a substituent, preferably represents a hydrogen atom or substituent group A, more preferably a hydrogen atom, an alkyl group, an aryl group, a heterocyclic group, an alkylamino group, or an arylamino group, and still more preferably a hydrogen atom or an alkyl group. $R^{301}$ and $R^{302}$ may be bonded to each other to form a ring.

$R^{303}$ represents a hydrogen atom or a substituent, preferably a hydrogen atom or substituent group A, and more preferably an amino group, a mono- or dialkylamino group, an arylamino group, or an alkylthio group. These groups may further be substituted with a substituent selected from substituent group A, and more preferably substituted with an ionic hydrophilic group.

X represents an alkylene group having 2 to 20 carbon atoms which may have a substituent, or an arylene group having 6 to 10 carbon atoms which may have a substituent. The alkylene group having 2 to 20 carbon atoms is preferred in view of easiness of synthesis.

Of the alkylene groups having 2 to 20 carbon atoms, an ethylene group and an n-propylene group are more preferred, and an ethylene group is still more preferred. As the substituent at the time when having a substituent, a methyl group is exemplified.

$L^{301}$ represents a single bond or a divalent linking group. The examples of the divalent linking groups include an oxy group (—O—), a thio group (—S—), a carbonyl group (—CO—), a sulfonyl group (—SO$_2$—), an imino group (—NH—), a methylene group (—CH$_2$—), an arylene group, a cycloalkylene group, and a group formed by combining these groups, preferably a phenylene group, a cyclohexylene group, or a methylene group, and more preferably $L^{301}$ represents a single bond.

In formula (V4), each of $R^{401}$ independently represents a hydrogen atom or a substituent, preferably a hydrogen atom or substituent group A, more preferably a hydrogen atom or an alkyl group having 1 to 6 carbon atoms, and especially preferably a hydrogen atom.

Each of $R^{402}$ independently represents a hydrogen atom or a substituent, preferably a hydrogen atom or substituent group A, more preferably an ionic hydrophilic group, and especially preferably a sulfo group.

The specific examples of L in formula (1) are shown below, but the invention is not restricted to these specific examples.

[Chem. 6]

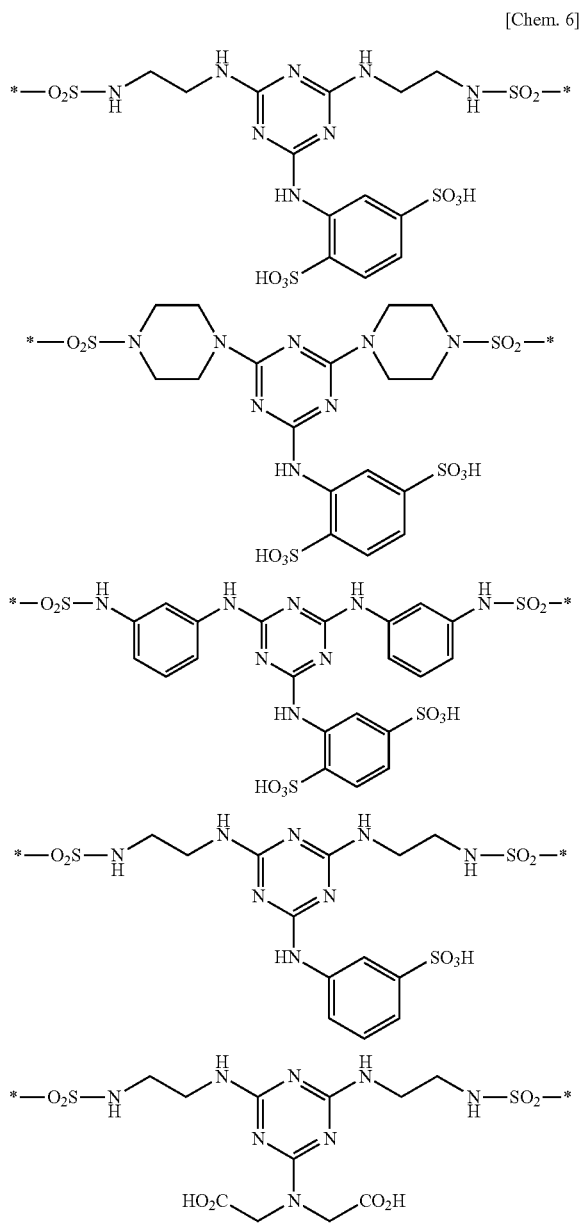

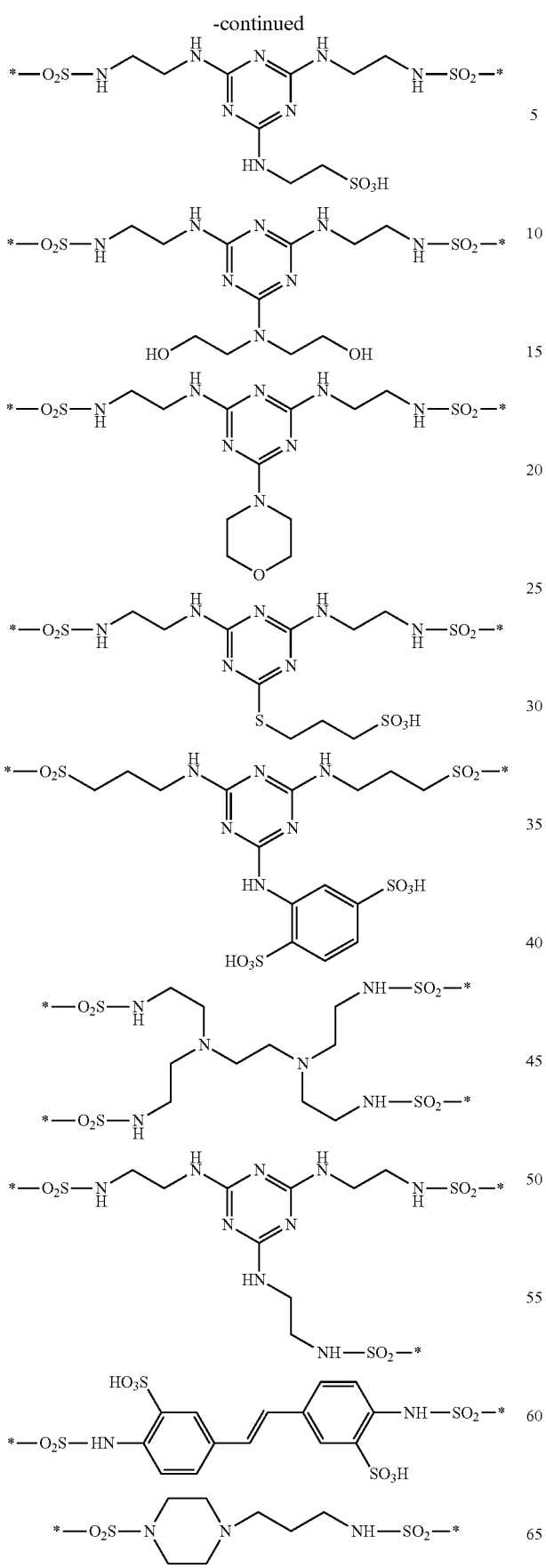
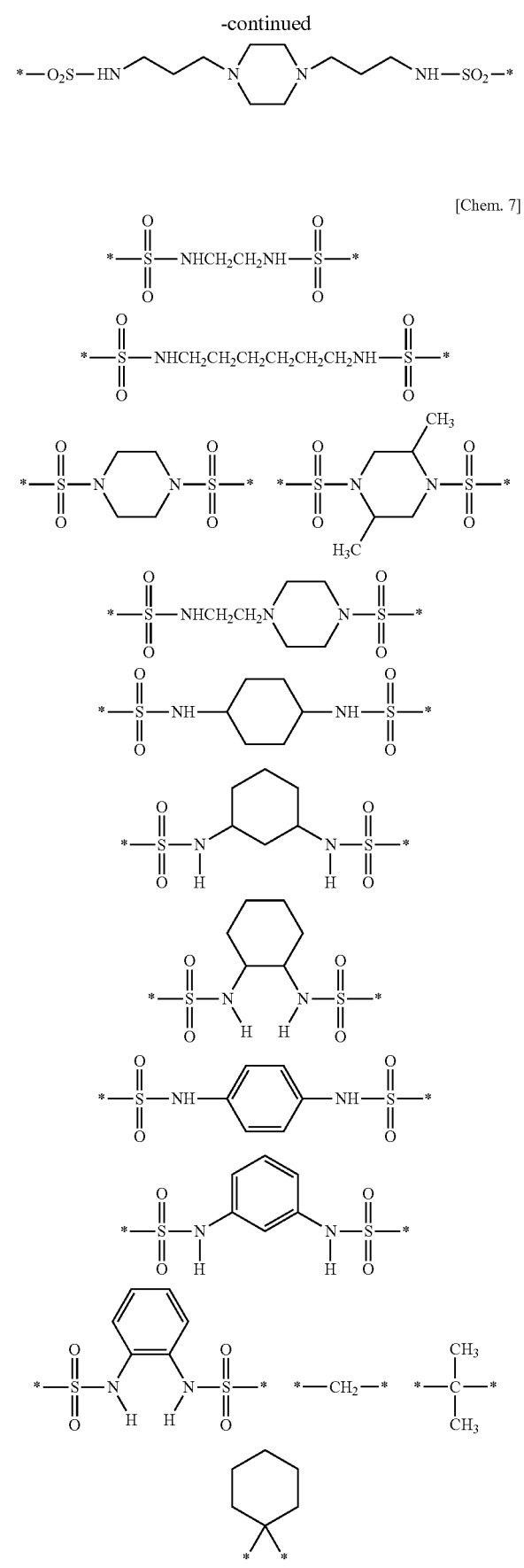

-continued

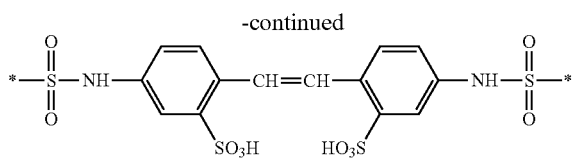

D in formula (1) represents a residue obtained by removing 1 to 5 hydrogen atoms from the compound represented by formula (2).

In formula (2), each of $R^4$ to $R^{24}$ independently represents a hydrogen atom or a substituent. The examples of the substituents include the above substituent group A.

In formula (2), each of $R^4$, $R^8$, $R^9$ and $R^{13}$ independently preferably represents a hydrogen atom or an alkyl group. The alkyl group may be substituted or unsubstituted, preferably an alkyl group having total carbon atom number of 1 to 20, more preferably an alkyl group having total carbon atom number of 1 to 20, and more preferably an alkyl group having total carbon atom number of 1 to 10, e.g., a methyl group, an ethyl group, an ethynyl group, an isopropanyl group, a 2-ethylhexyl group are exemplified. It is preferred for each of $R^4$, $R^8$, $R^9$ and $R^{13}$ to independently represent an alkyl group in view of the hue.

In formula (2), each of $R^5$ to $R^7$, $R^{10}$ to $R^{12}$, and $R^{14}$ to $R^{23}$ preferably represents a hydrogen atom for easiness of synthesis. $R^{24}$ preferably represents a hydrogen atom or an ionic hydrophilic group, and more preferably a sulfo group.

In formula (1), D preferably represents a residue obtained by removing 1 to 5 hydrogen atoms from the hydrogen atoms represented by $R^5$ to $R^7$, $R^{10}$ to $R^{12}$, $R^{19}$, $R^{22}$ or $R^{24}$ of the compound represented by formula (2) for easiness of synthesis.

It is preferred from availability of the materials and inexpensive manufacture that the compound represented by formula (1) is a compound synthesized by a synthesizing method including:
  a process of chlorosulfonylating a compound represented by formula (3),
  a process of reacting the chlorosulfonylated compound with a diamine compound represented by formula (4), and
  a process of hydrolyzing the residual chlorosulfonyl group.

[Chem. 8]

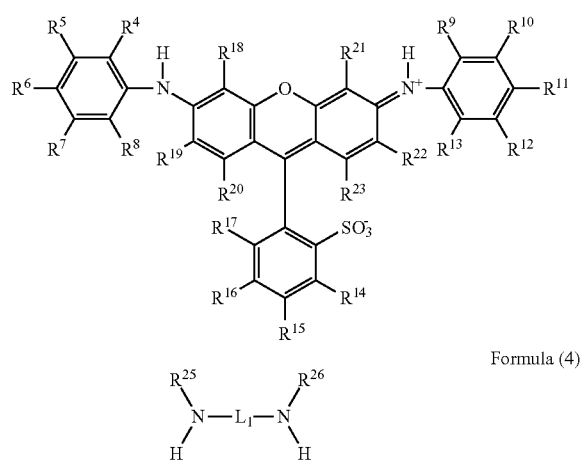

Formula (3)

Formula (4)

In formula (3), each of $R^4$ to $R^{23}$ independently represents a hydrogen atom or a substituent.

In formula (4), each or $R^{25}$ and $R^{26}$ independently represents a hydrogen atom or a substituent, and $L_1$ represents a divalent linking group.

In formula (3), $R^4$ to $R^{23}$ have the same meaning with $R^4$ to $R^{23}$ in formula (2), respectively, and the preferred examples are also the same.

In formula (4), each or $R^{25}$ and $R^{26}$ independently preferably represents a hydrogen atom, a substituted or unsubstituted alkyl group having 1 to 6 carbon atoms, or a substituted or unsubstituted aryl group having 6 to 10 carbon atoms, more preferably a hydrogen atom, or a substituted or unsubstituted alkyl group having 1 to 6 carbon atoms, and especially preferably a hydrogen atom.

$L_1$ preferably represents a substituted or unsubstituted alkylene group having 1 to 20 carbon atoms, a substituted or unsubstituted cyclohexylene group, a substituted or unsubstituted phenylene group, a substituted or unsubstituted xylylene group, or a substituted or unsubstituted stilbene-4,4'-diyl group, more preferably a substituted or unsubstituted alkylene group having 1 to 10 carbon atoms, a substituted or unsubstituted cyclohexylene group, a substituted or unsubstituted phenylene group, a substituted or unsubstituted xylylene group, or a substituted or unsubstituted stilbene-4,4'-diyl group, and especially preferably a stilbene-4,4'-diyl group in which the sulfo group is substituted.

The specific examples of the compound represented by formula (3) are shown below, but the invention is not restricted to these specific examples.

[Chem. 9]

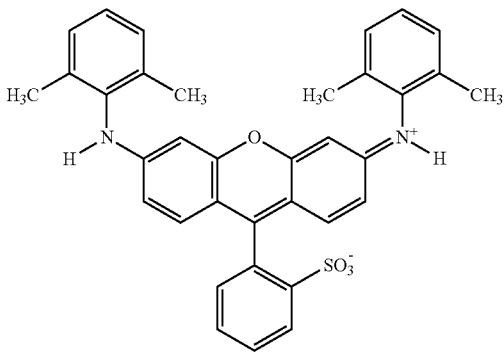

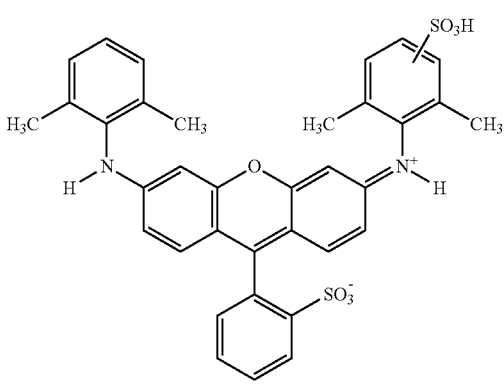

-continued
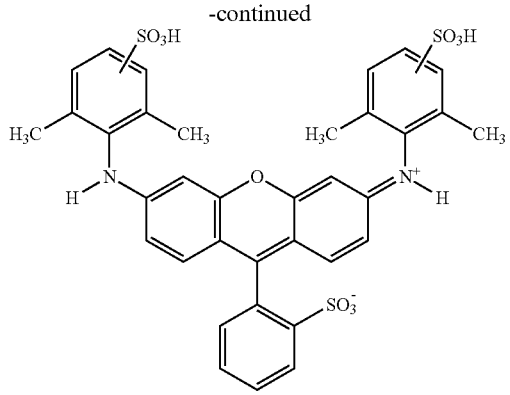
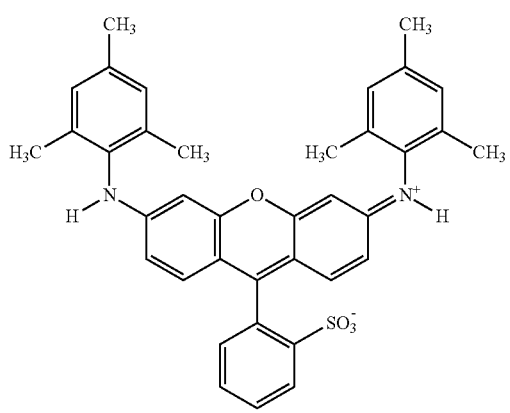
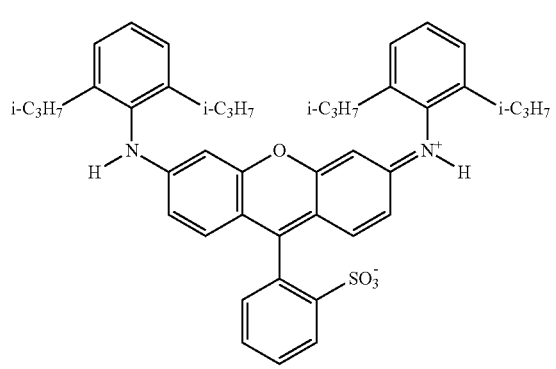
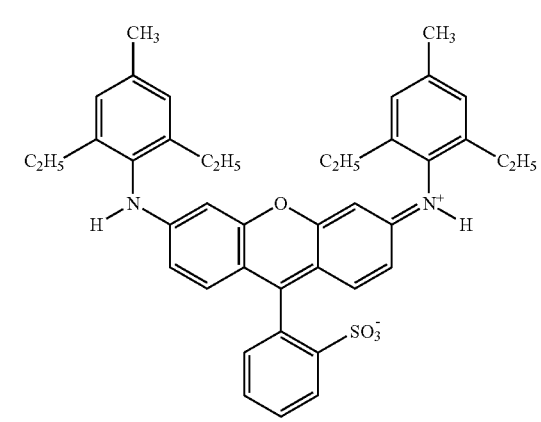
-continued
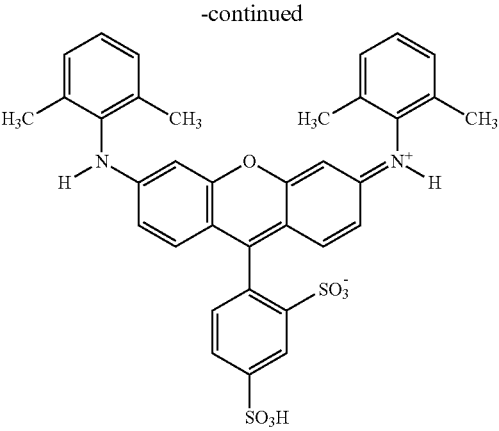
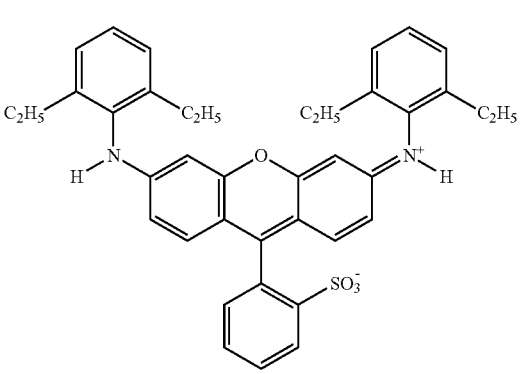
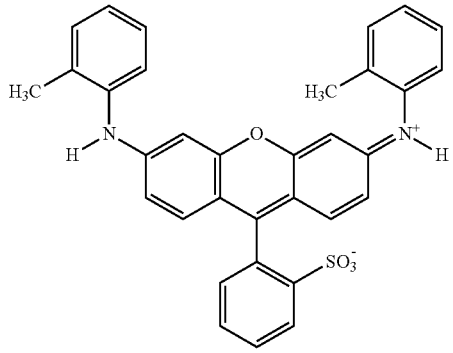
The specific examples of the compound represented by formula (4) are shown below, but the invention is not restricted to these specific examples.

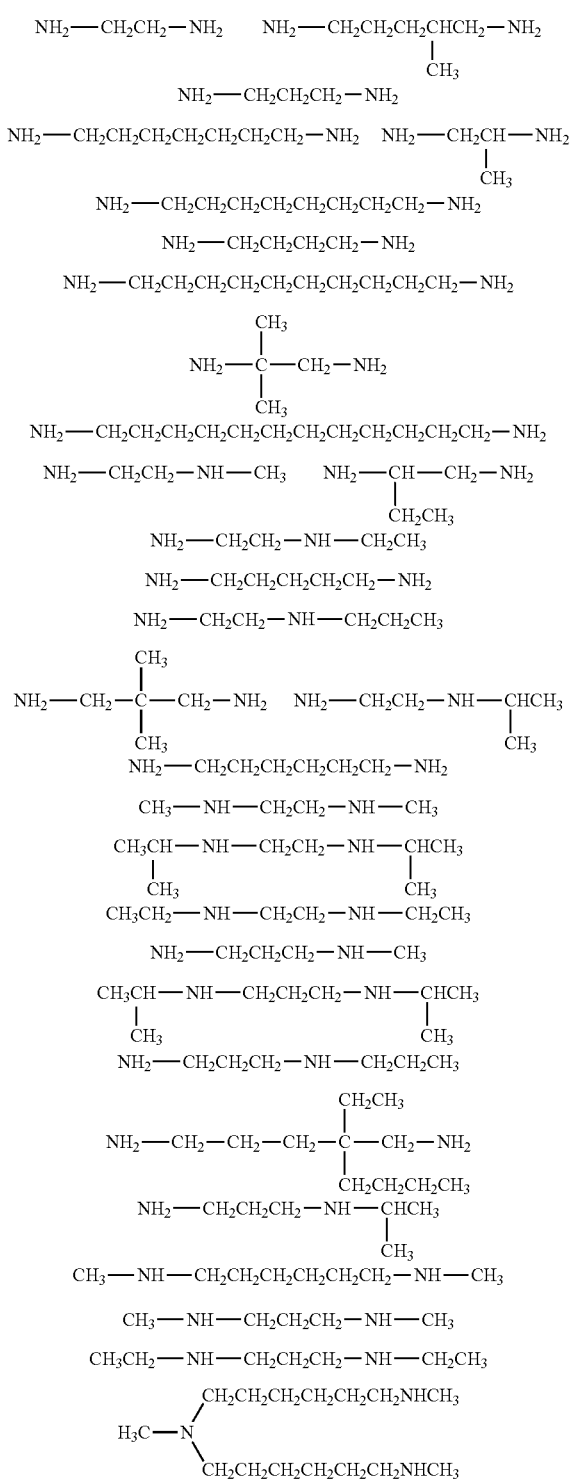
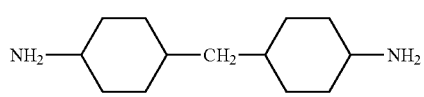
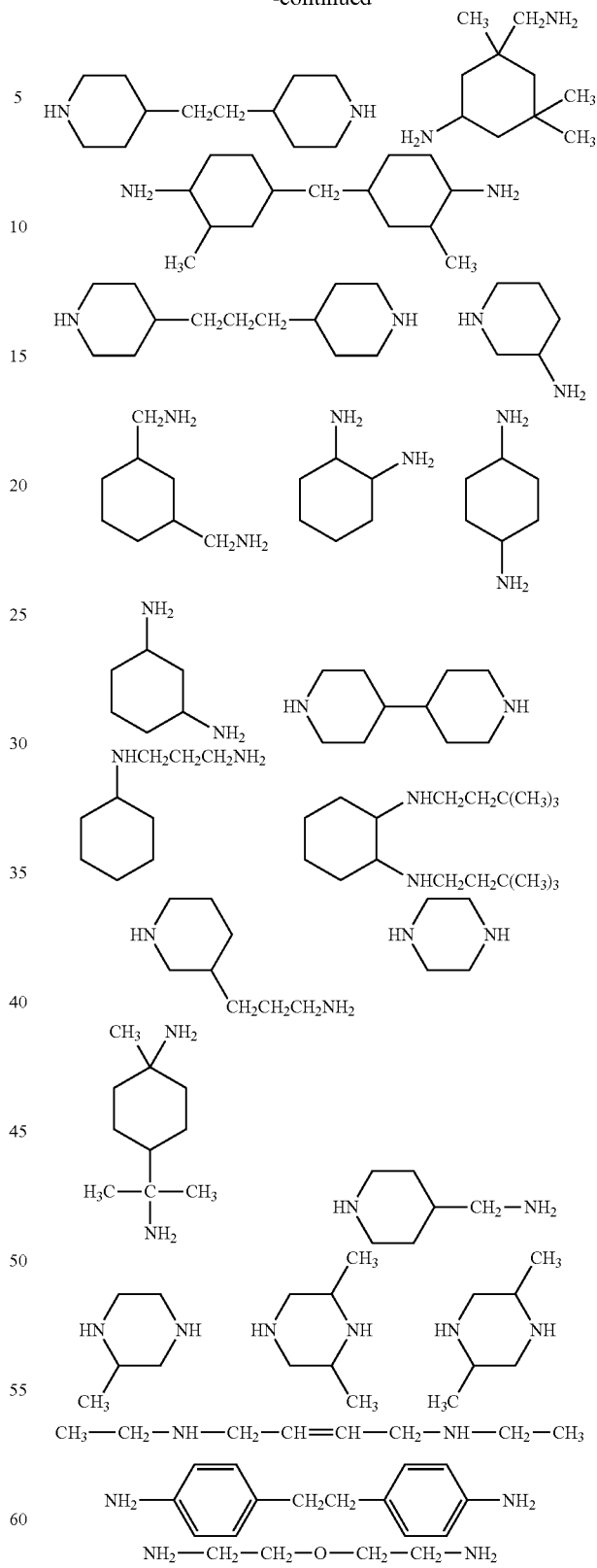
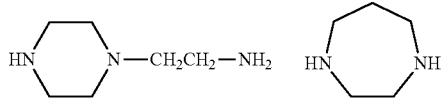

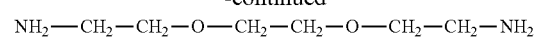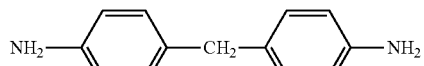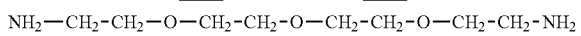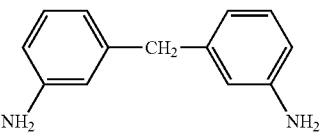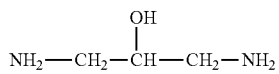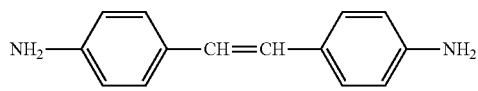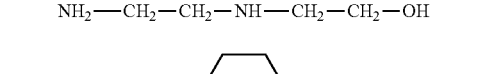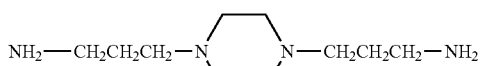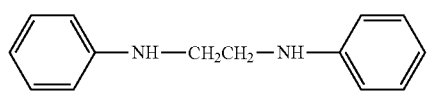
[Chem. 12]
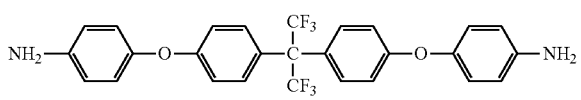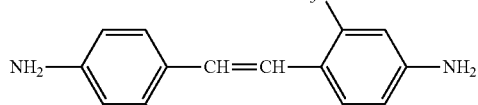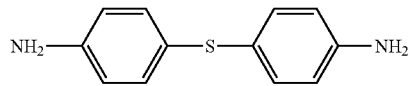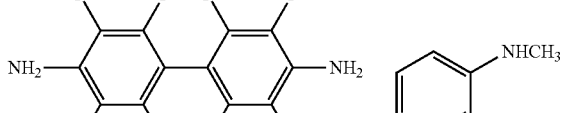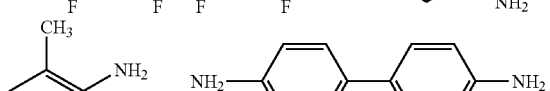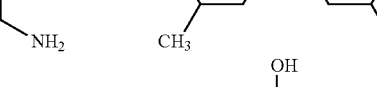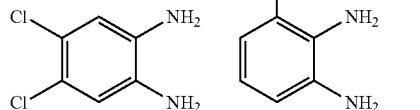
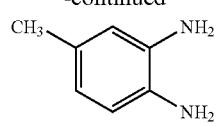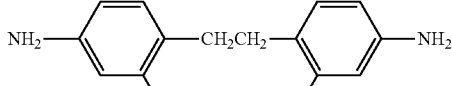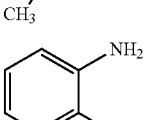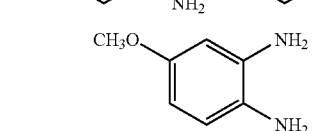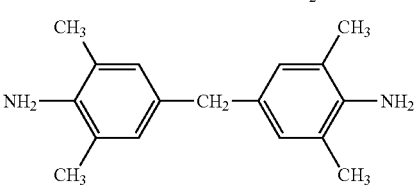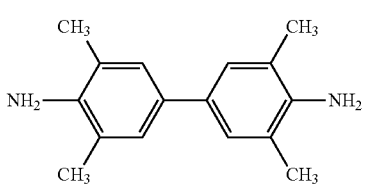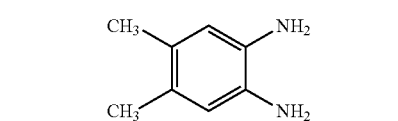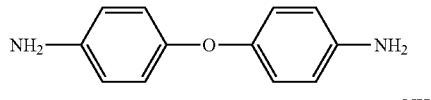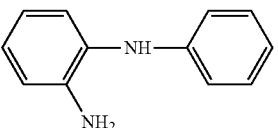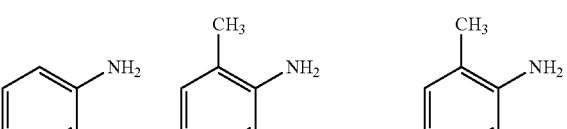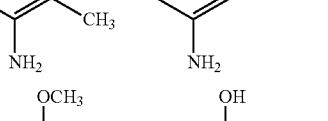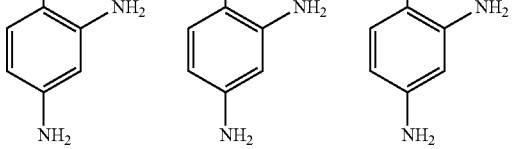

-continued
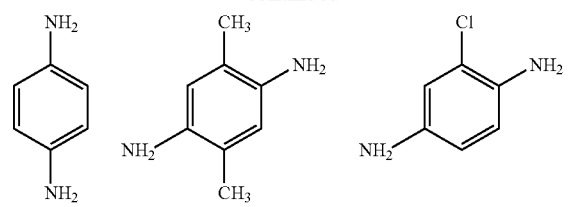
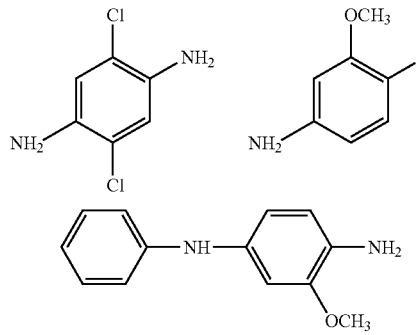
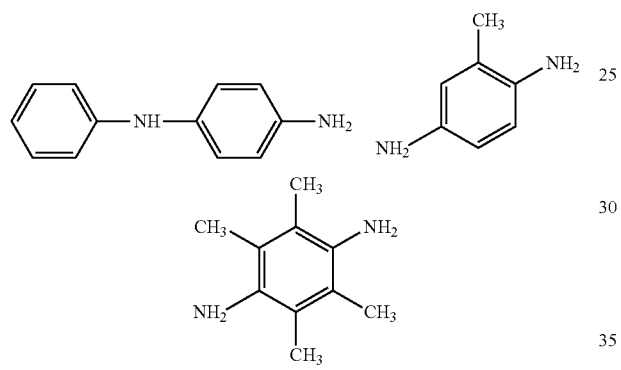
[Chem. 13]
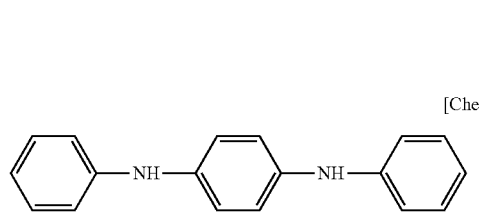
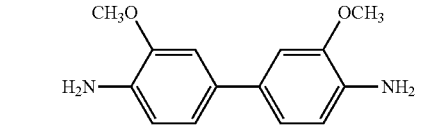
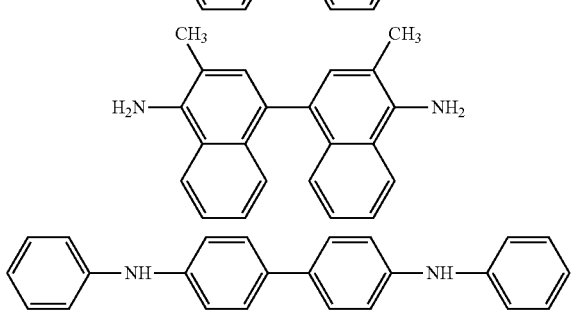
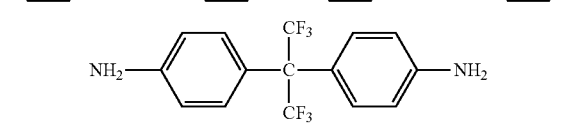
-continued
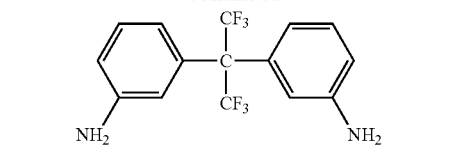
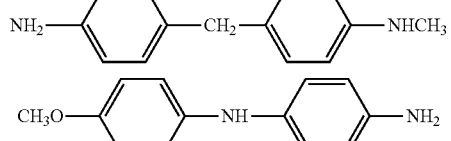
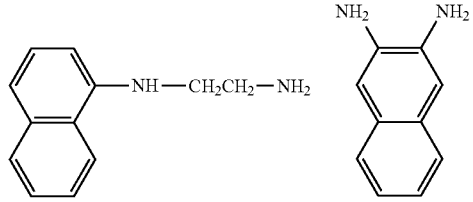
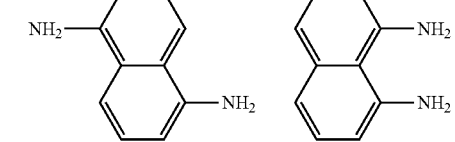
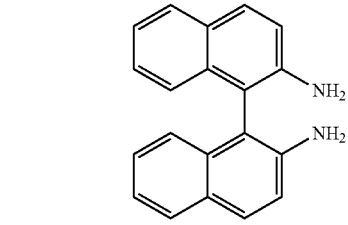
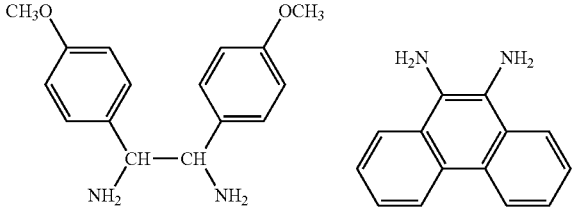
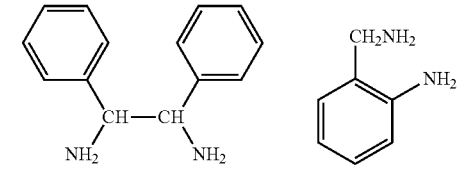
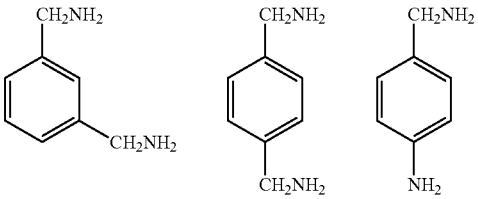
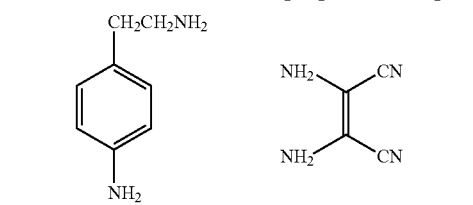

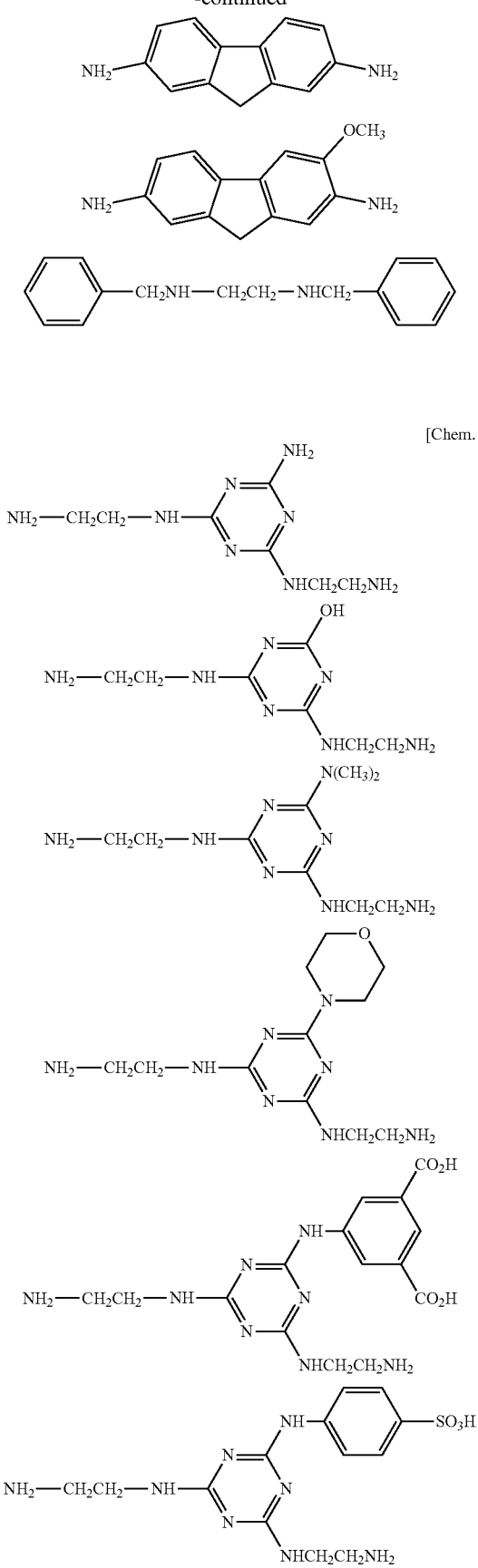
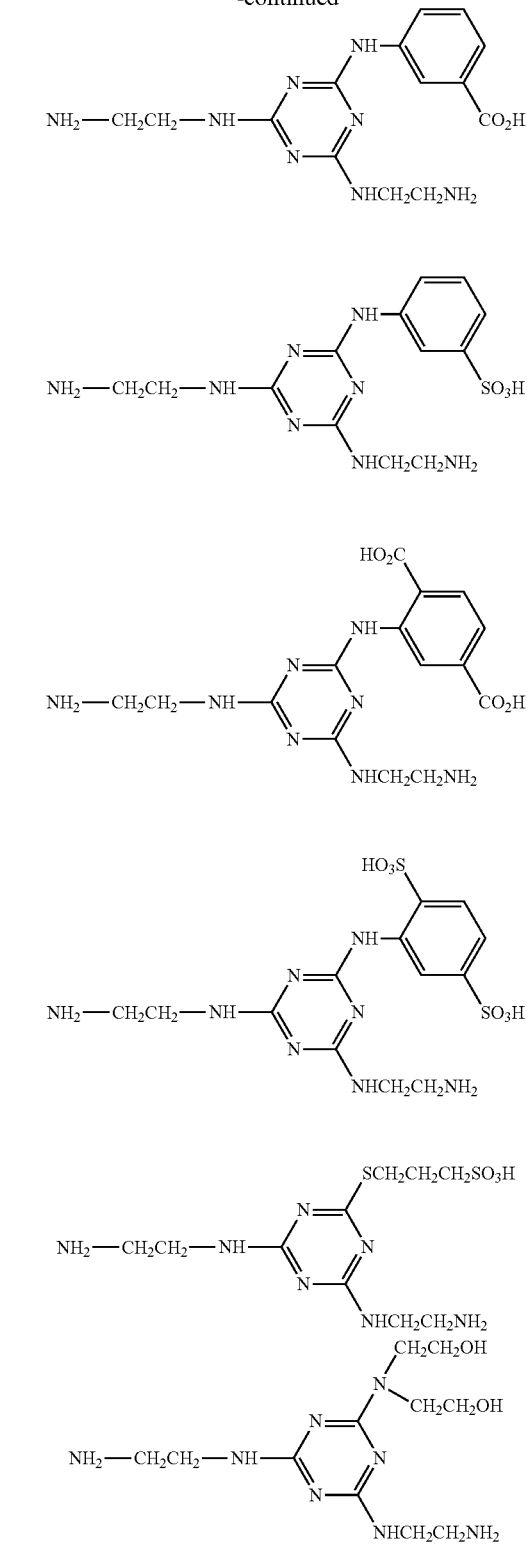
The manufacturing method of the invention will be described below, but the concept of the manufacturing method is by no means restricted to the following manufacturing method, since the compound is obtained by multimerizing the xanthenes-based compound represented by formula (2) via a linking group.

(1) A Method of Linking from the Anilino Group Moiety of the Xanthene Compound Via Methylene

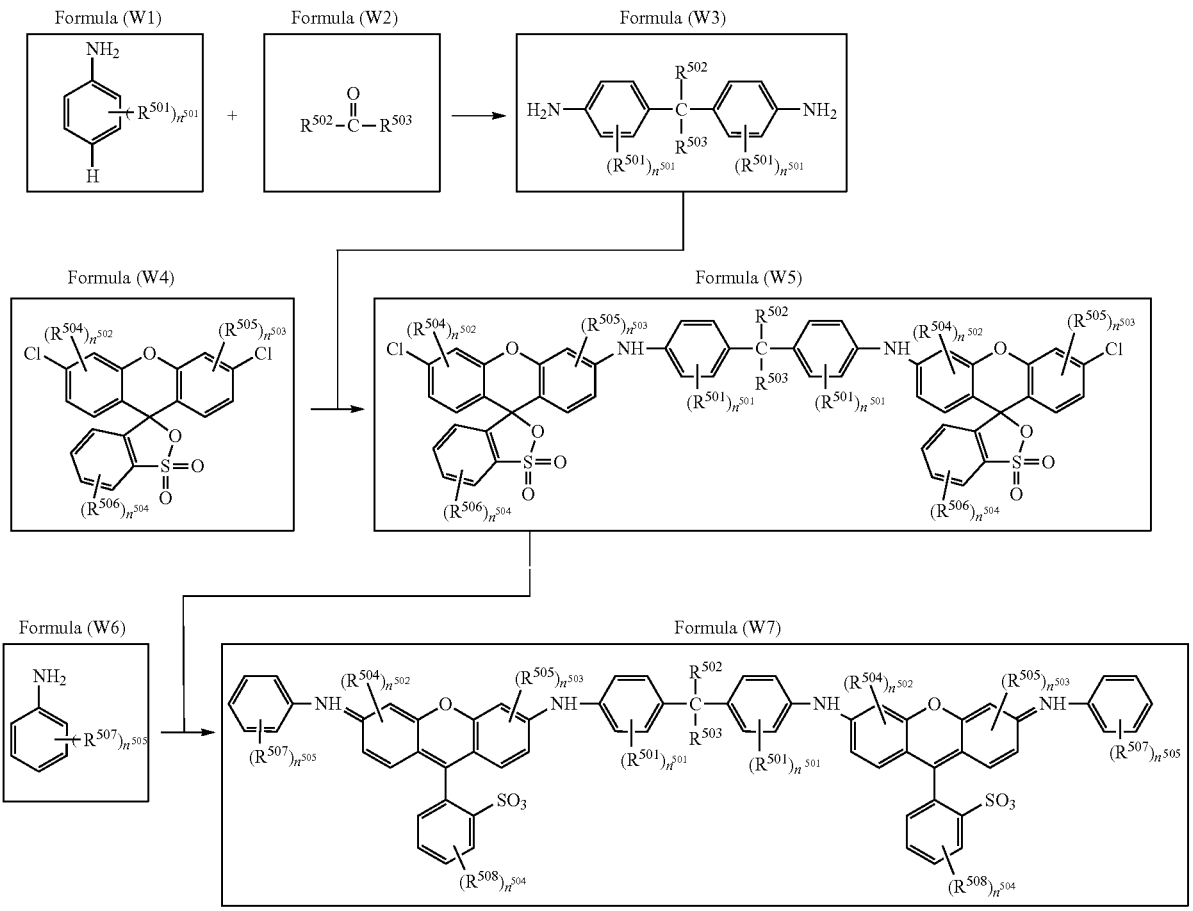

In formula (W1), $R^{501}$ represents a substituent, and $n^{501}$ represents an integer of 0 to 4. When $n^{501}$ is 2 or more, each of a plurality of $R^{501}$ may be the same with or different from every other $R^{501}$.

In formula (W2), each of $R^{502}$ and $R^{503}$ represents a hydrogen atom, a substituted or unsubstituted alkyl group, a substituted or unsubstituted aryl group, or a substituted or unsubstituted heterocyclic group, provided that $R^{502}$ and $R^{503}$ do not represent a hydrogen atom at the same time.

In formula (W3), $R^{501}$, $R^{502}$, $R^{503}$ and $n^{501}$ have the same meaning with $R^{501}$, $R^{502}$, $R^{503}$ and $n^{501}$ in formulae (W1) and (W2), respectively.

In formula (W4), each of $R^{504}$, $R^{505}$ and $R^{506}$ represents a substituent, each of $n^{502}$ and $n^{503}$ represents an integer of 0 to 3, and $n^{504}$ represents an integer of 0 to 4. When each of $n^{502}$, $n^{503}$ or/and $n^{504}$ independently represents 2 or more, each of a plurality of $R^{504}$, $R^{505}$ or/and $R^{506}$ may be the same with or different from every other $R^{504}$, $R^{505}$ or/and $R^{506}$.

In formula (W5), $R^{501}$, $R^{502}$, $R^{503}$, $R^{504}$, $R^{505}$, $R^{506}$, $n^{501}$, $n^{502}$, $n^{503}$ and $n^{504}$ have the same meaning with $R^{501}$, $R^{502}$, $R^{503}$, $R^{504}$, $R^{505}$, $R^{506}$, $n^{501}$, $n^{502}$, $n^{503}$ and $n^{504}$ in formulae (W1), (W2) and (W3), respectively.

In formula (W6), $R^{507}$ represents a substituent, and $n^{505}$ represents an integer of 0 to 5. When $n^{505}$ is 2 or more, each of a plurality of $R^{507}$ may be the same with or different from every other $R^{507}$.

In formula (W7), $R^{501}$, $R^{502}$, $R^{503}$, $R^{504}$, $R^{505}$, $R^{506}$, $R^{507}$, $n^{501}$, $n^{502}$, $n^{503}$, $n^{504}$ and $n^{505}$ have the same meaning with $R^{501}$, $R^{502}$, $R^{503}$, $R^{504}$, $R^{505}$, $R^{506}$, $R^{507}$, $n^{501}$, $n^{502}$, $n^{503}$, $n^{504}$ and $n^{505}$ in formulae (W1), (W2), (W4) and (W6), respectively.

The compound represented by formula (W3) can be obtained by heating 2 mols of the compound represented by formula (W1) and 1 mol of the compound represented by formula (W2) with stirring in the presence of a S strong acid.

The compound represented by formula (W5) can be obtained by heating 1 mol of the compound represented by formula (W3) and 1 mol of the compound represented by formula (W4) with stirring in the presence of an ammonium chloride. The compound represented by formula (W5) can be obtained by heating 1 mol of the compound represented by formula (W3) and 1 mol of the compound represented by formula (W4) with stirring together with an ammonium chloride. The compound represented by formula (W7) corresponding to the compound represented by formula (1) of the invention can be obtained by heating 1 mol of the compound represented by formula (W5) and 2 mols or more of the compound represented by formula (W6) with stirring together with a zinc chloride.

The compound represented by formula (W1) is available as a reagent (for example, Catalog No. D146005, Sigma Aldrich Co., Ltd., and the like).

The compound represented by formula (W2) is available as a reagent (for example, Catalog No. 227048, Sigma Aldrich Co., Ltd., and the like).

The compound represented by formula (W4) can be synthesized according to the method described in Journal of the American Chemical Society, Vol. 46, p. 1899 (1924).

The compound represented by formula (W5) is available as a reagent (for example, Catalog No. D146005, Sigma Aldrich Co., Ltd., and the like).

Incidentally, in order to impart water solubility required of the compound according to the invention for use as aqueous ink for inkjet recording, it is preferred to further perform post reaction of the compound represented by formula (W7) such as sulfonation or the like. The details of the manufacturing method are shown in Examples.

(2) In Connection with a Xanthene Compound Having a Sulfa Group, a Method of Converting the Sulfo Group into a Chlorosulfonyl Group and then Reacting with a Polyamine and the Like In formula (W8), each of $R^{601}$, $R^{602}$, $R^{603}$ and $R^{604}$ represents a hydrogen atom or a substituent, each of $R^{605}$, $R^{606}$, $R^{607}$, $R^{608}$ and $R^{609}$ represents a substituent, $n^{601}$ represents an integer of 0 or 1, each of $n^{602}$ and $n^{603}$ represents an integer of 0 to 3, each of $n^{604}$ and $n^{605}$ represents an integer of 0 to 3, and $n^{606}$ represents an integer of 0 to 4. When each of $n^{602}$, $n^{603}$, $n^{604}$ and/or $n^{605}$ represents 2 or more, each of a plurality of $R^{605}$, $R^{606}$ $R^{607}$, $R^{608}$ and/or $R^{609}$ may be the same with or different from every other $R^{605}$, $R^{606}$ $R^{607}$, $R^{608}$ and/or $R^{609}$.

In formula (W9), $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ have the same meaning with $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$ and $n^{606}$ in formula (W8) respectively.

In formula (W10), $R^{25}$, $R^{26}$ and $L^1$ have the same meaning with $R^{25}$, $R^{26}$ and $L^1$ in formula (4).

In formula (W11), $R^{601}$, $R^{602}$, $R^{603}$, $R^{604}$, $R^{605}$, $R^{606}$, $R^{607}$, $R^{608}$, $R^{609}$, $n^{601}$, $n^{602}$, $n^{603}$, $n^{604}$, $n^{605}$, $n^{606}$, $R^{25}$, $R^{26}$ and $L^1$ have the same meaning with $R^{601}$, $R^{602}$, $R^{603}$, $R^{604}$, $R^{605}$,

[Chem. 16]

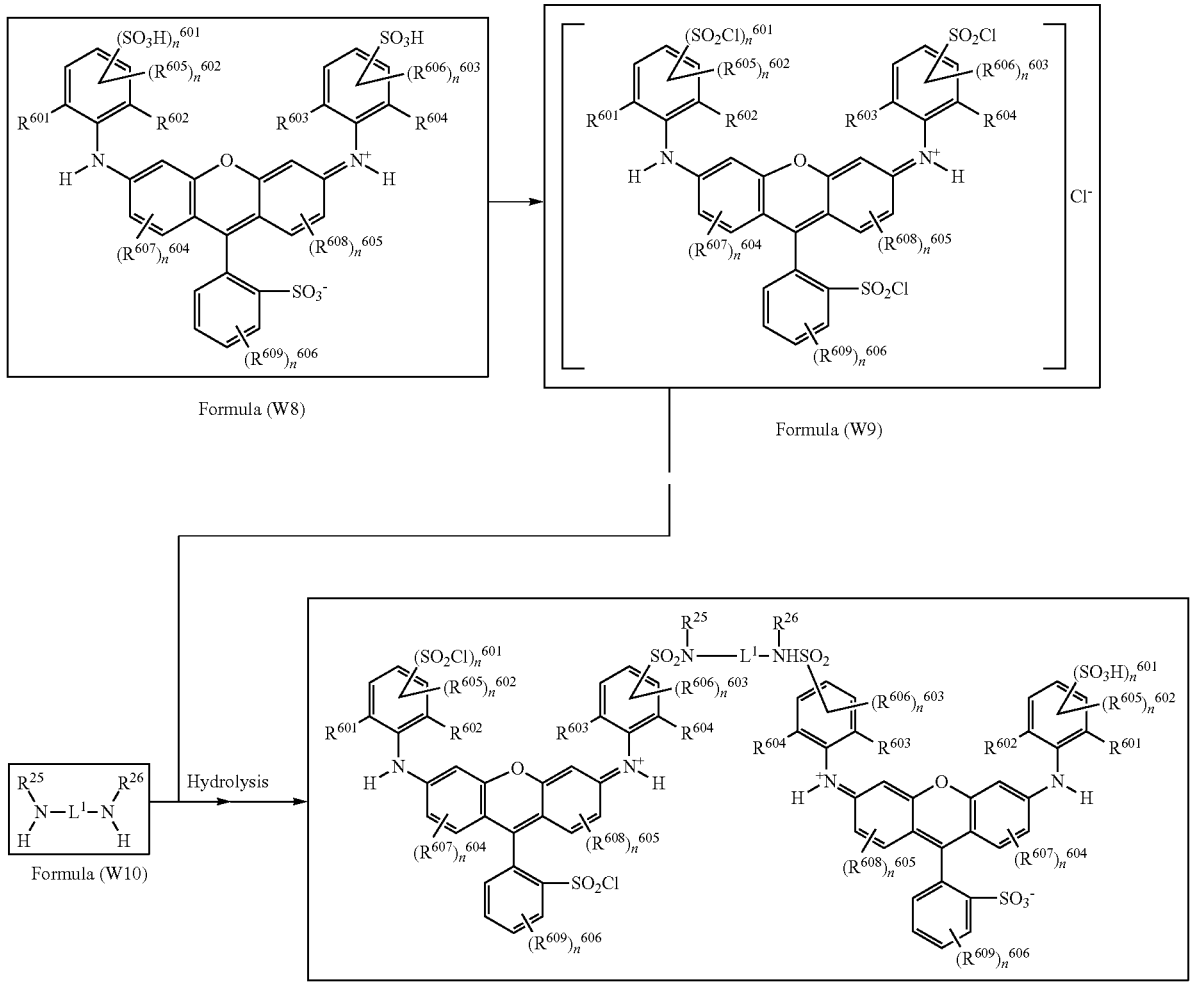

Formula (W8)

Formula (W9)

Formula (W10)

Formula (W11)

$R^{606}$, $R^{607}$, $R^{608}$, $R^{609}$, $n^{601}$, $n^{602}$, $n^{603}$, $n^{604}$, $n^{605}$, $n^{606}$, $R^{25}$, $R^{26}$ and $L^1$ in formulae (W8) and (4) respectively.

The compound represented by formula (W8) is available as a reagent (for example, trade name, CHUGAI AMINOL FAST PINKR, manufactured by Chugai Seiyaku Kabushiki Kaisha, and the like).

The compound represented by formula (W10) is available as a reagent (for example, Catalog No. D25206, Sigma Aldrich Co., Ltd., and the like).

The compound represented by formula (W9) can be obtained by converting the compound represented by formula (W8) into an acid chloride with a chlorinating agent such as phosphorus oxychloride or thionyl chloride.

The compound represented by formula (1) of the invention can be obtained as a mixture such as a representative structure represented by formula (W11) by reacting the compound represented by formula (W9) and the compound represented by formula (W10) in an appropriate ratio (preferably in a molar ratio of 2:1), and hydrolyzing unreacted sulfonyl chloride with an alkali.

The representative structure represented by formula (W11) will be described below. The bonding site of the xanthene structure and the linking group is the sulfonic acid or sulfonate site of the xanthene compound used as formula (W8), and there is no reaction selectivity.

As the form included in a mixture obtained by hydrolysis of the compound obtainable by the reaction of the compound represented by formula (W9) and the compound represented by formula (W10), oligomers such as a trimer and a tetramer are exemplified, in addition to a dimer. Such a multimer (oligomer) may take a linear form, a branched form, a cyclic form, and the form of a combination of these forms.

Incidentally, in the present specification, although these are represented by using a representative structure represented by formula (W11), such a mixture is also included.

(3) In Connection with a Xanthene Compound, a Method of Performing Direct Chlorosulfonylation and then Reacting with a Polyamine

[Chem. 17]

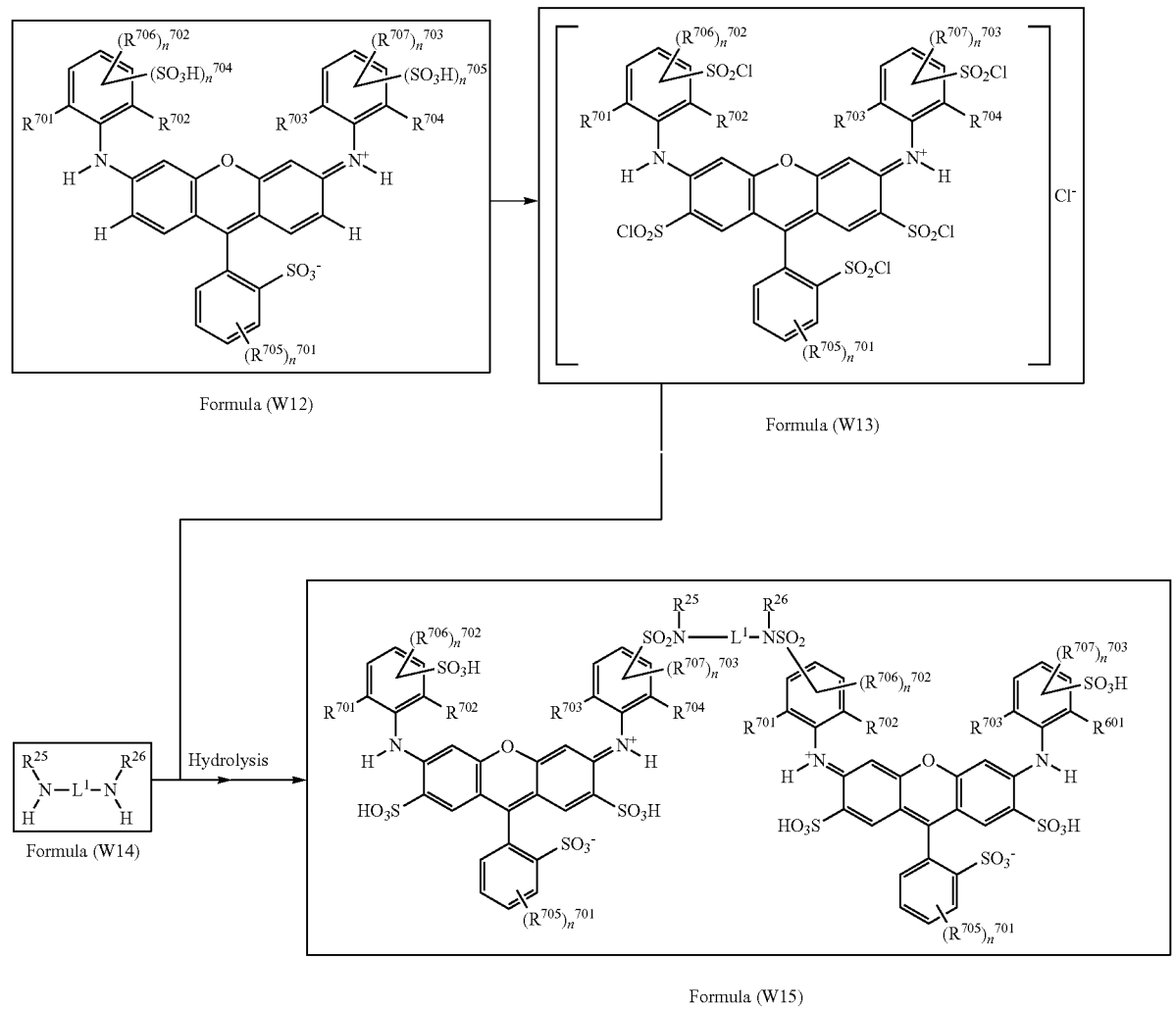

Formula (W12)

Formula (W13)

Formula (W14)

Formula (W15)

In formula (W12), each of $R^{701}$, $R^{702}$, $R^{703}$ and $R^{704}$ represents a hydrogen atom or a substituent, each of $R^{705}$, $R^{706}$ and $R^{707}$ represents a substituent, $n^{701}$ represents an integer of 0 to 4, each of $n^{702}$ and $n^{703}$ represents an integer of 0 to 2, and each of $n^{704}$ and $n^{705}$ represents an integer of 0 or 1. When each of $n^{701}$, $n^{702}$ and/or $n^{703}$ independently represents 2 or more, each of a plurality of $R^{705}$, $R^{706}$ and/or $R^{707}$ may be the same with or different from every other $R^{705}$, $R^{706}$ and/or $R^{707}$.

In formula (W13), $R^{701}$, $R^{702}$, $R^{703}$, $R^{704}$, $R^{705}$, $R^{706}$, $R^{707}$, $n^{701}$, $n^{702}$ and $n^{703}$ have the same meaning with $R^{701}$, $R^{702}$, $R^{703}$, $R^{704}$, $R^{705}$, $R^{706}$, $R^{707}$, $n^{701}$, $n^{702}$ and $n^{703}$ in formula (W12) respectively.

In formula (W14), $R^{25}$, $R^{26}$ and $L^1$ have the same meaning with $R^{25}$, $R^{26}$ and $L_1$ in formula (4).

In formula (W15), $R^{701}$, $R^{702}$, $R^{703}$, $R^{704}$, $R^{705}$, $R^{706}$, $R^{707}$, $n^{701}$, $n^{702}$, $n^{703}$, $R^{25}$, $R^{26}$ and $L^1$ have the same meaning with $R^{701}$, $R^{702}$, $R^{703}$, $R^{704}$, $R^{705}$, $R^{706}$, $R^{707}$, $n^{701}$, $n^{702}$, $n^{703}$, $R^{25}$, $R^{26}$ and $L_1$ in formulae (W12) and (4) respectively.

The compound represented by formula (W12) is available as a reagent (for example, trade name, CHUGAI AMINOL FAST PINKR, manufactured by Chugai Seiyaku Kabushiki Kaisha, and the like).

The compound represented by formula (W14) is available as a reagent (for example, Catalog No. D25206, Sigma Aldrich Co., Ltd., and the like).

The compound represented by formula (W13) can be obtained by subjecting the compound represented by formula (W12) to chlorosulfonylation with a chlorosulfonic acid.

The compound represented by formula (1) of the invention can be obtained as a mixture such as a representative structure represented by formula (W15) by reacting the compound represented by formula (W13) and the compound represented by formula (W14) in an appropriate ratio (preferably in a molar ratio of 2:1), and hydrolyzing unreacted sulfonyl chloride with an alkali.

The representative structure represented by formula (W15) will be described below. The bonding site of the xanthene structure and the linking group is the sulfonyl chloride site of the xanthene compound of formula (W13), and there is no reaction selectivity.

As the form included in a mixture obtained by hydrolysis of the compound obtainable by the reaction of the compound represented by formula (W13) and the compound represented by formula (W14), oligomers such as a trimer and a tetramer are exemplified, in addition to a dimer. Such a multimer (oligomer) may take a linear form, a branched form, a cyclic form, and the form of a combination of these forms.

Incidentally, in the present specification, although these are represented by using a representative structure represented by formula (W15), such a mixture is also included.

The specific examples (the representative structure) of the compound represented by formula (1) are shown below, but the invention is not restricted to these specific examples.

TABLE 1

| Exemplary Compound | Structural Formula |
|---|---|
| 1 | (structure shown) |
| 2 | (structure shown) |

TABLE 1-continued
| Exemplary Compound | Structural Formula |
|---|---|
| 3 | 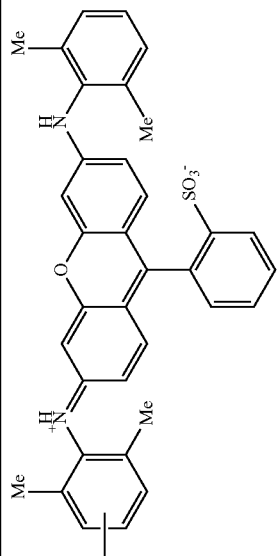 |

TABLE 1-continued
| Exemplary Compound | Structural Formula |
|---|---|
| 4 | 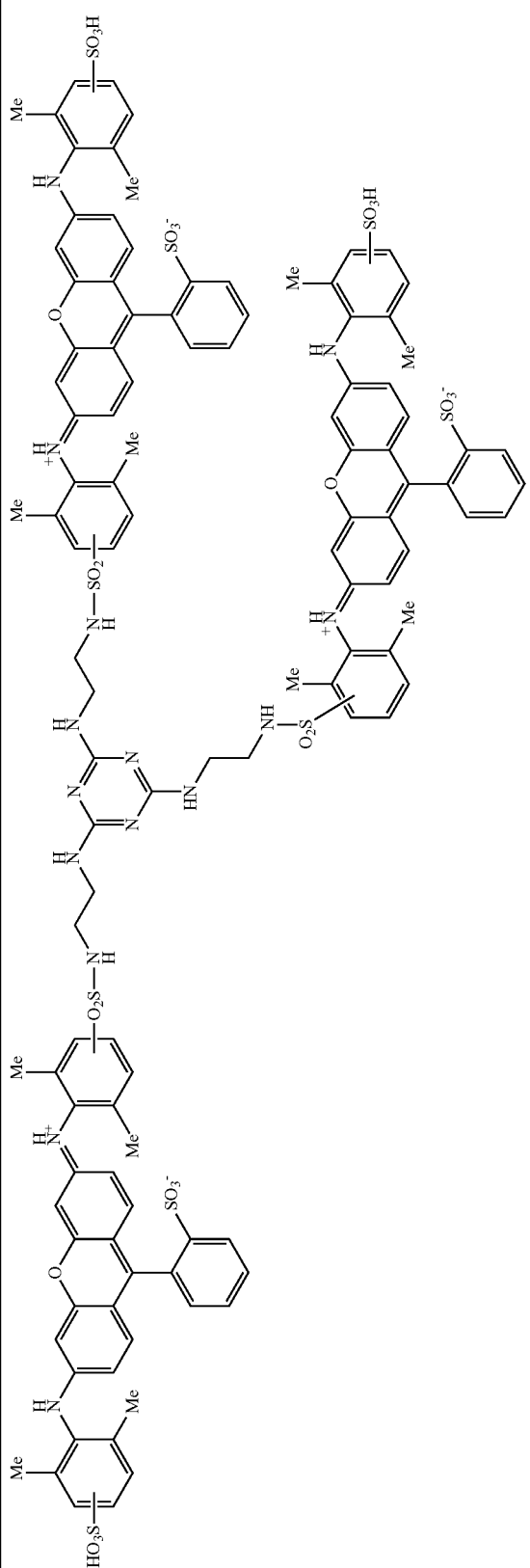 |
| 5 | 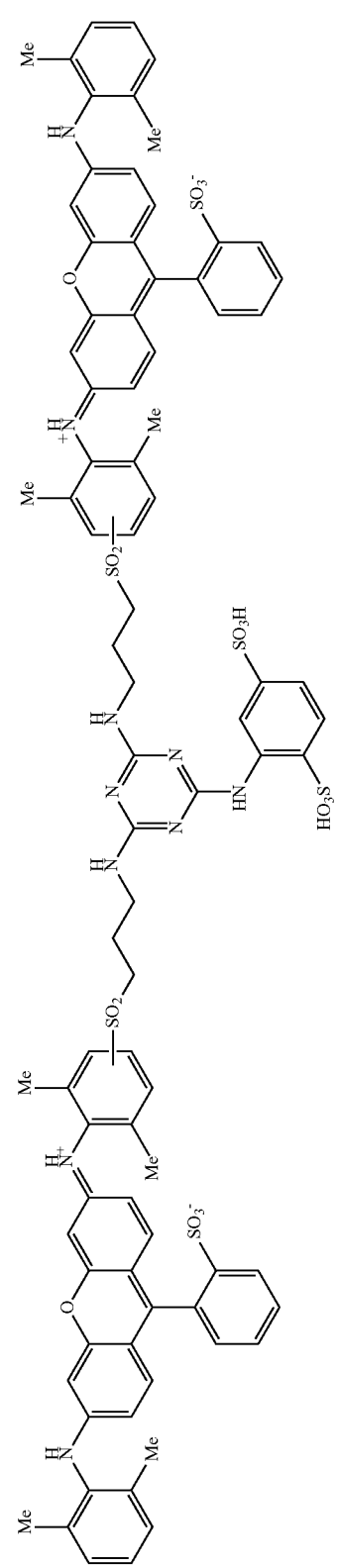 |

TABLE 1-continued
| Exemplary Compound | Structural Formula |
|---|---|
| 6 | 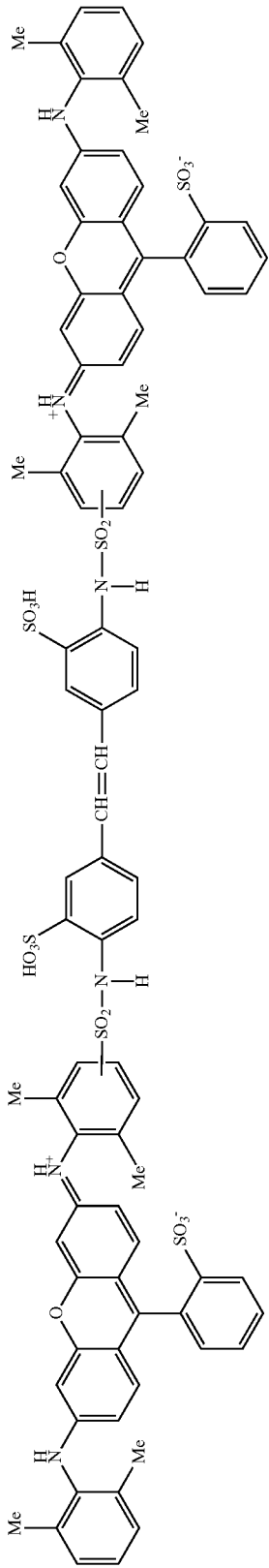 |

TABLE 2

| Exemplary Compound | Structural Formula |
|---|---|
| 7 | 43 (structure shown) |
| 8 | (structure shown) |
| 9 | 44 (structure shown) |

TABLE 2-continued

| Exemplary Compound | Structural Formula |
|---|---|
| 10 | (chemical structure) |
| 11 | (chemical structure) |
| 12 | (chemical structure) |

TABLE 3

| Exemplary Compound | Structural Formula |
|---|---|
| 13 | (structure shown) |
| 14 | (structure shown) |
| 15 | (structure shown) |

TABLE 3-continued

| Exemplary Compound | Structural Formula |
|---|---|
| 16 | (structure) |
| 17 | (structure) |

TABLE 3-continued

| Exemplary Compound | Structural Formula |
|---|---|
| 18 | (complex rhodamine-based structure with four xanthene dye units linked through sulfonamide-ethylene-amine bridges) |

Exemplary Compound 1-1

A reaction mixture containing the following structure, which can be obtained by reacting in a ratio of 2 mols of Compound A and 1 mol of 4,4'-diaminostilbene-2,2'-disulfonic acid, and then hydrolyzing the unreacted sulfonyl=chloride with sodium hydroxide

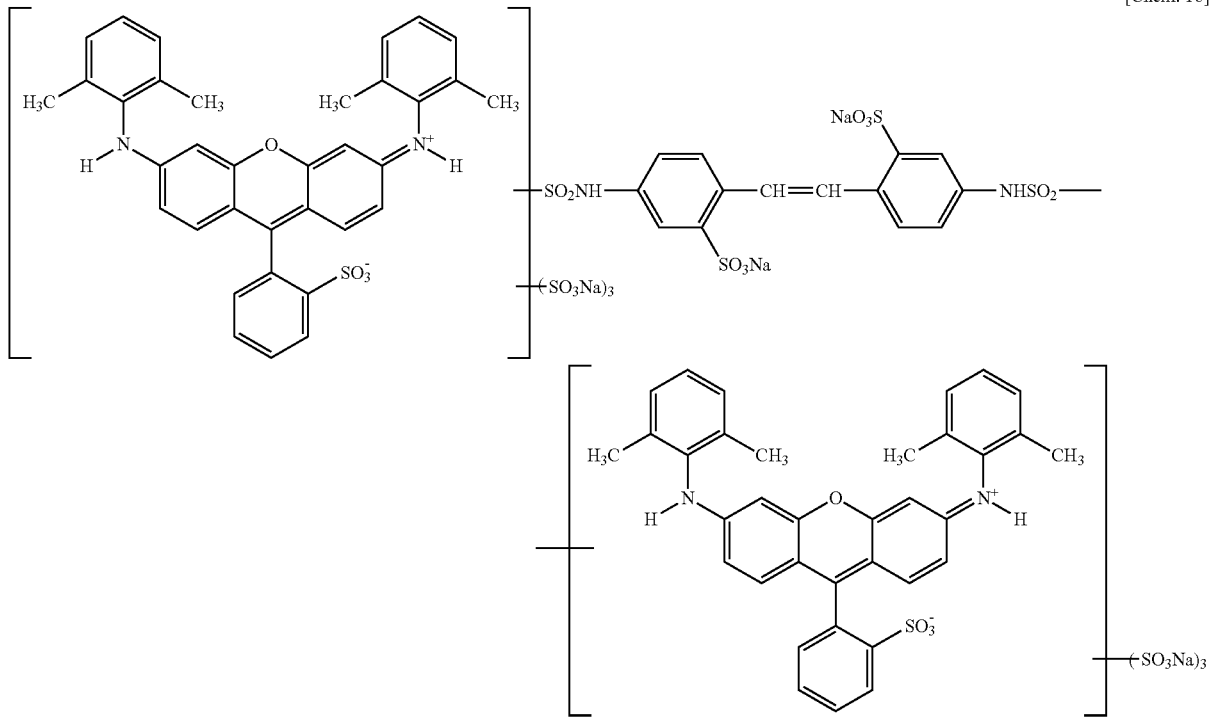

Compound A:

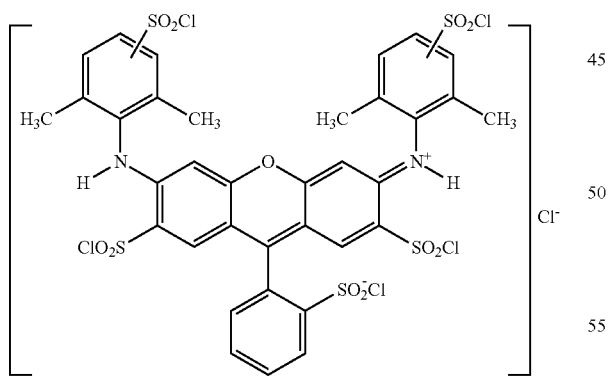

Exemplary Compound 1-2

A reaction mixture containing the following structure, which can be obtained by reacting in a ratio of 2 mols of Compound A and 1 mol of ethylenediamine, and then hydrolyzing the unreacted sulfonyl=chloride with sodium hydroxide

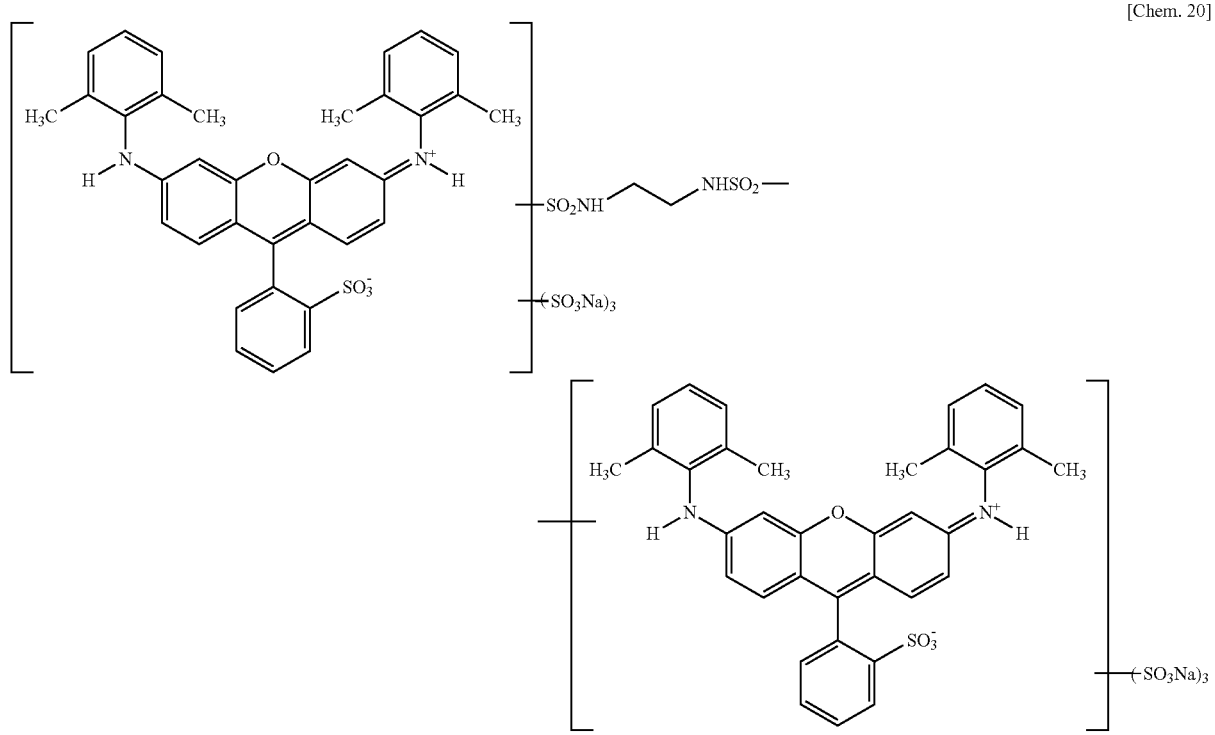
Exemplary Compound 1-3
A reaction mixture containing the following structure, which can be obtained by reacting in a ratio of 2 mols of Compound A and 1 mol of piperazine, and then hydrolyzing the unreacted sulfonyl=chloride with sodium hydroxide
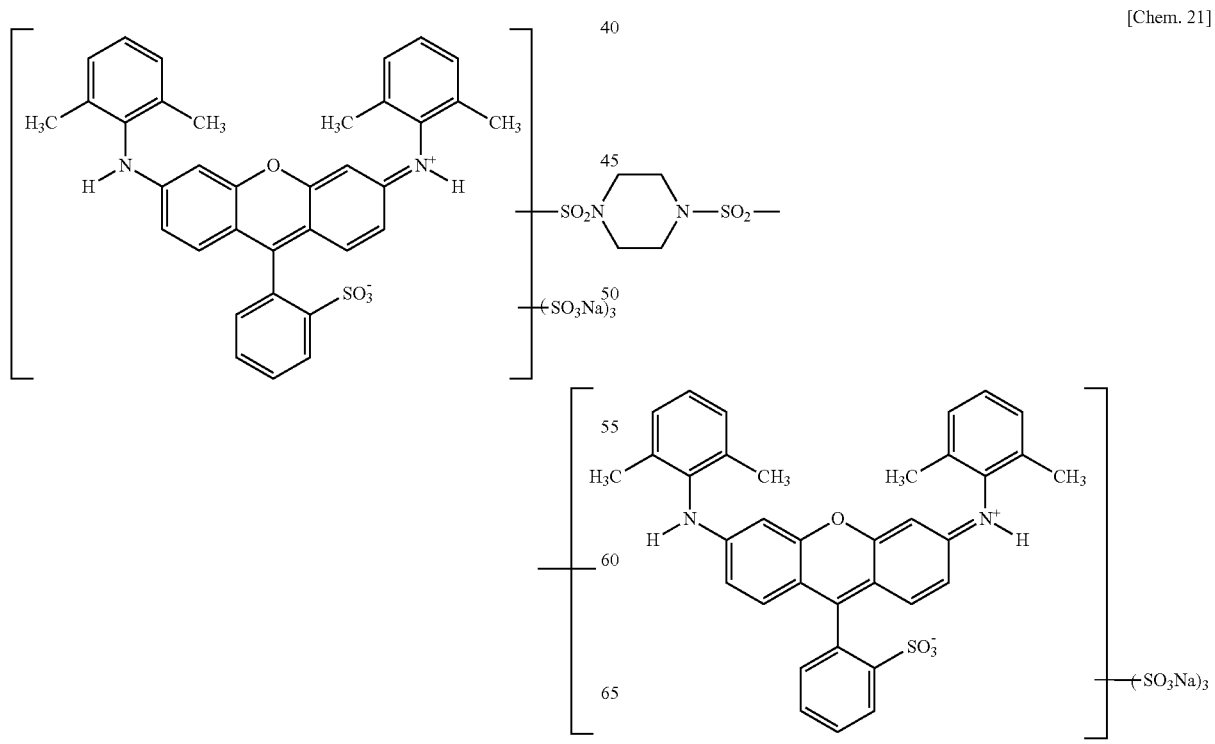

Exemplary Compound 1-4

A reaction mixture containing the following structure, which can be obtained by reacting in a ratio of 2 mols of Compound A and 1 mol of 2,5-dimethylpiperazine, and then hydrolyzing the unreacted sulfonyl=chloride with sodium hydroxide

[Chem. 22]

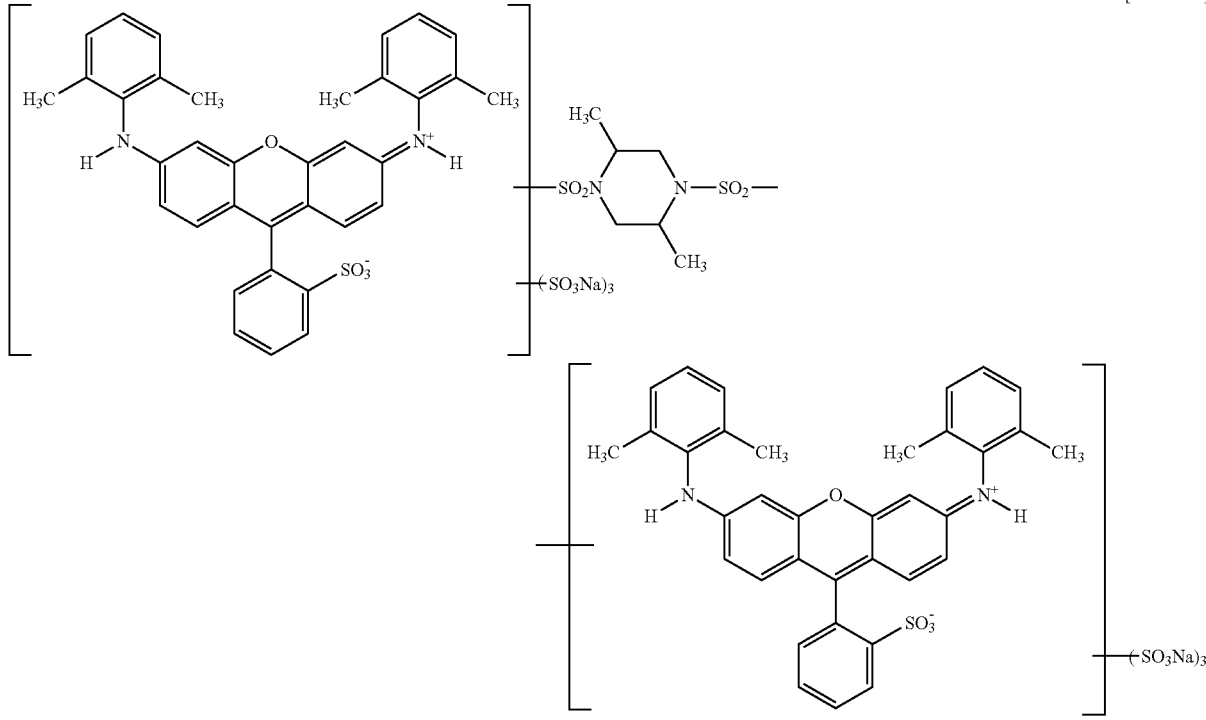

Exemplary Compound 1-5

A reaction mixture containing the following structure, which can be obtained by reacting in a ratio of 2 mols of Compound A and 1 mol of 1-(2-aminoethyl)piperazine, and then hydrolyzing the unreacted sulfonyl=chloride with sodium hydroxide

[Chem. 23]

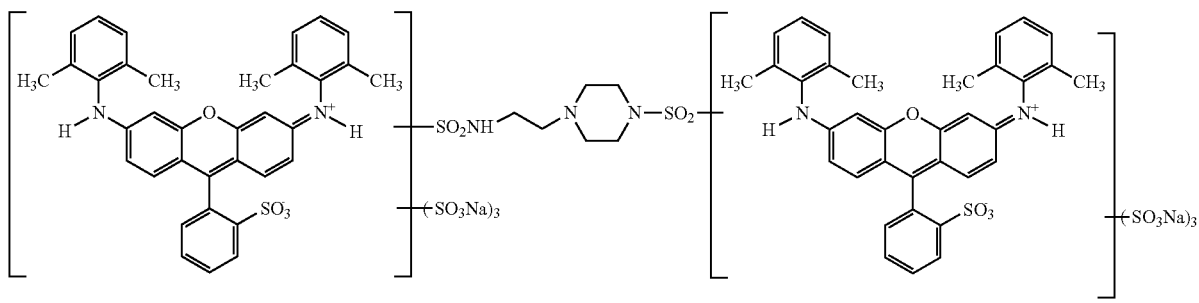

Exemplary Compound 1-6

A reaction mixture containing the following structure, which can be obtained by reacting in a ratio of 2 mols of Compound A and 1 mol of 1,4-bis(3-aminopropyl)piperazine), and then hydrolyzing the unreacted sulfonyl=chloride with sodium hydroxide

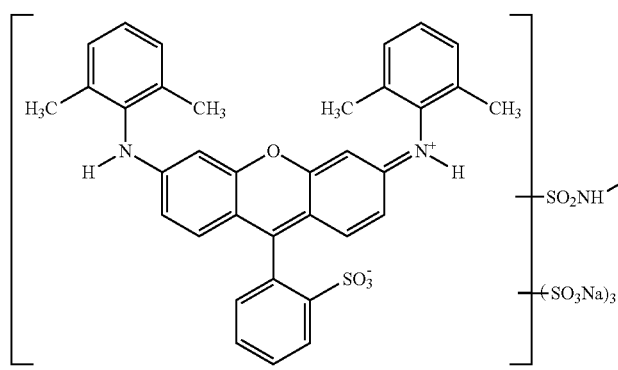
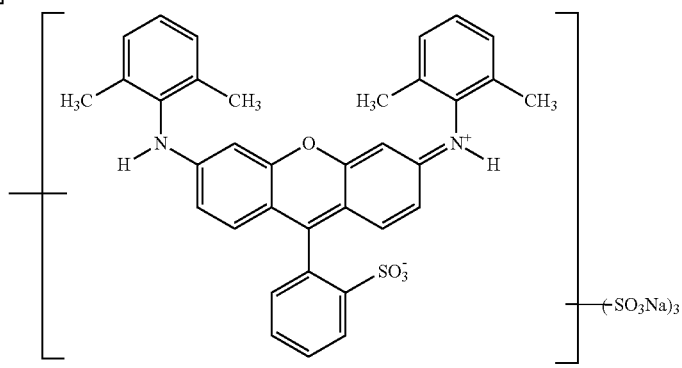
Exemplary Compound 1-7
A reaction mixture containing the following structure, which can be obtained by reacting in a ratio of 2 mols of Compound A and 1 mol of 1,2-cyclohexanediamine, and then hydrolyzing the unreacted sulfonyl=chloride with sodium hydroxide
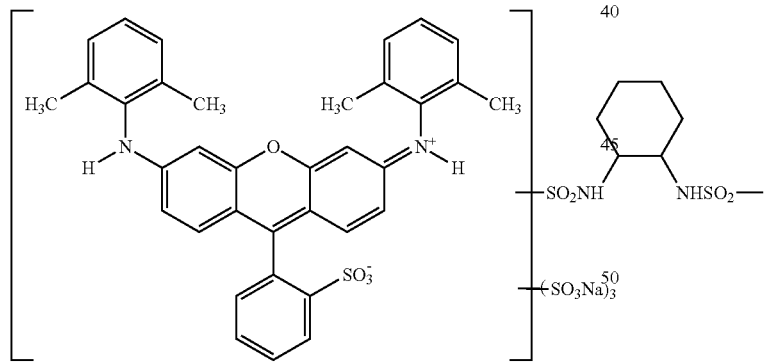
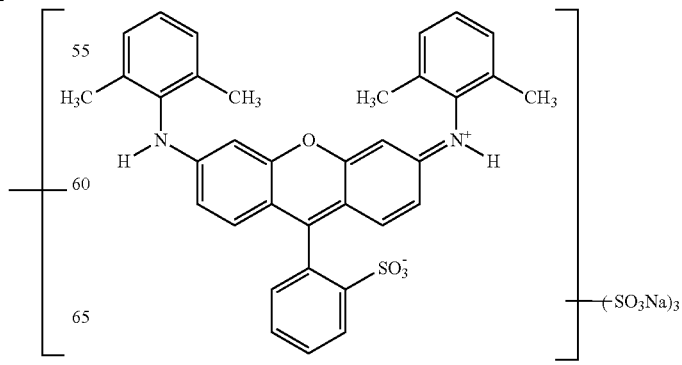

Exemplary Compound 1-8

A reaction mixture containing the following structure, which can be obtained by reacting in a ratio of 2 mols of Compound A and 1 mol of 1,3-cyclohexanediamine, and then hydrolyzing the unreacted sulfonyl=chloride with sodium hydroxide

[Chem. 26]

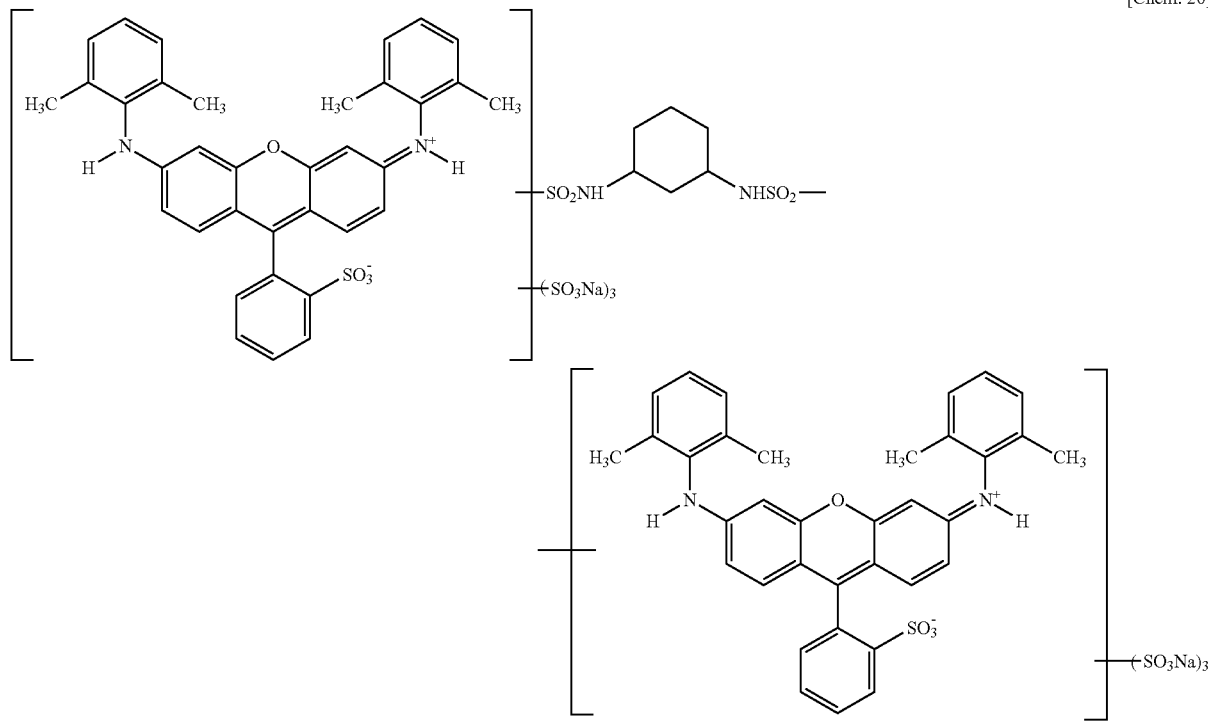

Exemplary Compound 1-9

A reaction mixture containing the following structure, which can be obtained by reacting in a ratio of 2 mols of Compound A and 1 mol of 1,4-cyclohexanediamine, and then hydrolyzing the unreacted sulfonyl=chloride with sodium hydroxide

[Chem. 27]

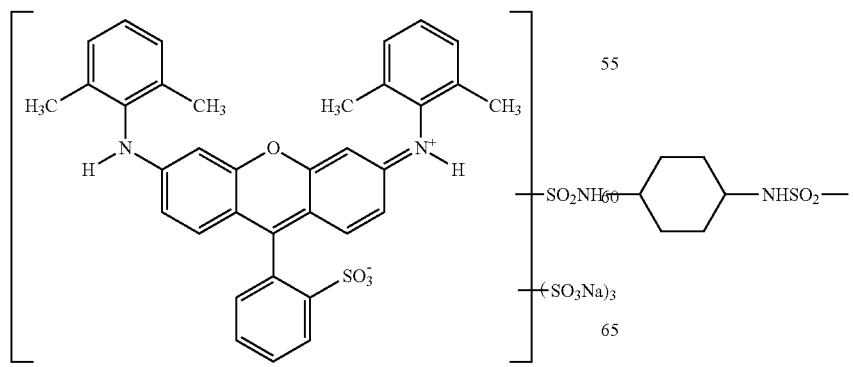

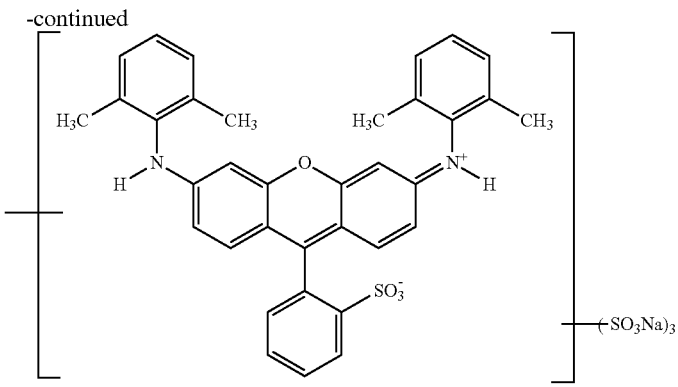

Exemplary Compound 1-10

A reaction mixture containing the following structure, which can be obtained by reacting in a ratio of 2 mols of Compound A and 1 mol of m-phenylenediamine, and then hydrolyzing the unreacted sulfonyl=chloride with sodium hydroxide

[Chem. 28]

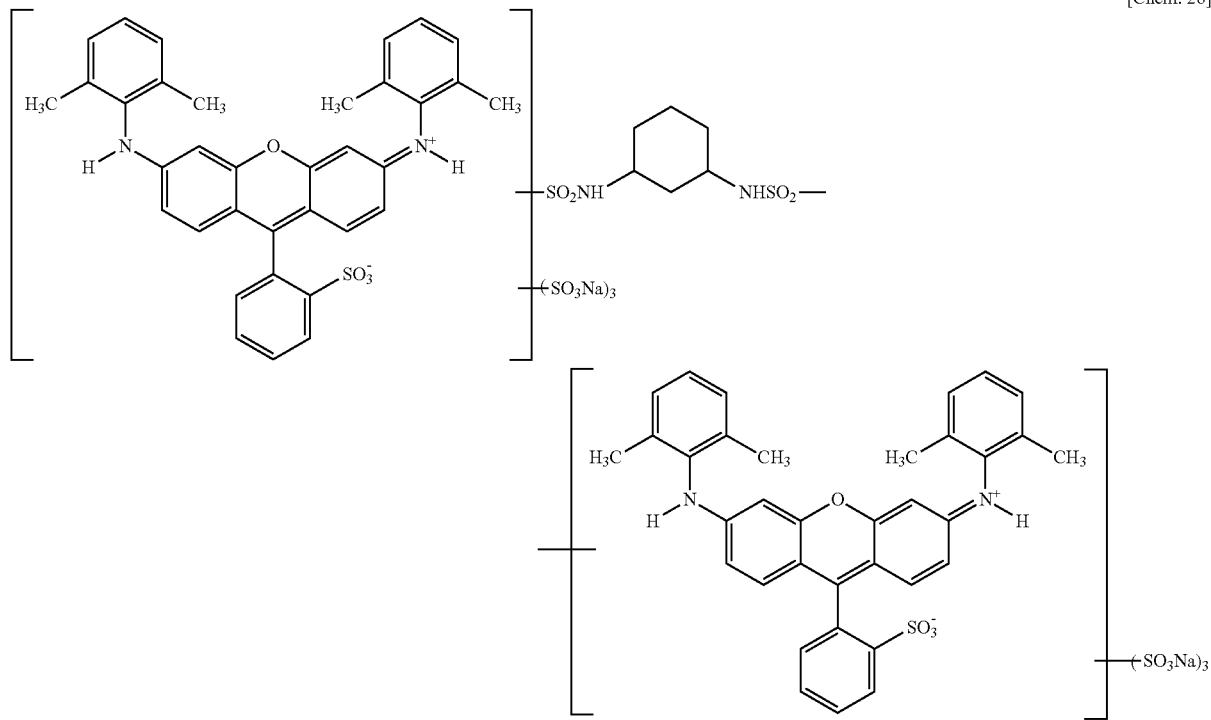

Exemplary Compound 1-11

A reaction mixture containing the following structure, which can be obtained by reacting in a ratio of 2 mols of Compound A and 1 mol of p-xylylenediamine, and then hydrolyzing the unreacted sulfonyl=chloride with sodium hydroxide

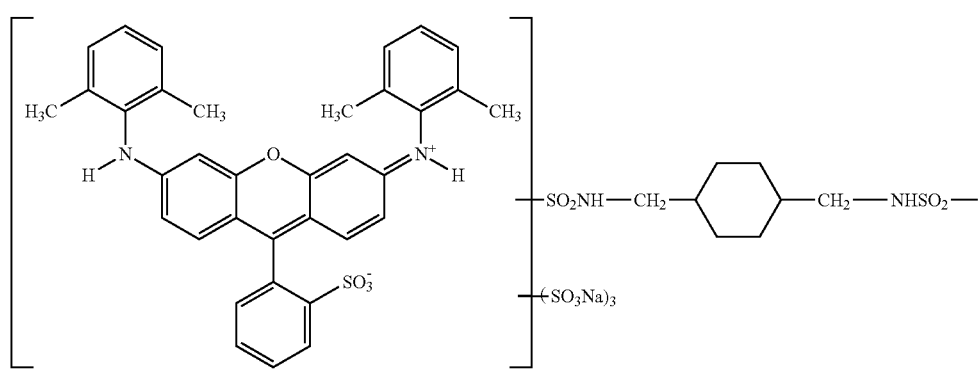
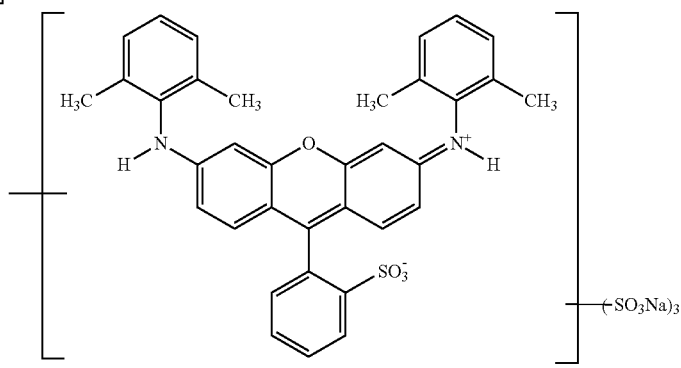
Exemplary Compound 1-12
A reaction mixture containing the following structure, which can be obtained by reacting in a ratio of 2 mols of Compound A and 1 mol of disodium 4,6-di(2-aminoethylamino)-1,3,5-triazin-2-ylaminobenzene-2,5-disulfonate, and then hydrolyzing the unreacted sulfonyl=chloride with sodium hydroxide
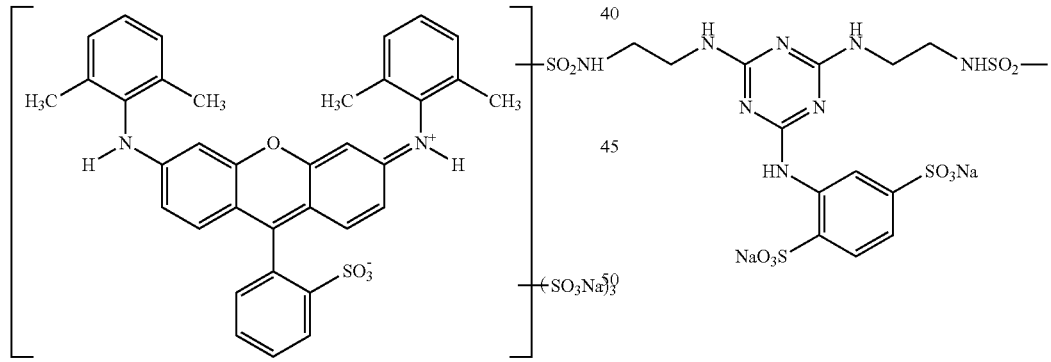
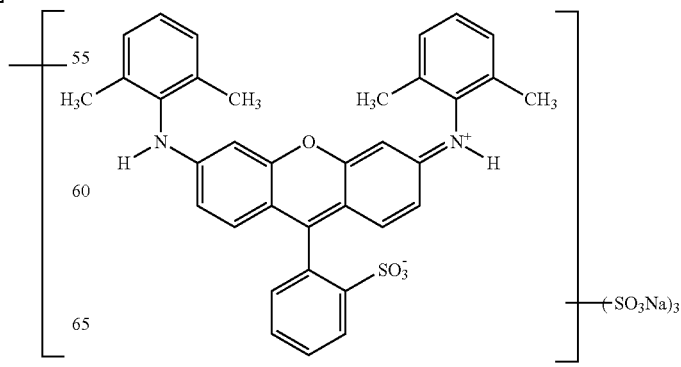

Exemplary Compound 1-13

A reaction mixture containing the following structure, which can be obtained by reacting in a ratio of 2 mols of Compound A and 1 mol of disodium 4,6-di(2-aminoethylamino)-1,3,5-triazin-2-ylaminoisophthalate, and then hydrolyzing the unreacted sulfonyl=chloride with sodium hydroxide

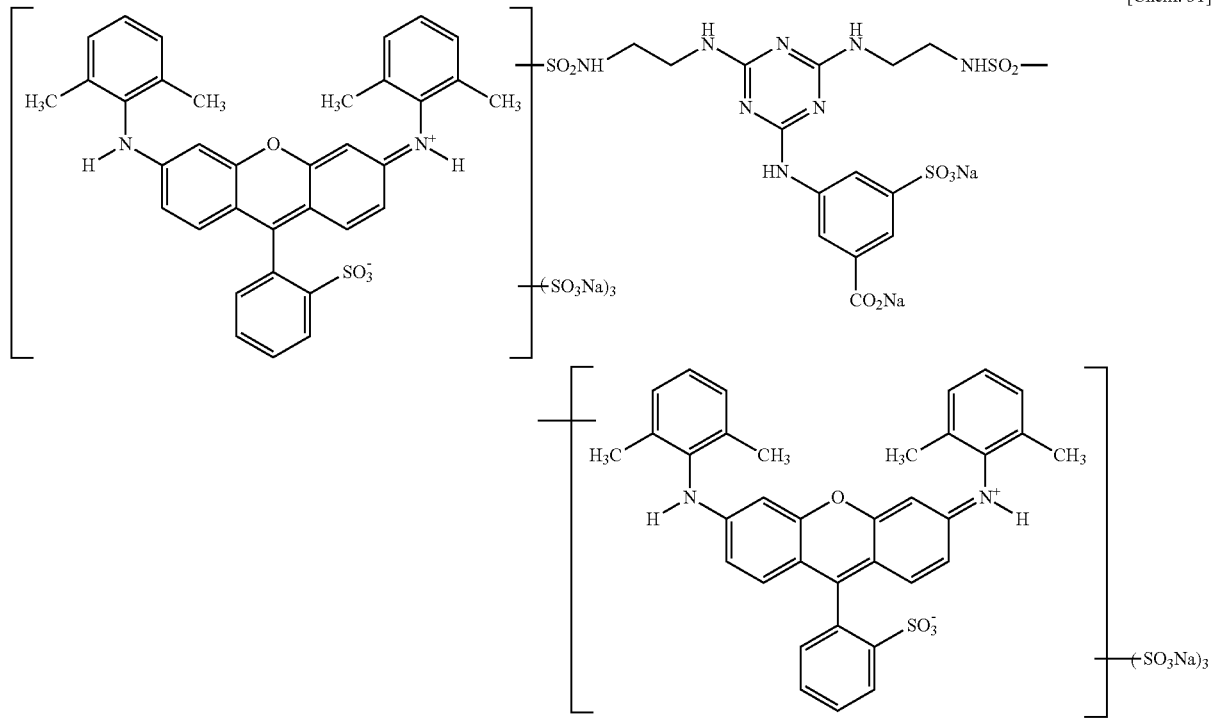

[Chem. 31]

Exemplary Compound 1-14

A reaction mixture containing the following structure, which can be obtained by reacting in a ratio of 2 mols of Compound A and 1 mol of 4,6-di(2-aminoethylamino)-2-hydroxy-1,3,5-triazine, and then hydrolyzing the unreacted sulfonyl=chloride with sodium hydroxide

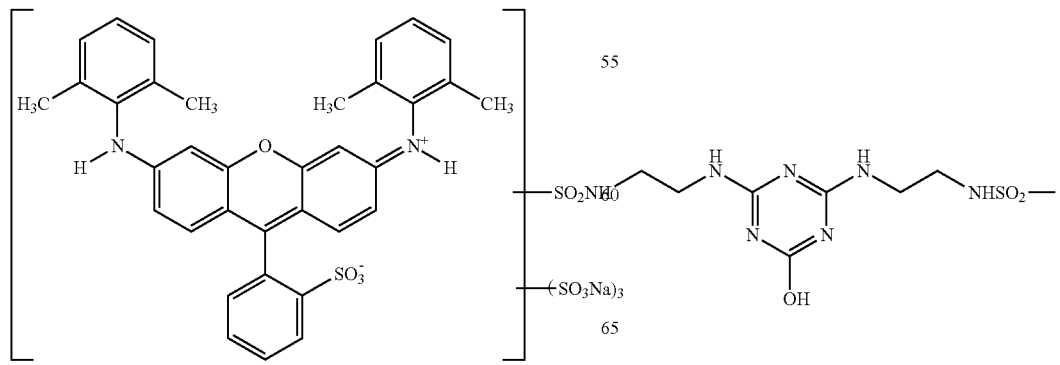

[Chem. 32]

-continued
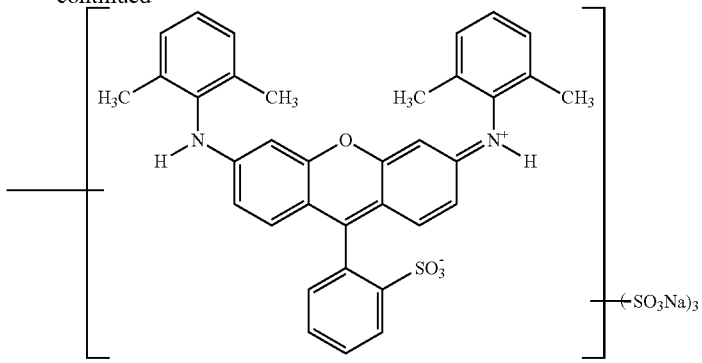
Exemplary Compound 1-15
[Chem. 33]
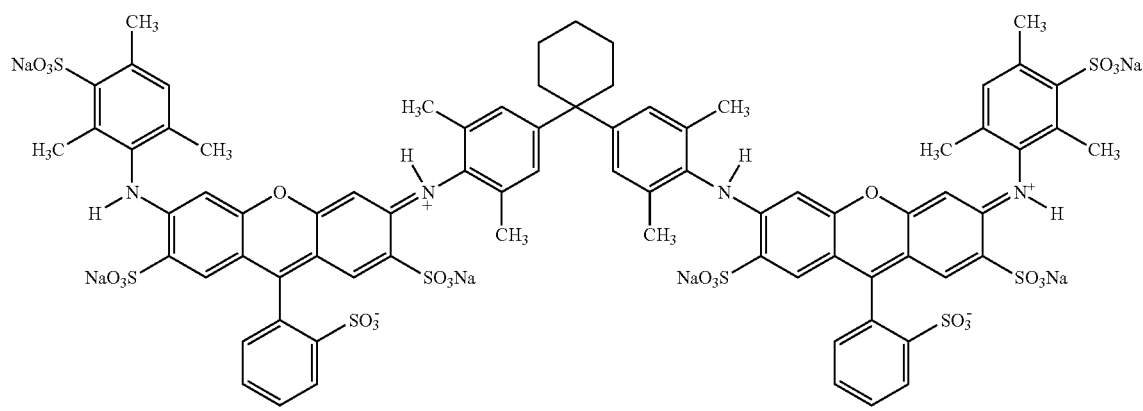
Exemplary Compound 1-16
[Chem. 34]
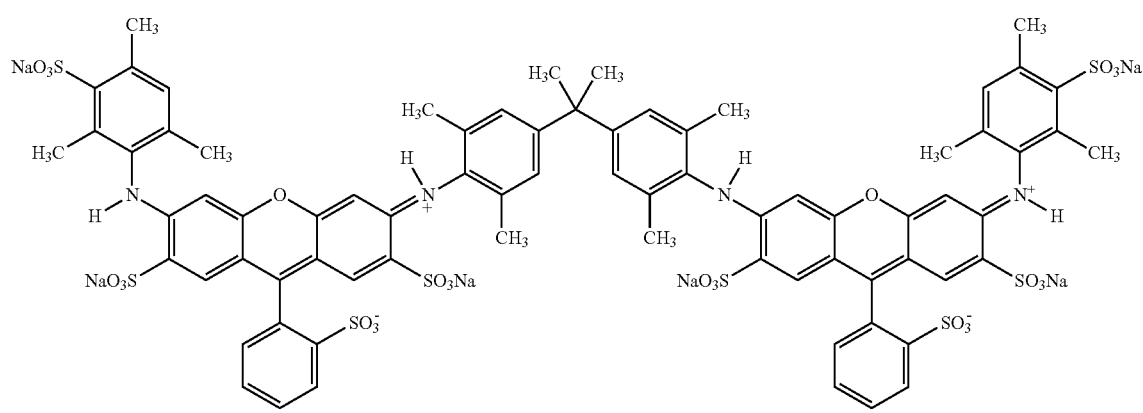
Exemplary Compound 1-17
A reaction mixture containing the following structure, which can be obtained by reacting in a ratio of 2 mols of Compound B and 1 mol of 4,4'-diaminostilbene-2,2'-disulfonic acid, and then hydrolyzing the unreacted sulfonyl=chloride with sodium hydroxide

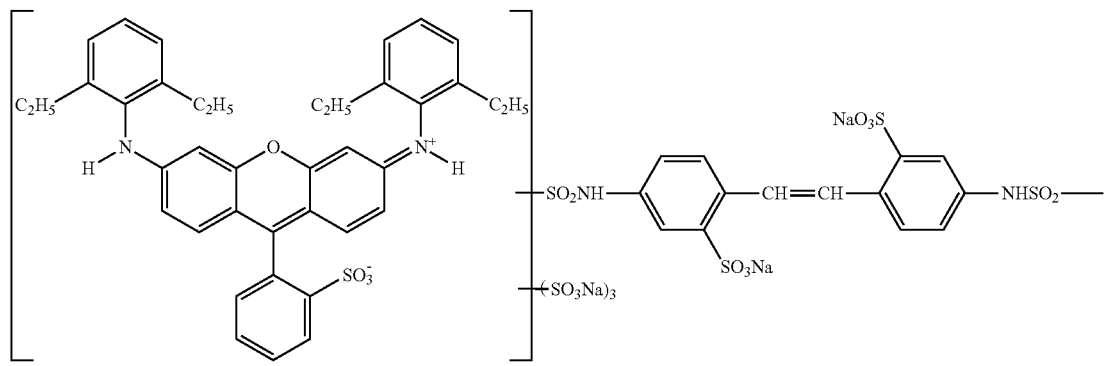
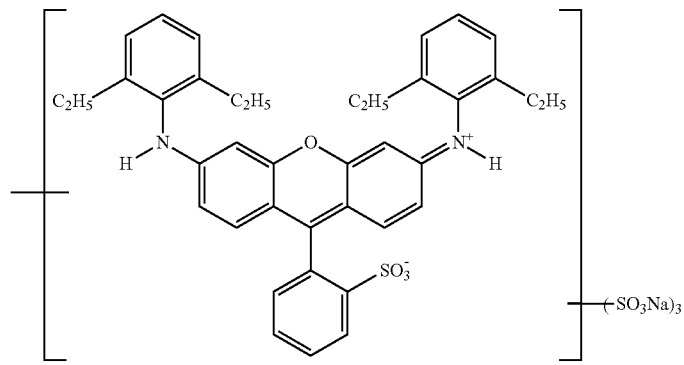
Compound B
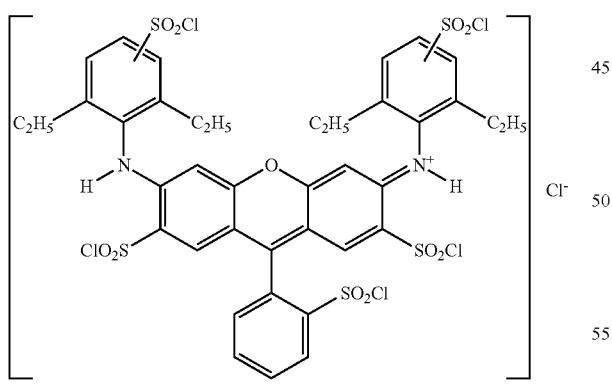
Exemplary Compound 1-18
A reaction mixture containing the following structure, which can be obtained by reacting in a ratio of 2 mols of Compound C and 1 mol of 4,4'-diaminostilbene-2,2'-disulfonic acid, and then hydrolyzing the unreacted sulfonyl=chloride with sodium hydroxide

[Chem. 37]
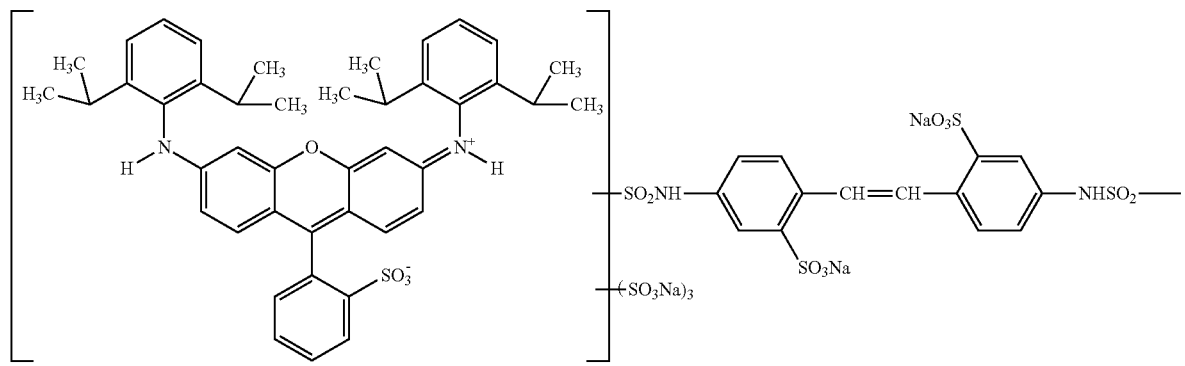
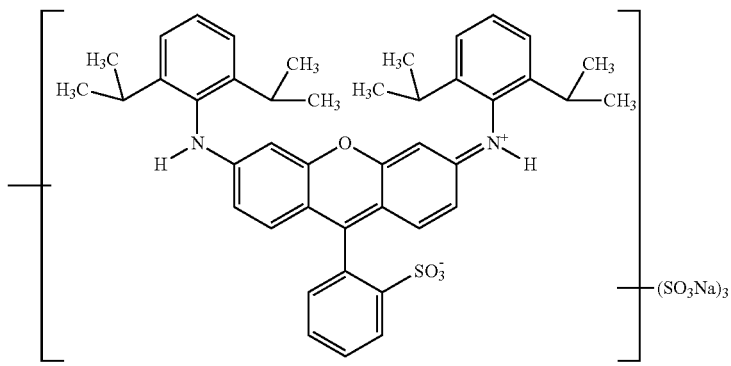
Compound C
[Chem. 38]
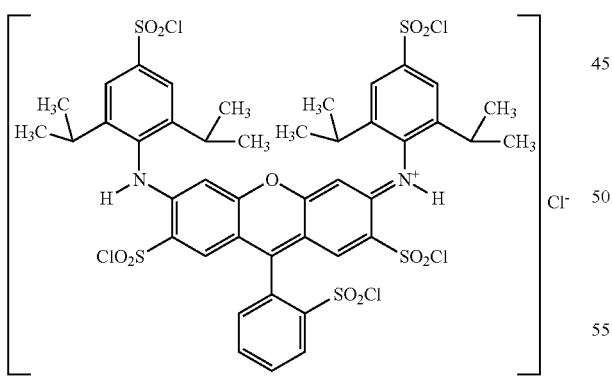
Exemplary Compound 1-19
A reaction mixture containing the following structure, which can be obtained by reacting in a ratio of 2 mols of Compound D and 1 mol of 4,4'-diaminostilbene-2,2'-disulfonic acid, and then hydrolyzing the unreacted sulfonyl=chloride with sodium hydroxide

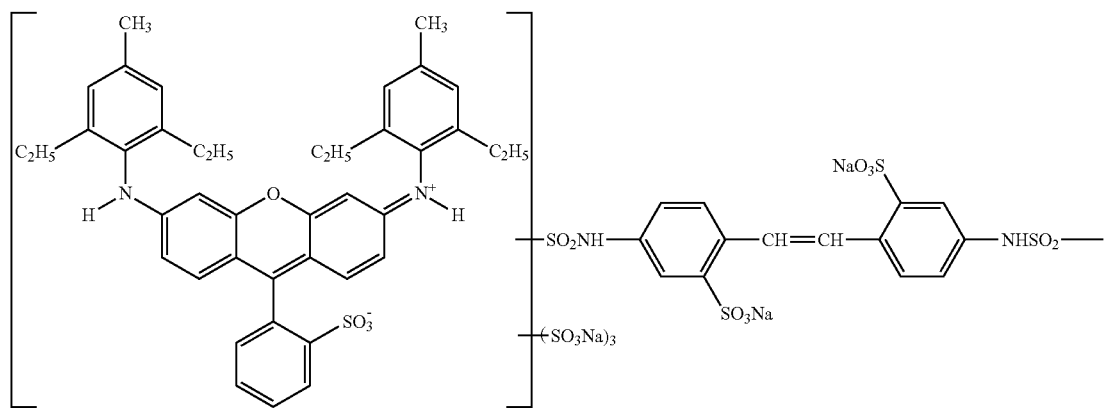
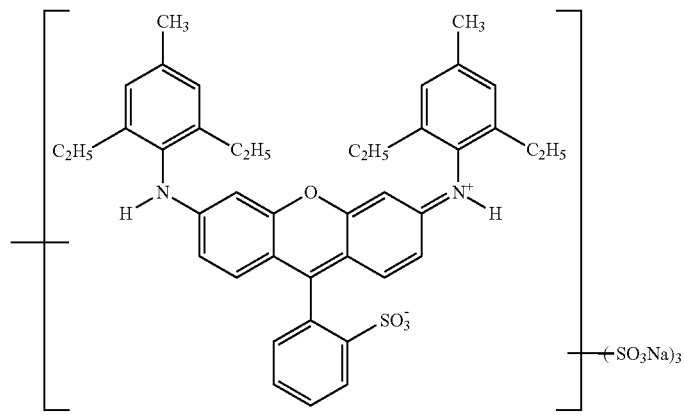
Compound D
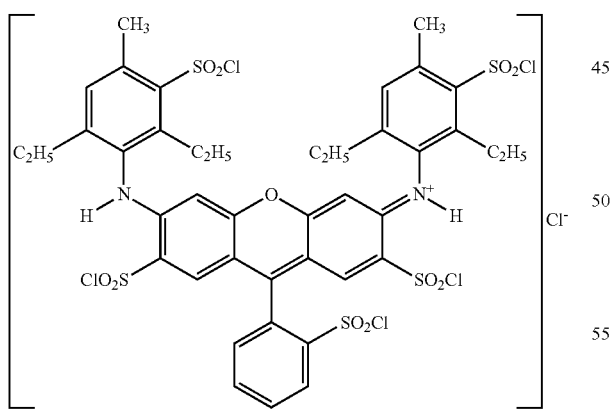
Exemplary Compound 1-20
A reaction mixture containing the following structure, which can be obtained by reacting in a ratio of 1 mol of Compound A, 1 mol of Compound B, and 1 mol of 4,4'-diaminostilbene-2,2'-disulfonic acid, and then hydrolyzing the unreacted sulfonyl=chloride with sodium hydroxide

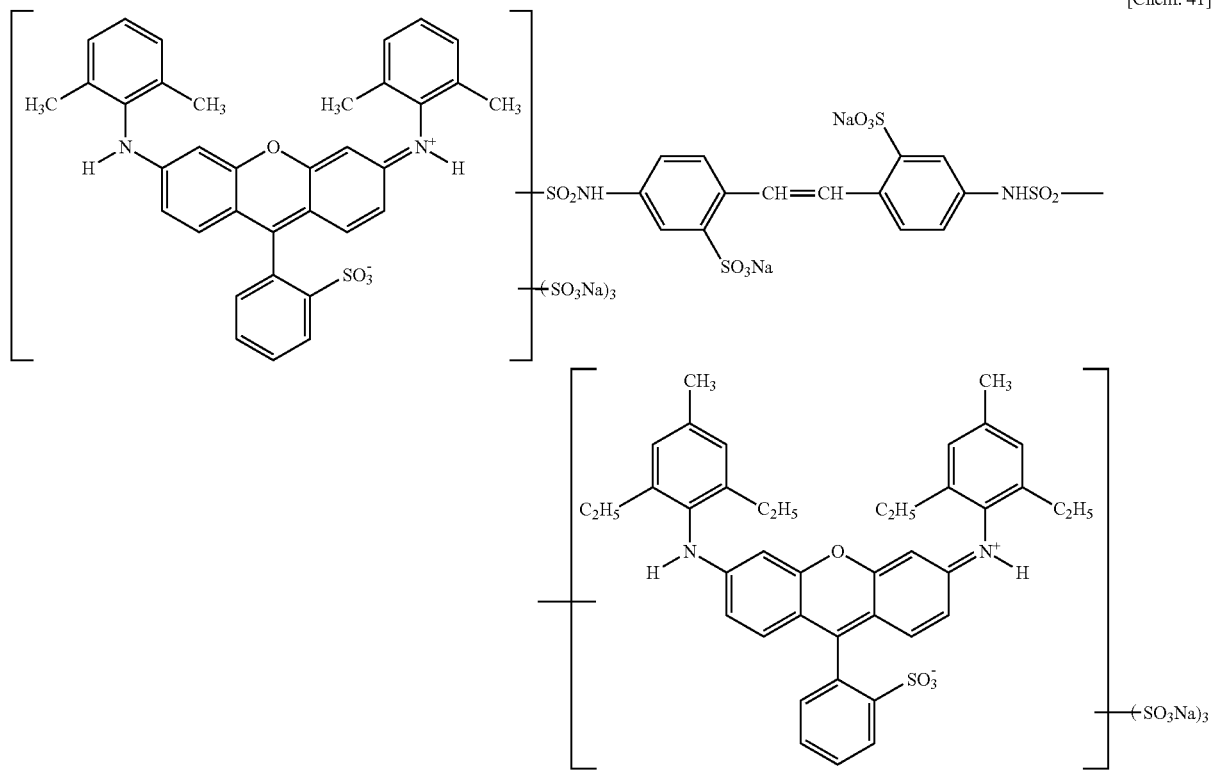
Exemplary Compound 1-21
A reaction mixture containing the following structure, which can be obtained by reacting in a ratio of 2 mols of Compound A and 1 mol of 4,4'-diaminostilbene-2,2'-disulfonic acid, and then hydrolyzing the unreacted sulfonyl=chloride with lithium hydroxide
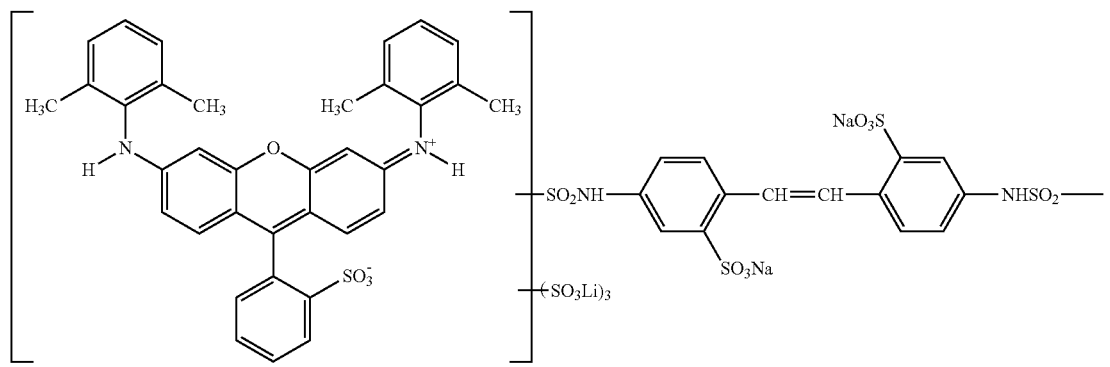

-continued

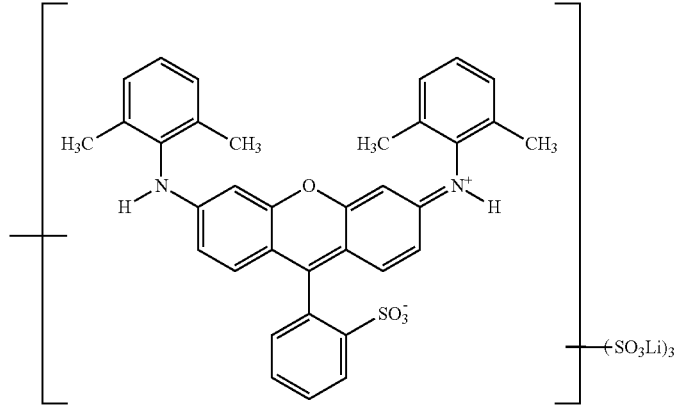

Exemplary Compound 1-22

A reaction mixture containing the following structure, which can be obtained by reacting in a ratio of 2 mols of Compound A and 1 mol of 4,4'-diaminostilbene-2,2'-disulfonic acid, and then hydrolyzing the unreacted sulfonyl=chloride with potassium hydroxide

[Chem. 43]

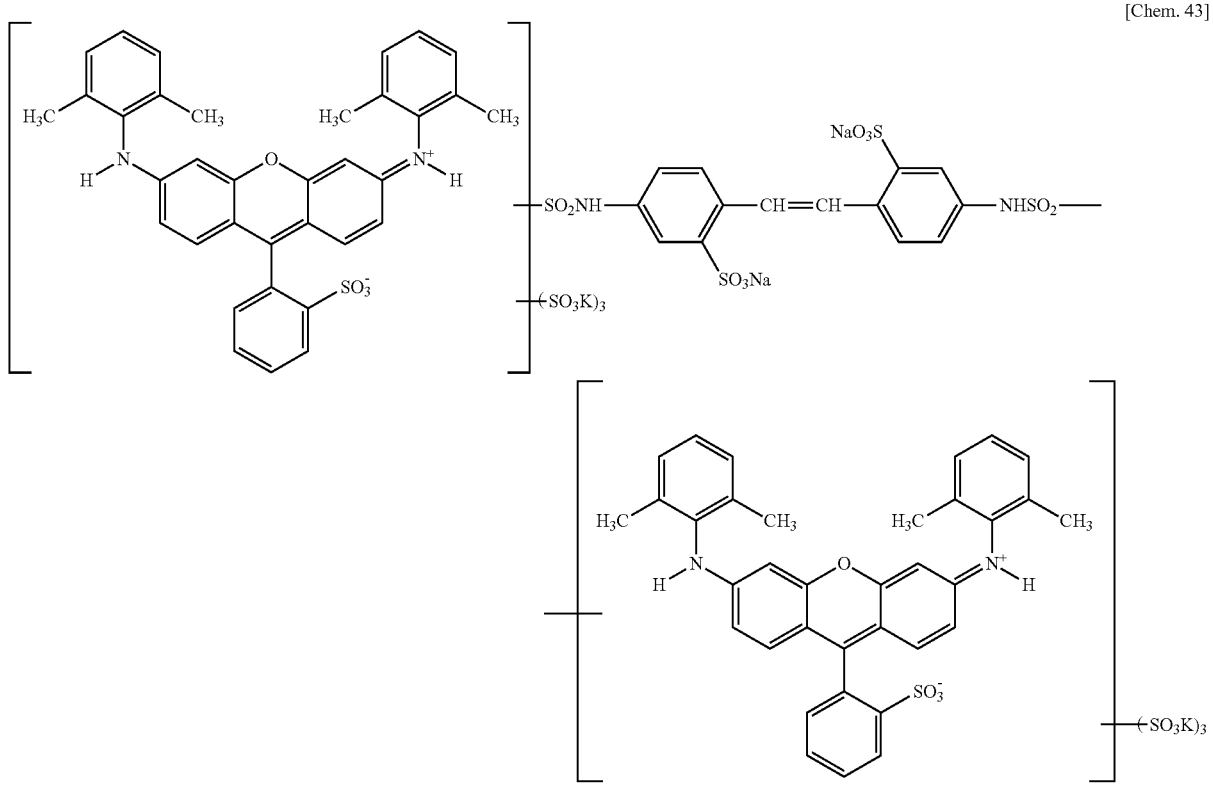

Exemplary Compound 1-23

A reaction mixture containing the following structure, which can be obtained by reacting in a ratio of 2 mols of Compound A and 1 mol of 4,4'-diaminostilbene-2,2'-disulfonic acid, hydrolyzing the unreacted sulfonyl=chloride with sodium hydroxide, and converting to an ammonium salt with an ion exchange water

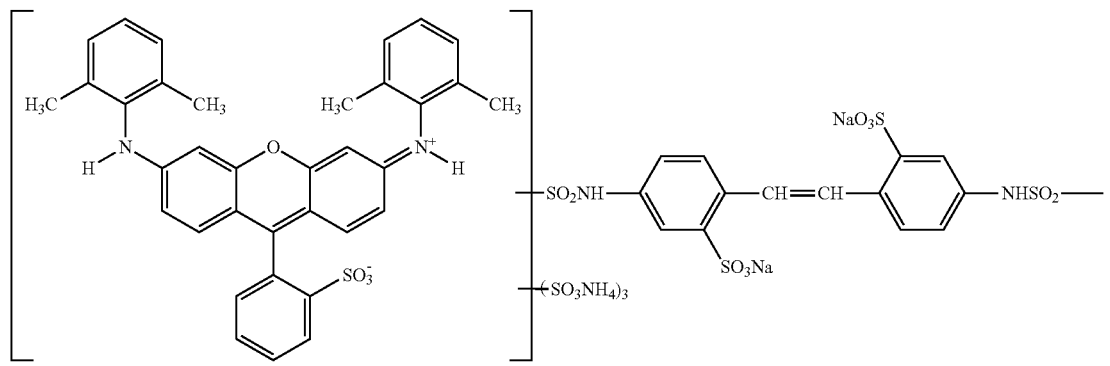
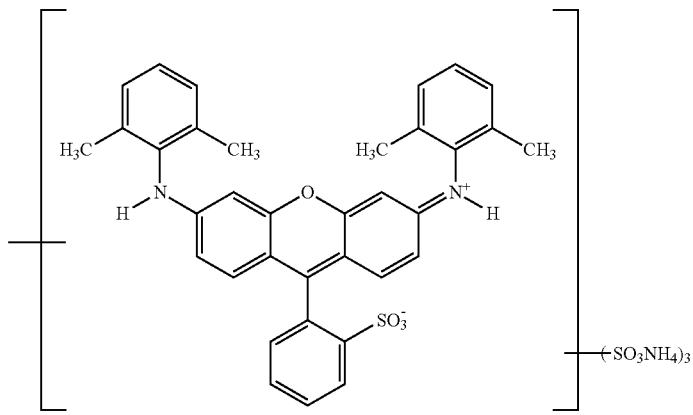
Exemplary Compound 1-24
A reaction mixture containing the following structure, which can be obtained by reacting in a ratio of 2 mols of Compound E and 1 mol of 4,4'-diaminostilbene-2,2'-disulfonic acid, and then hydrolyzing the unreacted sulfonyl=chloride with sodium hydroxide
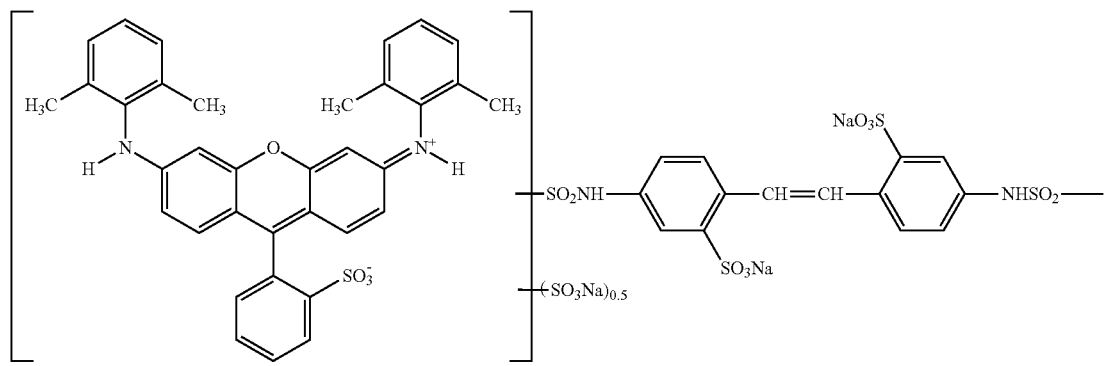

Compound E

A mixture of Compound E1 and Compound E2 in a ratio of about 1:1

(E-1)

[Chem. 46]

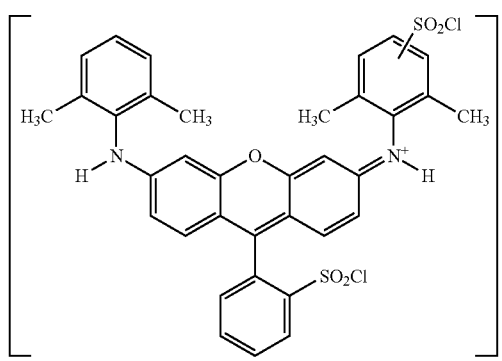

(E-2)

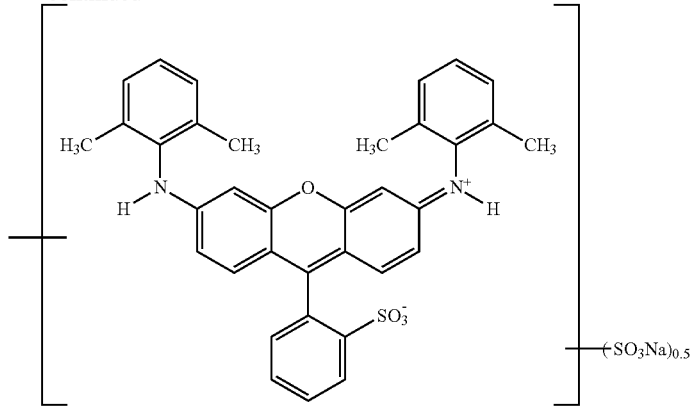

Exemplary Compound 1-25

A reaction mixture containing the following structure, which can be obtained by reacting in a ratio of 2 mols of Compound E and 1 mol of disodium 4,6-di(2-aminoethylamino)-1,3,5-triazin-2-ylaminoisophthalate, and then hydrolyzing the unreacted sulfonyl=chloride with sodium hydroxide

[Chem. 47]

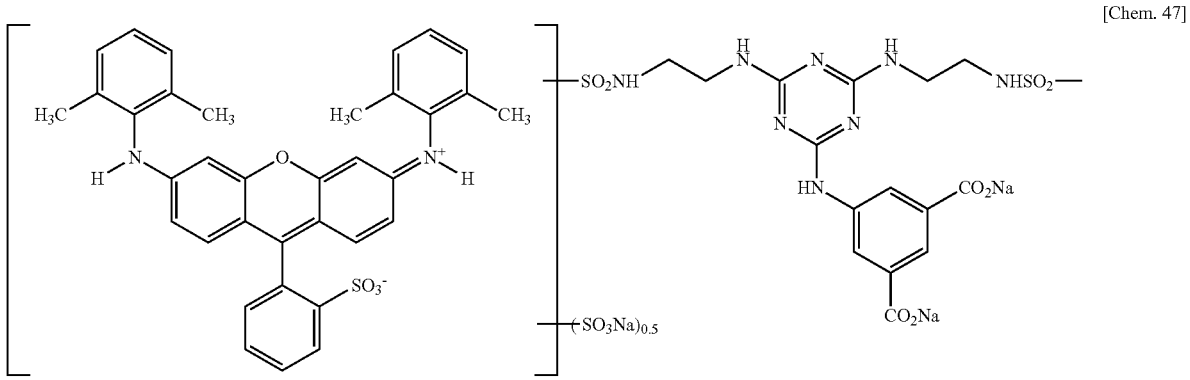

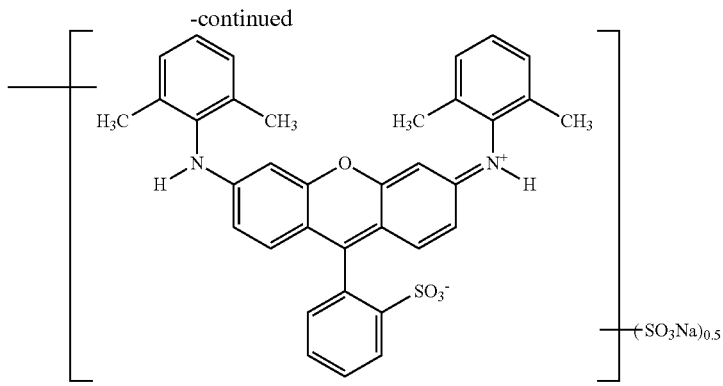

[Coloring Composition]

The coloring composition of the invention contains at least one kind of the compound represented by formula (1) of the invention. The coloring composition of the invention may contain a medium, and the coloring composition is preferred for ink for inkjet recording especially when a solvent is used as the medium. The coloring composition of the invention can be manufactured by dissolving and/or dispersing the compound of the invention in a lipophilic medium or an aqueous medium as the medium. An aqueous medium is preferably used. The coloring composition of the invention also includes a composition for ink excepting the medium.

In the invention, the content of the compound of the invention contained in the coloring composition depends upon the kind of a substituent in formula (1) to be used or the kind of a solvent component for use in manufacturing the coloring composition. However, the content of the compound represented by formula (1) or the salt thereof in the coloring composition is preferably 1% by mass to 10% by mass based on the gross mass of the coloring composition, and more preferably 2% by mass to 6% by mass.

When the content of the compound represented by formula (1) contained in the coloring composition is 1% by mass or more, the color developing property of the ink printed on a recording medium can be bettered and a required image density can also be secured. Further, when the total amount of the compound represented by formula (1) contained in the coloring composition is 10% by mass or less, preferred effects are obtained such that the discharging property of the coloring composition can be bettered and clogging of the inkjet nozzle difficultly occurs when used in an inkjet recording method.

The coloring composition of the invention may contain other additives, if necessary, in a range not impairing the advantage of the invention. As other additives, additives usable in ink for inkjet recording as described later are exemplified.

[Ink for Inkjet Recording]

Ink for inkjet recording of the invention will be described below.

The invention also relates to ink for inkjet recording containing the coloring composition of the invention.

Ink for inkjet recording can be manufactured by dissolving and/or dispersing the compound (mixture) of the invention in a lipophilic medium or an aqueous medium. Ink using an aqueous medium is preferably used.

If necessary, other additives may be contained in a range not impairing the advantage of the invention. Other additives may be known additives, such as a drying preventive (wetting agent), a discoloration inhibitor, an emulsion stabilizer, a penetration accelerator, a UV absorber, an antiseptic, an antifungal agent, a pH adjustor, a surface tension regulator, an antifoaming agent, a viscosity regulator, a dispersant, a dispersion stabilizer, a rust preventive, a chelating agent, and the like. These various kinds of additives are directly added to an ink solution in the case of water-soluble ink. When an oil-soluble dye is used in the form of a dispersing matter, the additives are generally added to the dispersing matter after preparation of the dye dispersing matter, but they may be added to an oil phase or an aqueous phase during preparation.

The drying preventive is preferably used for the purpose of preventing clogging due to drying of the ink for inkjet recording at the ink discharging port of a nozzle used in an inkjet recording method.

The drying preventive is preferably a water-soluble organic solvent having vapor pressure lower than that of water. The specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane, lower alkyl ethers of polyhydric alcohol such as ethylene glycol monomethyl (or ethyl)ether, diethylene glycol monomethyl (or ethyl) ether, and triethylene glycol monoethyl (or butyl)ether, heterocyclic rings such as 2-pyrrolidone, N-methyl-2-pyrrolidone, 1,3-dimethyl-2-imidazolidinone, and N-ethylmorpholine, sulfur-containing compounds such as sulfolane, dimethyl sulfoxide, and 3-sulfolene, polyfunctional compounds such as diacetone alcohol, and diethanolamine, and a urea derivative. Of these drying preventives, polyhydric alcohols such as glycerin and diethylene glycol are more preferred. These drying preventives may be used alone, or in combination of two or more kinds. It is preferred to contain these drying preventives in an amount of 10% by mass to 50% by mass in the ink.

The penetration accelerator is preferably used for the purpose of well penetrating the ink for inkjet recording through paper. The examples of usable penetration accelerators include alcohols such as ethanol, isopropanol, butanol, di(tri)ethylene glycol monobutyl ether, 1,2-hexanediol, and the like, sodium lauryl sulfate, sodium oleate, and nonionic surfactants. When the penetration accelerator is contained in the ink in an amount of 5% by mass to 30% by mass, sufficient effects are obtained, and it is preferred to use them in a range not causing a blotting of printing and print through.

The UV absorber is used for the purpose of improving the preservation stability of an image. The examples of the UV absorbers usable in the invention include benzotriazole-based compounds described in JP-A-58-185677, JP-A-61-190537, JP-A-2-782, JP-A-5-197075, and JP-A-9-34057, benzophenone-based compounds described in JP-A-46-2784, JP-A-5-

194483, and U.S. Pat. No. 3,214,463, cinnamic acid-based compounds described in JP-B-48-30492 (the term "JP-B" as used herein refers to an "examined Japanese patent publication"), JP-B-56-21141, and JP-A-10-88106, triazine-based compounds described in JP-A-4-298503, JP-A-8-53427, JP-A-8-239368, JP-A-10-182621, and JP-T-8-501291 (the term "JP-T" as used herein refers to a "published Japanese translation of a PCT patent application"), and a compound absorbing UV rays to emit fluorescent rays, i.e., what is called a fluorescent brightening agent represented by the compounds described in Research Disclosure, No. 24239, a stilbene-based compound and a benzoxazole-based compound.

The discoloration inhibitor is used for the purpose of improving the preservation stability of an image. As the discoloration inhibitor, various kinds of organic-based and metal complex-based discoloration inhibitors can be used. The examples of the organic-based discoloration inhibitors include hydroquinones, alkoxyphenols, dialkoxyphenols, phenols, anilines, amines, indanes, chromans, alkoxyanilines, and heterocyclic rings, and the metal complexes are nickel complexes and zinc complexes. More specifically, the compounds described in the patents cited in Research Disclosure, No. 17643, Paragraphs I to J of VII, ibid., No. 15162, ibid., No. 18716, p. 650, left column, ibid., No. 36544, p. 527, ibid., No. 307105, p. 872, and ibid., No. 15162, and the compound included in the formula of a representative compound and the examples of the compound described in JP-A-62-215272, pp. 127 to 137 may be used.

The examples of the antifungal agents include sodium dehydroacetic acid, sodium benzoate, sodium pyridinethione-1-oxide, ethyl ester p-hydroxybenzoate, 1,2-benzisothiazolin-3-one and the salt thereof. It is preferred to use the antifungal agent in an amount of 0.02% by mass to 1.00% by mass in the ink.

As the pH adjustor, the above neutralizer (organic base, inorganic alkali) may be used. The pH adjustor is added for the purpose of improving the preservation stability of the ink for inkjet recording, and preferably added so as to reach the pH of the ink for inkjet recording of 6 to 10, and more preferably 7 to 10.

As the surface tension regulator, nonionic, cationic and anionic surfactants are exemplified. Incidentally, the surface tension of the ink for inkjet recording of the invention is preferably 25 mN/m to 70 mN/m, and more preferably 25 mN/m to 60 mN/m. Further, the viscosity of the ink for inkjet recording of the invention is preferably 30 mPa·s or less, and more preferably to be adjusted to 20 mPa·s or less. The preferred examples of the surfactants include anionic surfactants such as a fatty acid salt, alkylsulfuric ester, alkylbenzenesulfonate, alkylnaphthalenesulfonate, dialkylsulfosuccinate, alkylphosphate, a naphthalene sulfonic acid formalin condensate, and polyoxyethylenealkylsulfate, and nonionic surfactants such as polyoxyethylene alkyl ether, polyoxyethylene alkylaryl ether, polyoxyethylene fatty acid ester, sorbitan fatty acid ester, polyoxyethylene sorbican fatty acid ester, polyoxyethylene alkylamine, glycerin fatty acid ester, and oxyethylene oxypropylene block copolymer. Further, SUR-FYNOLS (Air Products & Chemicals) that is an acetylene-based polyoxyethylene oxide surfactant is also preferably used. In addition, an amine oxide type ampholytic surfactant such as N,N-dimethyl-N-alkylamine oxide is also preferably used. Further, those exemplified as surfactants in JP-A-59-157636, pp. 37 and 38, and Research Disclosure, No. 308119 (1989) can also be used.

As the antifoaming agent, a fluorine-based compound, a silicone-based compound and a chelating agent represented by EDTA can also be used, if necessary.

When the compound of the invention is dispersed in an aqueous medium, it is preferred to disperse colored fine particles containing the compound and an oil-soluble polymer in an aqueous medium as described in JP-A-11-286637, Japanese Patent Application Nos. 2000-78491, 2000-80259, and 2000-62370, or to disperse the compound of the invention dissolved in a high boiling temperature organic solvent in an aqueous medium as described in Japanese Patent Application Nos. 2000-78454, 2000-78491, 2000-203856 and 2000-203857. In the case where the compound of the invention is dispersed in an aqueous medium, in connection with a specific method, an oil-soluble polymer, a high boiling temperature organic solvent, additives, and the amounts thereof to be used, the above patents can be preferably referred to. Alternatively, the compound of the invention may be dispersed in a solid fine particle state. At the time of dispersion, a dispersant and a surfactant may be used. As a dispersing device, a simple stirrer or impeller stirring type, an inline stirring type, a mill type (e.g., a colloid mill, a ball mill, a sand mill, an attritor, a roll mill, an agitator mill and the like), an ultrasonic type, and a high pressure emulsification and dispersion type (a high pressure homogenizer: a Gaulin homogenizer, a microfluidizer, a DeBEE2000 or the like as specific commercially available devices) can be used. The manufacturing method of the ink for inkjet recording is described in detail in JP-A-5-148436, JP-A-5-295312, JP-A-7-97541, JP-A-7-82515, JP-A-7-118584, JP-A-11-286637, and Japanese Patent Application No. 2000-87539 in addition to the above patent documents, and these methods may be used in the preparation of the ink for inkjet recording of the invention.

As the aqueous medium, a mixture containing water as the main component, to which a water-miscible organic solvent is added, according to necessity, may be used. The examples of the water-miscible organic solvents include alcohols (e.g., methanol, ethanol, propanol, isopropanol, butanol, isobutanol, ssec-butanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyl-diethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents may be used in combination of two or more.

It is preferred that the compound of the invention is contained in an amount of 0.2 parts by mass or more and 10 parts by mass or less in 100 parts by mass of the ink for inkjet recording of the invention, and more preferably 1 part by mass or more and 6 parts by mass or less. Further, the ink for inkjet recording of the invention may use other colorant together with the compound of the invention. When two or more kinds of colorants are used in combination, the sum total of the contents of the colorants preferably comes into the above range.

The viscosity of the ink for inkjet recording of the invention is preferably 30 mPa·s or less. The surface tension of the ink for inkjet recording of the invention is preferably 25 mN/m or more and 70 mN/m or less. The viscosity and surface tension can be regulated by the addition of various additives, such as a viscosity regulator, a surface tension regulator, a specific resistance regulator, a film regulator, a UV absorber, an antioxidant, a discoloration inhibitor, an antifungal agent, a rust preventive, a dispersant, and a surfactant.

The ink for inkjet recording of the invention can be used not only in monochromatic image formation but also in full color image formation. For forming a full color image, a magenta tone ink, a cyan tone ink and a yellow tone ink can be used, and for regulating the tone, a black tone ink may also be used.

As applicable yellow dyes, arbitrary yellow dyes can be used. The examples of such yellow dyes include an aryl or heterylazo dye having heterocyclic rings such as, for example, phenols, naphthols, anilines, pyrazolone, or pyridone, ring-opening type active methylene compounds or the like as a coupling component (hereinafter referred to as a coupler component); an azomethine dye having, for example, ring-opening type active methylene compounds or the like as a coupler component; a methine dye such as, for example, a benzylidene dye and a monomethineoxonol dye; and a quinone-based dye such as, for example, a naphthoquinone dye and an anthraquinone dye. The examples of the dyes other than the above include a quinophthalone dye, a nitro.nitroso dye, an acridine dye, an acrydinone dye and the like.

As applicable magenta dyes, arbitrary magenta dyes can be used. The examples of such magenta dyes include an aryl or heterylazo dye having phenols, naphthols, or anilines as a coupler component; a methine dye such as, for example, an arylidene dye, a styryl dye, a merocyanine dye, a cyanine dye, and an oxonol dye; a carbonium dye such as a diphenylmethane dye, a triphenylmethane dye, and a xanthene dye; and a quinone dye such as naphthoquinone, anthraquinone and anthrapyridone; and a condensed polycyclic dye such as, for example, dioxazine dye.

As applicable cyan dyes, arbitrary cyan dyes can be used. The examples of such cyan dyes include an aryl or heterylazo dye having phenols, naphthols, or anilines as a coupler component; an azomethine dye having heterocyclic rings such as, for example, phenols, naphthols, or pyrrotriazole as a coupling component; a polymethine dye such as a cyanine dye, an oxonol dye, and a merocyanine dye; a carbonium dye such as a diphenylmethane dye, a triphenylmethane dye, and a xanthene dye; a phthalocyanine dye; an anthraquinone dye; an indigo.thioindigo dye.

Each of the above dyes may be a dye which shows each color of yellow, magenta and cyan for the first time after dissociation of a portion of the chromophore. In this case, the counter cation may be an inorganic cation such as alkali metal or ammonium, an organic cation such as pyridinium or a quaternary ammonium salt, or may be a polymer cation having the cation as a partial structure.

As applicable black coloring materials, a dispersing element of carbon black can be exemplified in addition to disazo, trisazo and tetraazo dyes.

[Inkjet Recording Method]

The invention also relates to an inkjet recording method for forming an image with the coloring composition or the ink for inkjet recording of the invention.

The inkjet recording method of the invention gives energy to the ink for inkjet recording and form an image on known image-receiving materials, that is, plain paper, resin-coated paper, exclusive inkjet paper as described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, paper for electrophotography, cloth, glass, metal, ceramic, and the like.

In forming an image, polymer particle dispersion (also referred to as polymer latex) may be used in combination for the purpose of giving gloss and water resistance or improving weather resistance. The polymer latex may be added to the image-receiving material at any time of before, after, or at the same time with the application of a colorant. Accordingly, the polymer may be added to the image-receiving paper, into the ink, or may be used alone as a liquid. Specifically, the methods described in Japanese Patent Application Nos. 2000-363090, 2000-315231, 2000-354380, 2000-343944, 2000-268952, 2000-299465, 2000-297365 and the like can be preferably used.

The recording paper and the recording film for use in inkjet printing with the ink of the invention will be described below.

The support in the recording paper and the recording film is formed of chemical film such as LBKP, NBKP or the like, mechanical pulp such as GP, PGW, RMP, TMP, CTMP, CMP, CGP or the like, or used paper pulp such as DIP or the like, and supports mixed with various known additives, according to necessity, such as a pigment, a binder, a sizing agent, a fixing agent, a cationic agent, a paper strength intensifier and manufactured with various kinds of machines such as fourdrinier paper machine and cylinder paper machine may be used. In addition to the above supports, any of synthetic paper and a plastic film sheet may be used, and the thickness of the support is preferably 10 μm to 250 μm, and the weighing is 10 g/m$^2$ to 250 g/m$^2$.

The support may be directly provided with an ink-receiving layer and a back-coat layer, or may provided with an ink-receiving layer and a back-coat layer after size press with starch, polyvinyl alcohol and the like, or providing an anchor layer. Further, the support may be subjected to flattening treatment by calender device such as machine calender, TG calender, soft calender or the like. In the invention, paper and a plastic film the both sides of which are laminated with polyolefin (e.g., polyethylene, polystyrene, polyethylene terephthalate, polybutene, and copolymers thereof) are more preferably used as the support.

It is preferred to add a white pigment (e.g., titanium oxide, zinc oxide) or a tinting dye (e.g., cobalt blue, ultramarine blue, neodymium oxide) into polyolefin.

The ink-receiving layer provided on the support contains a pigment or an aqueous binder. The pigment is preferably a white pigment. The examples of the white pigments include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate and the like, and organic pigments such as a styrene-based pigment, an acrylic pigment, a urea resin, a melamine resin and the like. As the white pigments to be contained in the ink-receiving layer, porous inorganic pigments are preferably used, and synthetic amorphous silica having a large pore area is especially preferred. As the synthetic amorphous silica, both of silicic acid anhydride obtained by a dry manufacturing method and silicic acid hydrate obtained by a wet manufacturing method can be used, but it is especially preferred to use silicic acid hydrate.

The examples of the aqueous binders to be contained in the ink-receiving layer include water-soluble polymers such as polyvinyl alcohol, silanol-modified polyvinyl alcohol, starch, cationic starch, casein, gelatin, carboxymethyl cellulose, hydroxyethyl cellulose, polyvinyl pyrrolidone, polyalkylene oxide, polyalkylene oxide derivatives and the like, and water-dispersible polymers such as a styrene-butadiene latex, acryl emulsion and the like. These aqueous binders may be used alone, or two or more may be used in combination. Of these binders, polyvinyl alcohol and silanol-modified polyvinyl alcohol are especially preferably used in the invention in the point of an adhering property to pigment and peeling resisting property of the ink-receiving layer.

In addition to pigments and aqueous binders, the ink-receiving layer may contain a mordant, a water resisting agent, a light fastness improving agent, a surfactant and other additives.

It is preferred that the mordant to be added to the ink-receiving layer is immobilized. A polymer mordant is preferably used for that purpose.

Polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. The image-receiving materials containing a polymer mordant described in JP-A-1-161236, pp. 212 to 215 are especially preferred. By using the polymer mordants in the same patent, images having excellent image quality are obtained and light fastness of the images is improved.

The water resisting agent is effective for the water resistance of an image, and a cationic resin is especially preferred as the water resisting agent. The examples of the cationic resins include polyamide polyamine epichlorohydrin, polyethyleneimine, polyaminesulfone, a dimethyldiallylammonium chloride polymer, cationic polyacrylamide, colloidal silica and the like, and of these cationic resins, polyamide polyamine epichlorohydrin is especially preferred. The content of the cationic resin is preferably 1% by mass to 15% by mass based on the total solids content of the ink-receiving layer, and especially preferably 3% by mass to 10% by mass.

As the light fastness improving agent, zinc sulfate, zinc oxide, hindered amine-based antioxidants, benzotriazole-based UV absorbers such as benzophenone and the like are exemplified, and zinc sulfate is especially preferred of these.

The surfactant functions as a coating assistant, a peeling improver, a slipping improver, or an antistatic agent. Surfactants are described in JP-A-62-173463 and JP-A-62-183457. An organic fluoro compound may be used in place of the surfactant. The organic fluoro compound is preferably hydrophobic. The examples of the organic fluoro compounds include fluorine-based surfactants, oily fluorine-based compounds (e.g., fluorine oil), and a solid state fluorine compound resin (e.g., ethylene tetrafluoride resin). Organic fluoro compounds are described in JP-B-57-9053 (columns 8 to 17), JP-A-61-20994 and JP-A-62-135826. The examples of other additives to be added to the ink-receiving layer include a pigment dispersant, a thickener, an antifoaming agent, a dye, a fluorescent brightening agent, an antiseptic, a pH adjustor, a matting agent, a hardening agent and the like. The ink-receiving layer may comprise one layer or two layers.

Recording paper and a recording film may be provided with a back-coat layer, and a white pigment, an aqueous binder, and other components are the components that may be added at that time. The examples of the white pigments to be contained in the back-coat layer include, for example, white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like, and organic pigments such as a styrene-based plastic pigment, an acrylic plastic pigment, polyethylene, microcapsules, a urea resin, a melamine resin, and the like.

The examples of the aqueous binders that may be contained in the back-coat layer include water-soluble polymers such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose, polyvinyl pyrrolidone, and the like, and water-dispersible polymers such as a styrene butadiene latex, acryl emulsion, and the like. As other components contained in the back-coat layer, an antifoaming agent, a foaming inhibitor, a dye, a fluorescent brightening agent, an antiseptic, a water resisting agent, and the like are exemplified.

A polymer latex may be added to the constituting layers (including the back-coat layer) of the inkjet recording paper and the recording film. The polymer latex is used for the purpose of the improvement of physical properties of the layer such as dimensional stabilization, curling prevention, adhesion prevention, and cracking prevention of the layer. Polymer latexes are described in JP-A-62-245258, JP-A-62-136648 and JP-A-62-110066. Cracking and curling of the layer can be prevented by the addition of a polymer latex having a low glass transition temperature (40° C. or less) to the layer containing a mordant. Curling can also be prevented by the addition of a polymer latex having a high glass transition temperature to the back-coat layer.

The ink of the invention is used in any of the following known methods irrespective of inkjet recording method, for example, a charge control method of discharging ink by utilizing electrostatic force, a drop-on-demand method (a pressure pulse method) of utilizing vibration pressure of a piezo element, a sound inkjet method of discharging ink by using radiation pressure by converting an electric signal to a sound beam and irradiating ink with the beam, and a thermal injection method of heating ink to generate bubbles and utilizing the caused pressure. The inkjet recording method includes a method of injecting ink called photo ink which is low in concentration in a plurality of small volumes, a method of improving image quality by using a plurality of inks having substantially the same hue and different concentrations, and a method of using colorless and transparent ink.

[Color Filter]

The invention also relates to a color filter containing the compound represented by formula (1).

The method of forming a color filter includes a method of forming a pattern with a photoresist in the first place and then dyeing the pattern, and a method of forming a pattern with a photoresist to which a colorant has been added as described in JP-A-4-163552, JP-A-4-128703 and JP-A-4-175753. Either method may be used in introducing the compound of the invention into a color filter, but as a preferred color filter-forming method, the following method, described in JP-A-4-175753 and JP-A-6-35182, is exemplified, which method comprises coating a positive resist composition containing a thermosetting resin, a quinonediazide compound, a crosslinking agent, a colorant and a solvent on a substrate, exposing the resist through a mask, developing the exposed part to thereby form a positive resist pattern, entirely exposing the positive resist pattern, and then hardening the positive resist pattern after exposure. Also, a black matrix is formed according to ordinary method, and a color filter of RGB primary colors or Y, M, C complementary colors can be obtained. In the case of the color filter, the use amount of the compound of the invention is also not restricted but the amount is preferably 0.1% by mass to 50% by mass.

Concerning the thermosetting resin, quinonediazide compound, crosslinking agent and solvent and the use amounts thereof, those described in the above patents can be preferably used.

[Color Toner]

The invention also relates to a color toner containing the compound represented by formula (1).

The content of the compound of the invention in 100 parts by mass of the color toner is not especially restricted, but is preferably 0.1 parts by mass or more, more preferably 1 part by mass to 20 parts by mass, and most preferably 2 parts by mass to 10 parts by mass. As the binder resin for a color filter to which the compound of the invention is introduced, every binder resin generally used can be used. For example, a styrene resin, an acrylic resin, a styrene/acrylic resin, and a polyester resin are exemplified.

For the purpose of the improvement of flowability and charge control, inorganic and organic powders may be externally added to the toner. Silica particles and titania particles the surfaces of which are treated with an alkyl group-containing coupling agent and the like are preferably used. Particles having a number average primary particle size of 10 nm to 500 nm are preferably used, and these particles are preferably contained in the toner in an amount of 0.1% by mass to 20% by mass.

Every release agent conventionally used as a release agent. Specifically, olefins such as low molecular weight polypropylene, low molecular weight polyethylene, ethylene-propylene copolymer, and the like, and paraffin waxes such as microcrystalline wax, carnauba wax, Sasolwax, paraffin wax, and the like are exemplified. The addition amount of these release agents in the toner is preferably 1% by mass to 5% by mass.

A charge controlling agent may be used according to necessity, but colorless ones are preferred from the point of color developing property. For example, those having a quaternary ammonium salt structure and a calixarene structure are exemplified.

As the carrier, either of uncoated carriers comprised of magnetic material particles alone, such as iron, ferrite, or resin-coated carriers comprising magnetic material particles the surfaces of which are coated with a resin may be used. The average particle size of these carriers is preferably 30 μm to 150 μm in terms of volume average particle size.

The image-forming method using the toner is not especially restricted, and, for example, a method of repeatedly forming a color image on a photoreceptor, and then transferring the formed image to form an image, and a method of transferring an image formed on a photoreceptor one after another to an intermediate transfer member to form a color image on the intermediate transfer member, and then transferring the image formed on the intermediate transfer member to an image-forming material such as paper or the like to thereby form an image are exemplified.

EXAMPLE

Synthesis Example

The synthesizing methods of the compounds of the invention (mixture) will be described in detail in the examples, but the invention is by no means restricted thereto. In the examples, "%" and "parts" means % by mass and parts by mass, unless otherwise indicated.

Synthesis of Exemplary Compound 1

[Chem. 48]

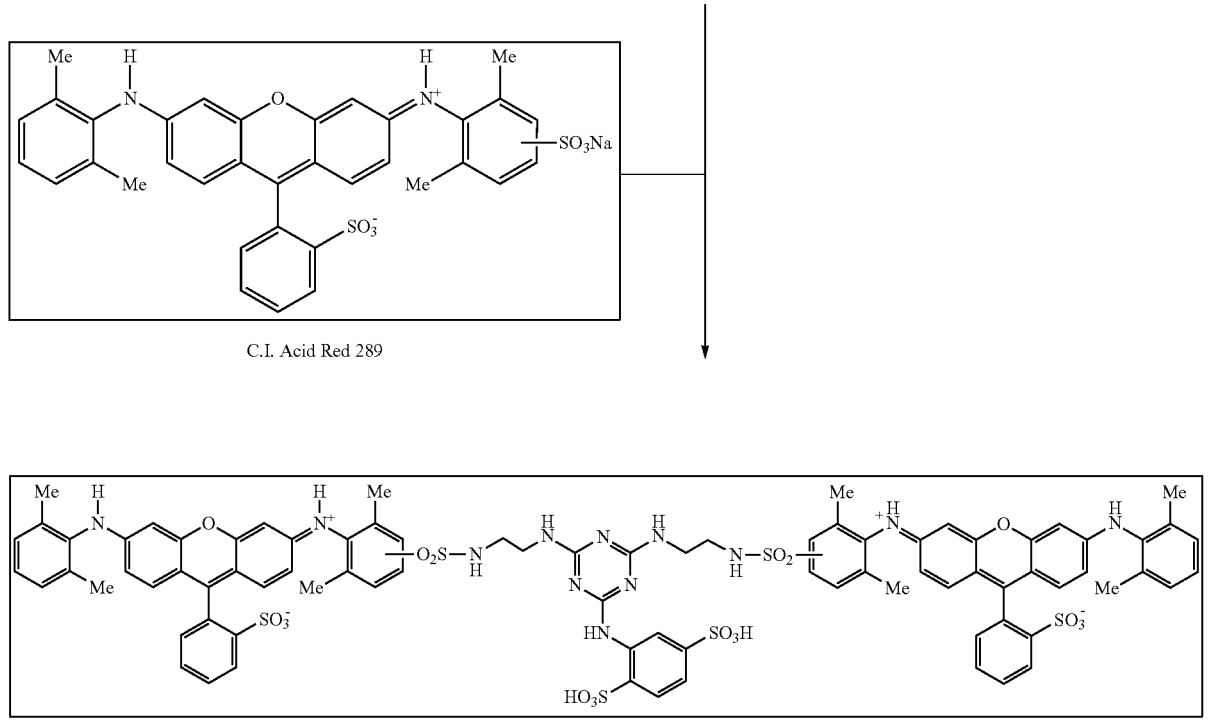

C.I. Acid Red 289

Exemplary compound 1

Synthesis of Synthetic Intermediate A 5.5 g of cyanuric chloride and two or three drops of Calsolene oil were added to 20 g of ice water and stirred at a temperature of 10° C. or lower. A solution obtained by dissolving 8.4 g of monosodium aniline-2,5-disulfonate in 30 g of water with a 2N sodium hydroxide aqueous solution was dripped thereto with maintaining the temperature at 10° C. or lower. While maintaining the pH of the reaction solution at 4.5 with 2N sodium hydroxide, after the reaction system was reacted for 2 hours at the inner temperature of 10° C. or lower, insoluble matter was filtered out through GF/F filter (manufactured by Whatman) (Reaction Solution 1).

In a different vessel, 18 g of ethylenediamine was dissolved in 100 g of water, and Reaction Solution 1 was slowly dripped thereto over 2 hours while stirring the solution at the inner temperature of 50° C. After termination of dripping, the system was allowed to react for 1 hour at 50° C. The volume of the reaction solution at that time was about 300 mL. Sodium chloride of 75 g was added thereto, and the temperature was lowered to room temperature. The pH of the system was adjusted to 1 with aqueous hydrochloric acid. The crystal precipitated was filtered and washed with cooled saturated brine and acetone in order, dried at 50° C. to obtain 16 g of white crystal of Synthetic Intermediate A. As a result of MS spectrum, 447 corresponding to (M—H)⁻ of the compound was observed. Also, from the result of elemental analysis, the percentage content of Synthetic Intermediate A was estimated to be 88%.

Synthesis of Exemplary Compound 1

To 50 mL of thionyl chloride, 6.8 g of Acid Red 289 (manufactured by Tokyo Chemical Industry Co., Ltd.) and N,N-dimethylformamide were carefully added, and the mixture was subjected to reaction at the inner temperature of 55° C. for 2 hours. After termination of the reaction, the inner temperature was lowered to 30° C., the reaction solution was dripped into 500 mL of ice water, and the precipitated crystal was sufficiently washed with cooled saturated brine (Paste B).

In a different vessel, 2.8 g of Synthetic Intermediate A was added to 100 mL of water, and the pH was adjusted to 8.5 with a 2N sodium hydroxide aqueous solution. The gross amount of Paste B was added thereto, the pH was adjusted to 9.0 with a 2N sodium hydroxide aqueous solution, and the reaction system was allowed to react overnight at 50° C. with maintaining this pH value. The volume of the reaction solution at that time was about 150 mL. Sodium chloride of 45 g was added thereto, and the pH was adjusted to 1.0 with aqueous hydrochloric acid. The crystal precipitated was filtered and the obtained crystal was purified by column chromatography using Sephadex LH-20 (manufactured by Pharmacia) as filler to obtain 6.3 g of green metallic lustrous crystal of Exemplary Compound 1 of the invention. As a result of MS spectrum, 860 corresponding to $(M-2H/2)^-$ of the compound was observed. The absorption maximum wavelength of the compound in the aqueous solution was 532 nm.

Synthesis of Exemplary Compound 6

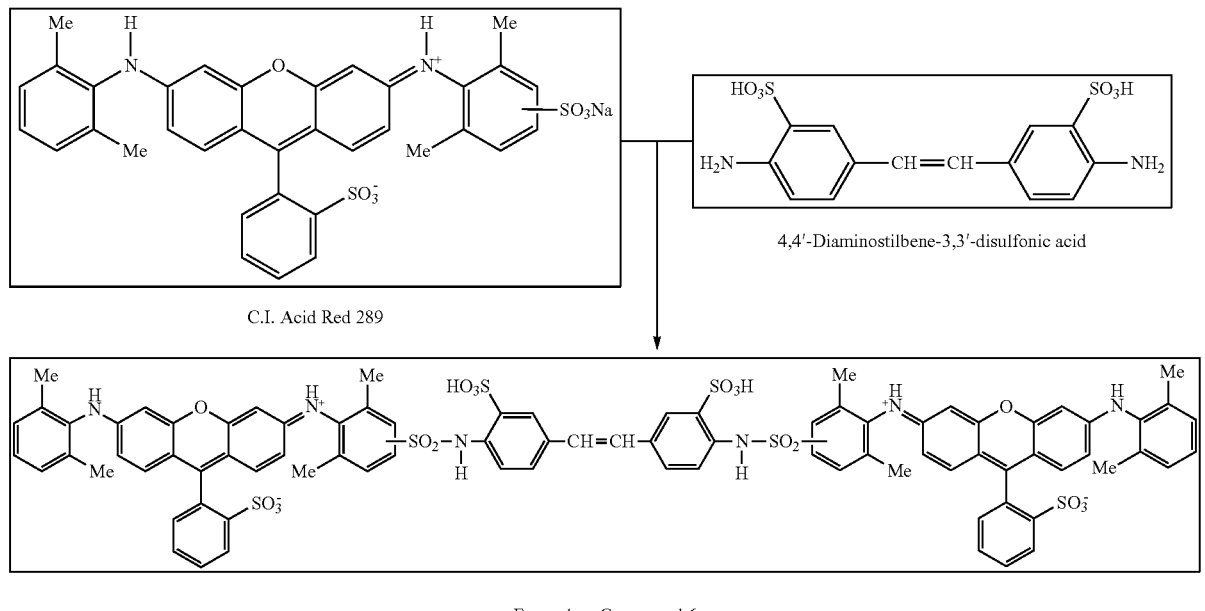

Exemplary Compound 6

To 50 mL of thionyl chloride, 6.8 g of Acid Red 289 (manufactured by Tokyo Chemical Industry Co., Ltd.) and N,N-dimethylformamide were carefully added, and the mixture was subjected to reaction at the inner temperature of 55° C. for 2 hours. After termination of the reaction, the inner temperature was lowered to 30° C., the reaction solution was dripped into 500 mL of ice water, and the precipitated crystal was sufficiently washed with cooled saturated brine (Paste B).

In a different vessel, 1.8 g of 4,4'-diaminostilbene-3,3'-disulfonic acid was added to 100 mL of water, and the pH was adjusted to 8.5 with a 2N sodium hydroxide aqueous solution. The gross amount of Paste B was added thereto, the pH was adjusted to 9.0 with a 2N sodium hydroxide aqueous solution, and the reaction system was allowed to react overnight at 50° C. with maintaining this pH value. The volume of the reaction solution at that time was about 280 mL. Sodium chloride of 70 g was added thereto, and the pH was adjusted to 1.0 with aqueous hydrochloric acid. The crystal precipitated was filtered and the obtained crystal was purified by column chromatography using Sephadex LH-20 (manufactured by Pharmacia) as filler to obtain 5.2 g of green metallic lustrous crystal of Exemplary Compound 6 of the invention. As a result of MS spectrum, 821 corresponding to (M−2H/2)⁻ of the compound was observed. The absorption maximum wavelength of the compound in the aqueous solution was 534 nm.

Synthesis of Exemplary Compound 1-1

Into a three-necked flask having a capacity of 500 mL were put 120 g of chlorosulfonic acid and 12.4 g of phosphorus oxychloride, and after 19 g of Acid Red 289 (percentage content: 71%, manufactured by Chugai Seiyaku Kabushiki Kaisha) was carefully added thereto in installments with stirring, the reaction system was allowed to react at 70° C. for 1 hour. After the reaction solution was cooled to room temperature, the reaction solution was carefully poured into a 2 L beaker where 600 g of ice was stirred, and solids were precipitated. The precipitated solids were filtered out and washed with a saturated brine of 10° C. or lower, thus 80.4 g of the wet cake of Compound A was obtained.

In a three-necked flask having a capacity of 1 liter, 80.4 g of the wet cake was dispersed by adding 450 g of ice water at 5° C. or lower, and a solution obtained by dissolving 3.9 g of 4,4'-diaminostilbene-2,2'-disulfonic acid (95%, manufactured by Acros Organics) in 60 mL of water and adjusting pH to 9.0 with a 2N sodium hydroxide aqueous solution was added to the above dispersion, and the temperature was raised to 50° C. While maintaining the pH at 9 with the 2N sodium hydroxide aqueous solution, the reaction solution was subjected to stirring at 50° C. until the time when pH variation stopped, and after that stirring was continued at 50° C. for further 1 hour.

The reaction solution was filtered through GF/F filter (manufactured by Whatman) to remove insoluble matters. Sodium chloride corresponding to 25% by weight of the total weight of the obtained filtrate was added thereto, and the pH was adjusted to 4 with concentrated hydrochloric acid with stirring at room temperature to thereby precipitate solids. The precipitated solids were filtered out, and the obtained solids were dispersed in 600 mL of water. The pH of the dispersion was adjusted to 9 with 2N sodium hydroxide and dissolved, and then desalted with a dialysis tube until the time when the electric conductivity reached 10 μS or less, and again filtered through GF/F filter to remove dusts. The obtained filtrate was concentrated and dried at 60° C., thus 17.4 g of green lustrous crystal of Exemplary Compound 1-1 was obtained.

As a result of measurement of MS spectrum, 706.3 (100%) corresponding to [(M−3)/3]⁻ of the dimer [in formula (1), m=1, n=2] that is the representative structure of the compound, and 529.5 corresponding to [(M−4)/4]⁻ were observed. In addition to the above, 823.7 corresponding to

[(M−3)/3]⁻ of a different dimer [in formula (1), m=2, n=2], and 617.5 corresponding to [(M−4)/4]⁻ were observed, and further, 836.5 corresponding to [(M−4)/4]⁻ of the trimer [in formula (1), m=2, n=3] was observed. The absorption spectrum in the aqueous solution of the compound was 531 nm.

Synthesis of Exemplary Compound 1-2

Into a three-necked flask having a capacity of 250 mL were put 60 g of chlorosulfonic acid and 6.2 g of phosphorus oxychloride, and after 9.54 g of Acid Red 289 (percentage content: 71%, manufactured by Chugai Seiyaku Kabushiki Kaisha) was carefully added thereto in installments with stirring, the reaction system was allowed to react at 70° C. for 1 hour. After the reaction solution was cooled to room temperature, the reaction solution was carefully poured into a 1 L beaker where 300 g of ice was stirred, and solids were precipitated. The precipitated solids were filtered out and washed with a saturated brine of 10° C. or lower, thus the wet cake of Compound A was obtained.

In a beaker having a capacity of 1 liter, the gross amount of the wet cake of Compound A was dispersed in 150 mL of ice water, 0.30 g of ethylenediamine was added thereto, and the dispersion was allowed to react at 50° C. for 3 hours while maintaining the pH of the reaction solution at 9 with a 2N sodium hydroxide aqueous solution. The reaction solution was cooled to room temperature. After removing insoluble matters through GF/F filter, the pH of the reaction solution was adjusted to 8.5 with dilute hydrochloric acid, and the solution was desalted with a dialysis tube until the time when the electric conductivity reached 10 μS or less. By concentration and solidification, 4.2 g of green lustrous crystal of Exemplary Compound 1-2 was obtained.

As a result of measurement of MS spectrum, 905.5 corresponding to [(M−2)/2]⁻ of the dimer [in formula (1), m=1, n=2] that is the representative structure of the compound, 603 (100%) corresponding to [(M−3)/3]⁻, and 452 corresponding to [(M−4)/4]⁻ were observed. The absorption spectrum in the aqueous solution of the compound was 530 nm.

Synthesis of Exemplary Compound 1-3

In the same manner as in the synthesis of Exemplary Compound 1-2 except for changing the ethylenediamine to 4.3 g of piperazine, 4.3 g of green lustrous crystal of Exemplary Compound 1-3 was obtained. As a result of measurement of MS spectrum, 918 corresponding to [(M−2)/2]⁻ of the dimer [in formula (1), m=1, n=2] that is the representative structure of the compound, 611 (100%) corresponding to [(M−3)/3]⁻, and 458 corresponding to [(M−4)/4]⁻ were observed. The absorption spectrum in the aqueous solution of the compound was 529 nm.

Synthesis of Exemplary Compound 1-4

In the same manner as in the synthesis of Exemplary Compound 1-2 except for changing the ethylenediamine to 0.57 g of 2,5-dimethylpiperazine, 4.1 g of green lustrous crystal of Exemplary Compound 1-4 was obtained. As a result of measurement of MS spectrum, 932 corresponding to [(M−2)/2]⁻ of the dimer [in formula (1), m=1, n=2] that is the representative structure of the compound, 621 (100%) corresponding to [(M−3)/3]⁻, and 465.5 corresponding to [(M−4)/4]⁻ were observed. The absorption spectrum in the aqueous solution of the compound was 529 nm.

Synthesis of Exemplary Compound 1-5

In the same manner as in the synthesis of Exemplary Compound 1-2 except for changing the ethylenediamine to 0.65 g of 1-(2-aminoethyl)piperazine, 4.4 g of green lustrous crystal of Exemplary Compound 1-5 was obtained. As a result of measurement of MS spectrum, 944.5 corresponding to [(M−2)/2]⁻ of the dimer [in formula (1), m=1, n=2] that is the representative structure of the compound, 629 (100%) corresponding to [(M−3)/3]⁻, and 471 corresponding to [(M−4)/4]⁻ were observed. The absorption spectrum in the aqueous solution of the compound was 529 nm.

Synthesis of Exemplary Compound 1-6

In the same manner as in the synthesis of Exemplary Compound 1-2 except for changing the ethylenediamine to 1.00 g of 1,4-bis(3-aminopropyl)piperazine), 4.9 g of green lustrous crystal of Exemplary Compound 1-6 was obtained. As a result of measurement of MS spectrum, 975.1 corresponding to [(M−2)/2]⁻ of the dimer [in formula (1), m=1, n=2]⁻ that is the representative structure of the compound, 649.7 (100%) corresponding to [(M−3)/3]⁻, 487.1 corresponding to [(M−4)/4]⁻, and 389.4 corresponding to [(M−5)/5]⁻ were observed. The absorption spectrum in the aqueous solution of the compound was 529 nm.

Synthesis of Exemplary Compound 1-7

In the same manner as in the synthesis of Exemplary Compound 1-2 except for changing the ethylenediamine to 0.57 g of 1,2-cyclohexanediamine, 4.0 g of green lustrous crystal of Exemplary Compound 1-7 was obtained. As a result of measurement of MS spectrum, 932.1 corresponding to [(M−2)/2]⁻ of the dimer [in formula (1), m=1, n=2] that is the representative structure of the compound, 621 (100%) corresponding to [(M−3)/3]⁻, 465.5 corresponding to [(M−4)/4]⁻, and 372.2 corresponding to [(M−5)/5]⁻ were observed. The absorption spectrum in the aqueous solution of the compound was 530 nm.

Synthesis of Exemplary Compound 1-8

In the same manner as in the synthesis of Exemplary Compound 1-2 except for changing the ethylenediamine to 0.57 g of 1,3-cyclohexanediamine, 4.1 g of green lustrous crystal of Exemplary Compound 1-8 was obtained. As a result of measurement of MS spectrum, 932.1 corresponding to [(M−2)/2]⁻ of the dimer [in formula (1), m=1, n=2] that is the representative structure of the compound, 621 (100%) corresponding to [(M−3)/3]⁻, 465.5 corresponding to [(M−4)/4]⁻, and 372.2 corresponding to [(M−5)/5]⁻ were observed. The absorption spectrum in the aqueous solution of the compound was 530 nm.

Synthesis of Exemplary Compound 1-9

In the same manner as in the synthesis of Exemplary Compound 1-2 except for changing the ethylenediamine to 0.57 g of 1,4-cyclohexanediamine, 4.1 g of green lustrous crystal of Exemplary Compound 1-9 was obtained. As a result of measurement of MS spectrum, 932.1 corresponding to [(M−2)/2]⁻ of the dimer [in formula (1), m=1, n=2] that is the representative structure of the compound, 621 corresponding to [(M−3)/3]⁻, 465.5 (100%) corresponding to [(M−4)/4]⁻, and 372.2 corresponding to [(M−5)/5]⁻ were observed. The absorption spectrum in the aqueous solution of the compound was 530 nm Synthesis of Exemplary Compound 1-10

In the same manner as in the synthesis of Exemplary Compound 1-2 except for changing the ethylenediamine to 0.54 g of m-phenylenediamine, 4.0 g of green lustrous crystal of Exemplary Compound 1-10 was obtained. As a result of measurement of MS spectrum, 929 corresponding to [(M−2)/2]⁻ of the dimer [in formula (1), m=1, n=2] that is the representative structure of the compound, 619 (100%) corresponding to [(M−3)/3]⁻, 464 corresponding to [(M−4)/4]⁻, and 371 corresponding to [(M−5)/5]⁻ were observed. The absorption spectrum in the aqueous solution of the compound was 530 nm.

Synthesis of Exemplary Compound 1-12
Synthesis of Intermediate B
Intermediate B

[Chem. 50]

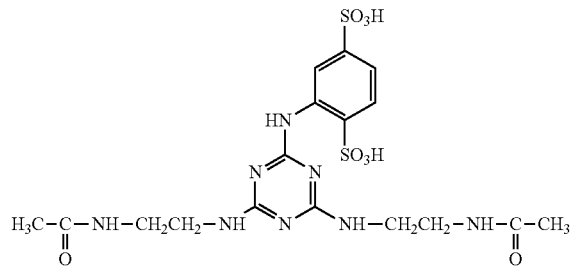

18.6 g, of cyanuric chloride, 100 g of ice water, and four drops of Calsolene oil were put in a 2 L beaker and stirred at the inner temperature of 5° C. or lower. N-acetylethylenediamine of 20.4 g was added thereto at one time. Stirring was performed at the inner temperature of 5° C. for 2 hours, at room temperature overnight, at the inner temperature of 30° C. for 1 hour, at the inner temperature of 40° C. for 1 hour, and at the inner temperature of 50° C. for 4 hours. The precipitated solids were filtered and the obtained white solids were dispersed in 500 mL of acetone, and stirred at room temperature for 15 minutes. The solids were filtered out and washed with 200 mL of acetone. The obtained white solids were dispersed in 800 mL of water at room temperature, and 28.9 g of 2,5-disulfoaniline monosodium salt was added thereto. The pH of the dispersion was then adjusted to 9 with a 2N sodium hydroxide aqueous solution. The inner temperature was raised to 80° C., and after reaction was performed for 2 hours, 250 g of sodium chloride was added and the temperature was lowered to room temperature. The pH was adjusted to 1 or less with concentrated hydrochloric acid, and the precipitated solids were filtered out. The obtained wet cake was dispersed in 500 mL of acetone, and the dispersion was stirred at room temperature for 15 minutes. The solids were filtered out, sufficiently washed with acetone, and the obtained crystal was vacuum dried at 40° C. to obtain 40.2 g of white solids. As a result of measurement of MS spectrum, 531 corresponding to [M−1]⁻ of Intermediate B was observed.

Synthesis of Intermediate C
Intermediate C

[Chem. 51]

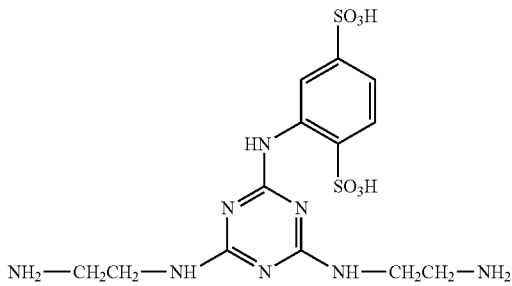

Into a three-necked flask having a capacity of 500 mL were put 25 g of Intermediate B, 180 mL of water and 20 mL of concentrated hydrochloric acid, and the mixture was reacted at 95° C. for 6 hours. The reaction solution was cooled to 50° C., 56 g of sodium chloride was added, and then the reaction solution was further cooled to room temperature. The precipitated solids were filtered out. The obtained solids were dispersed in 100 mL of water. The dispersion was dissolved while being neutralized with 2N sodium hydroxide, and 150 mL of acetone was dripped to the obtained solution. The precipitated crystal was filtered out, washed with 200 mL of acetone, and dried by air blow at 60° C., whereby 19 g of white crystal of Intermediate C was obtained. As a result of measurement of MS spectrum, 531 corresponding to [M−1]⁻ of Intermediate C was observed. Also, from the result of elemental analysis, the percentage content of the obtained crystal was estimated to be 82%.

Synthesis of Exemplary Compound 1-12

In the same manner as in the synthesis of Exemplary Compound 1-2 except for changing the ethylenediamine to 2.73 g of Intermediate C, 4.7 g of green lustrous crystal of Exemplary Compound 1-12 was obtained. As a result of measurement of MS spectrum, 732.4 corresponding to [(M−3)/3]⁻ of the dimer [in formula (1), m=1, n=2] that is the representative structure of the compound, 549 (100%) corresponding to [(M−4)/4]⁻, and 439 corresponding to [(M−5)/5]⁻ were observed. The absorption spectrum in the aqueous solution of the compound was 530 nm.

Synthesis of Exemplary Compound 1-13

Synthesis of Intermediate D

Intermediate D

[Chem. 52]

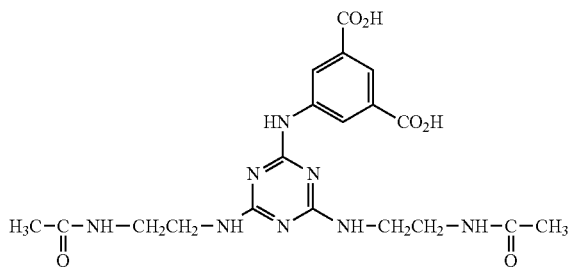

18.6 g of cyanuric chloride, 100 g of ice water, and four drops of Calsolene oil were put in a 2 L beaker and stirred at the inner temperature of 5° C. or lower. N-acetylethylenediamine of 20.4 g was added thereto at one time. Stirring was performed at the inner temperature of 5° C. for 2 hours, at room temperature overnight, at the inner temperature of 30° C. for 1 hour, at the inner temperature of 40° C. for 1 hour, and at the inner temperature of 50° C. for 4 hours. The precipitated solids were filtered and the obtained white solids were dispersed in 500 mL of acetone, and stirred at room temperature for 15 minutes. The solids were filtered out and washed with 200 mL of acetone. The obtained white solids were dispersed in 800 mL of water at room temperature, and 19 g 5-aminoisophthalic acid was added thereto. The pH of the dispersion was then adjusted to 9 with a 2N sodium hydroxide aqueous solution. The inner temperature was raised to 80° C., and after reaction was performed for 2 hours, the temperature was lowered to room temperature. The precipitated solids were filtered out and after sufficiently washed with water, the obtained wet cake was dispersed in 500 mL of acetone, and the dispersion was stirred at room temperature for 15 minutes. The solids were filtered out, sufficiently washed with acetone, and the obtained crystal was vacuum dried at 40° C. to obtain 28.6 g of white solids. As a result of measurement of MS spectrum, 461 corresponding to [M−1]$^+$ of Intermediate D was observed.

Synthesis of Intermediate E
Intermediate E

[Chem. 53]

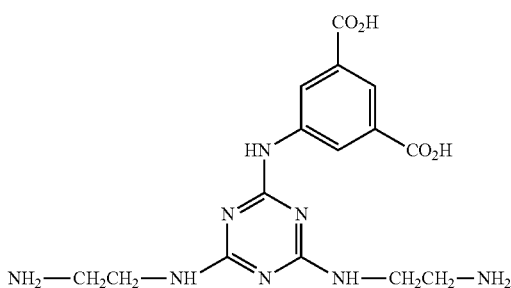

Into a three-necked flask having a capacity of 500 mL were put 25 g of Intermediate D, 180 mL of water and 20 mL of concentrated hydrochloric acid, and the mixture was reacted at 95° C. for 6 hours. The reaction solution was cooled to 50° C., 56 g of sodium chloride was added, and then the reaction solution was further cooled to room temperature. The precipitated solids were filtered out. The obtained solids were dispersed in 100 mL of water. The dispersion was dissolved while being neutralized with 2N sodium hydroxide, and 150 mL of acetone was dripped to the obtained solution. The precipitated crystal was filtered out, washed with 200 mL of acetone, and dried by air blow at 60° C., whereby 18 g of white crystal of Intermediate E was obtained. As a result of measurement of MS spectrum, 375 corresponding to [M−1]$^-$ of Intermediate E was observed. Also, from the result of elemental analysis, the percentage content of the obtained crystal was estimated to be 88%.

Synthesis of Exemplary Compound 1-13

In the same manner as in the synthesis of Exemplary Compound 1-2 except for changing the ethylenediamine to 2.13 g of Intermediate E (percentage content 88%), 4.5 g of green lustrous crystal of Exemplary Compound 1-13 was obtained. As a result of measurement of MS spectrum, 708.6 corresponding to [(M−3)/3]$^-$ of the dimer [in formula (1), m=1, n=2] that is the representative structure of the compound, 531.2 (100%) corresponding to [(M−4)/4]$^-$, and 424.8 corresponding to [(M−5)/5]$^-$ were observed. The absorption spectrum in the aqueous solution of the compound was 529 nm.

Synthesis of Exemplary Compound 1-15
Synthesis of Intermediate F

Intermediate F

[Chem. 54]

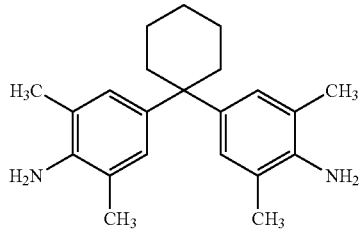

Into a three-necked flask having a capacity of 1 liter were put 122.4 g of 2,6-dimethylanline and 47.2 g of cyclohexanone. Concentrated hydrochloric acid of 120 mL was carefully added thereto and the reaction system was heated for 2 days under reflux. The reaction solution was cooled to room temperature, 500 mL of water was added, and then the pH was adjusted to 8 or more with a concentrated sodium hydroxide aqueous solution, extracted with dichloromethane, the organic layer was dried with sodium sulfate, concentrated with a rotary evaporator, and then concentrated hexane was added to precipitate solids, the solids were filtered out, the filtered solids were sufficiently washed with hexane, dried at 60° C., thus 77 g of peach white solids of Intermediate F were obtained. As a result of measurement of MS spectrum, 323 corresponding to [M+1]$^+$ of Intermediate F was observed.

Synthesis of Intermediate G

Intermediate G

[Chem. 55]

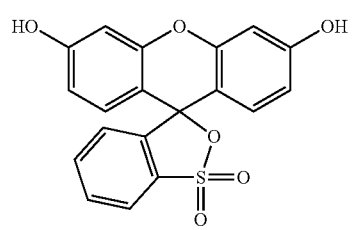

Into a three-necked flask having a capacity of 1 liter were put 100 g of 2-sulfobenzoic acid cyclic anhydride and 150 g of resorcinol, and carefully heated to 140° C. (Dissolution started at about 80° C. and completely dissolved at about 120° C. Calorification started around 140° C. and rose to the vicinity of 150° C.). By the reaction at 140° C. for about 30 minutes, the reaction solution solidified. Stirring was made possible by lowering the inner temperature to 100° C. and carefully dripping 600 mL of water. This reaction solution was poured into a differently prepared 2 L beaker in which 1,000 mL of hot water was stiffed, and the precipitated crystal was filtered out. The crystal was sufficiently washed with 5,000 mL of hot water, dried at 60° C. by a vacuum dryer, thus 119 g of brown crystal of Intermediate G was obtained. As a result of measurement of MS spectrum, 368 corresponding to [M+1]$^+$ of Intermediate G was observed.

Synthesis of Intermediate H

Intermediate H

[Chem. 56]

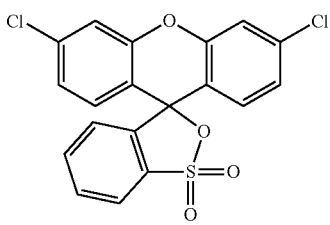

Into a three-necked flask having a capacity of 1 liter were put 119 g of Intermediate G, and 250 g of phosphorus oxychloride, the temperature was raised to 90° C., and the system was allowed to react for 2 hours. The reaction solution was cooled to room temperature, and a great amount of water was poured thereto. The precipitated crystal was filtered out and sufficiently washed with water. The obtained brown crystal was stirred in 2,500 ml of dichlormethane, insoluble matters were filtered out, the filtrate was dried with sodium sulfate anhydride, and concentrated and solidified with a rotary evaporator, whereby 53.4 g of yellow powder of Intermediate H was obtained. As a result of measurement of MS spectrum, 406 corresponding to [M+1]⁺ of Intermediate H was observed.

Synthesis of Intermediate I

Intermediate I

[Chem. 57]

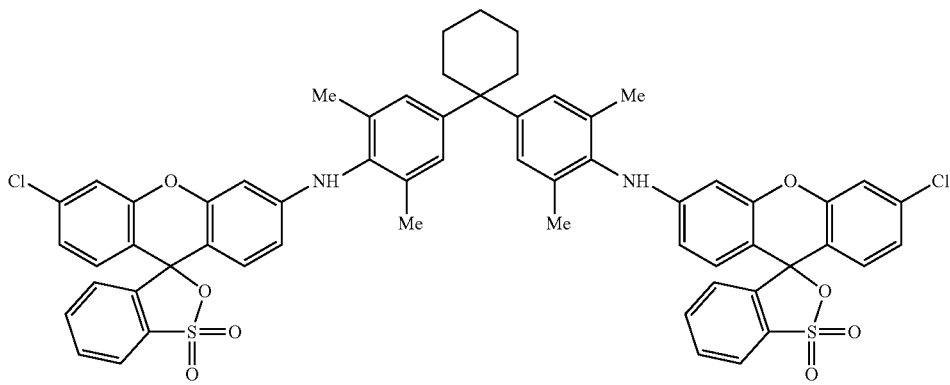

Into a three-necked flask having a capacity of 250 mL were put 20.25 g of Intermediate H and 80 mL of sulfolane, and stirred at room temperature. Aluminum chloride of 27 g was carefully added thereto (the inner temperature rose to about 60° C.). To the flask in which stirring was continued at the inner temperature of 60° C., 8.06 g of Intermediate F was added and 10.6 g of triethylamine was dripped in order, after that reaction was carried out for 2 hours at the inner temperature of 90° C. The reaction solution was cooled to room temperature, and 1 liter of water was poured thereto. Subsequently, the precipitated crystal was filtered out and washed with water sufficiently, and dried by air blow at 60° C., thus 25.7 g of orange Intermediate I was obtained. As a result of measurement of MS spectrum, 1059 corresponding to [M+1]⁺ of Intermediate I was observed.

Synthesis of Intermediate J

Intermediate J

[Chem. 58]

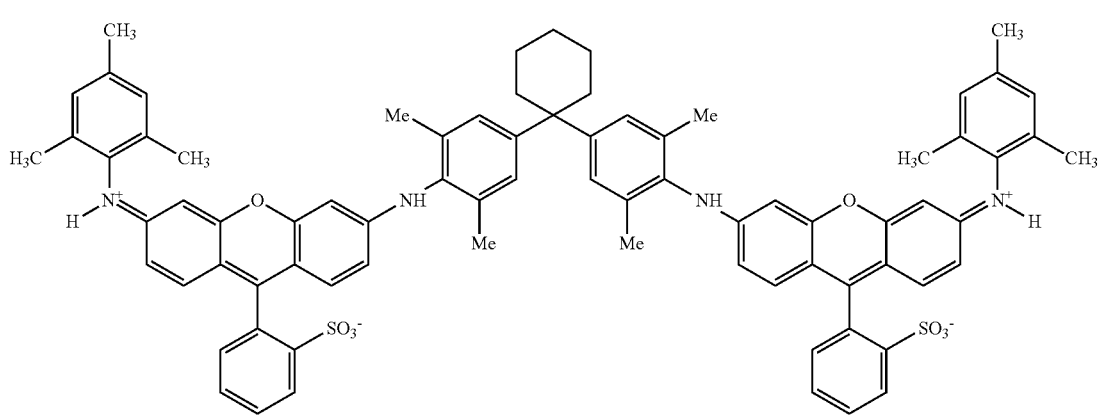

Into a three-necked flask having a capacity of 250 mL were put 11.4 g of 2,4,6-trimethylaniline, 19.4 g of Intermediate I, 4.1 g of zinc chloride and 80 mL of sulfolane, and the mixture was reacted at 200° C. for 3 hours. The reaction solution was cooled to room temperature, and 150 mL of ethyl acetate was added thereto. This reaction solution was poured into a differently prepared beaker in which 300 mL of ethyl acetate was stirred, and the precipitated crystal was filtered out. The crystal was sufficiently washed with ethyl acetate, water, further acetone in order. The obtained crystal was dispersed in 500 mL of dichloromethane, the crystal was filtered out, and further, the obtained crystal was dispersed in 500 mL of methanol, the crystal was filtered out, and dried by air blow at 60° C. to obtain 16.2 g of Intermediate J of reddish purple powder. As a result of measurement of MS spectrum, 1251 corresponding to [M−1]⁻ and 625 corresponding to [(M−2)/2]⁻ of Intermediate J were observed.

Synthesis of Exemplary Compound 1-15

Into a three-necked flask having a capacity of 250 mL were put 60 g of chlorosulfonic acid and 6.2 g of phosphorus oxychloride, and 12.5 g of Intermediate J was added thereto in installments. After raising the inner temperature to 70° C. and performing reaction for 1 hour, the reaction solution was cooled to room temperature. The reaction solution was poured into 300 g of ice water, and the precipitated crystal was filtered out and washed with saturated brine. The obtained crystal was dispersed in 300 mL of water, and reacted at the inner temperature of 50° C. for 6 hours while adjusting and maintaining the pH at 9.0 with 2N sodium hydroxide. The insoluble matters were filtered and removed from the reaction system, and the pH was adjusted to 8.5 with a dilute hydrochloric acid, and desalted with a dialysis tube until the time when the electric conductivity reached 10 μS or less. By concentration and solidification, 8.9 g of Exemplary Compound 1-15 was obtained. As a result of measurement of MS spectrum, 867.1 corresponding to [(M−2)/2]⁻, 577.7 corresponding to of [(M−3)/3]⁻, and 433.1 corresponding to [(M−4)/4]⁻ of Exemplary Compound 1-15 were observed. The absorption spectrum in the aqueous solution of the compound was 529 nm.

EXAMPLES

After adding deionized water to the following components to make 100 g, the components were stirred for 1 hour with heating at 30° C. to 40° C. After that, the pH was adjusted to 9 with 10 mol/liter of KOH and the composition was filtered through a micro-filter having an average pore diameter of 0.25 μm under reduced pressure to prepare Ink Solution A for magenta.
Composition of Ink Solution A:
Colorant of the invention (Exemplary Compound 1) 3.5 g
Diethylene glycol 10.65 g
Glycerin 14.70 g
Diethylene glycol monobutyl ether 12.70 g
Triethanolamine 0.65 g
OLFIN E1010 (manufactured by Nisshin Chemical Industry Co., Ltd.) 0.9 g
Ink Solutions B to D, J to W, and comparative Ink Solutions E to I were prepared in the same manner as in the preparation of Ink Solution A except for changing the colorant as shown in Table 4 below.

TABLE 4

|  | Sample No. | Colorant | Ozone Resistance | Light Fastness | Moisture Resistance | Density of Print |
|---|---|---|---|---|---|---|
| Example 1 | Ink Solution A | Exemplary Compound 1 | A | A | A | A |
| Example 2 | Ink Solution B | Exemplary Compound 2 | A | A | A | A |
| Example 3 | Ink Solution C | Exemplary Compound 4 | A | A | A | A |
| Example 4 | Ink Solution D | Exemplary Compound 6 | A | A | B | A |
| Comparative Example 1 | Ink Solution E | Comparative Compound 1 | B | B | C | A |
| Comparative Example 2 | Ink Solution F | Comparative Compound 2 | C | C | B | B |
| Comparative Example 3 | Ink Solution G | Comparative Compound 3 | C | C | B | B |
| Comparative Example 4 | Ink Solution H | Comparative Compound 4 | C | C | A | A |
| Comparative Example 5 | Ink Solution I | Comparative Compound 5 | A | A | A | C |

TABLE 5

|  | Sample No. | Colorant | Ozone Resistance | Light Fastness | Moisture Resistance | Density of Print |
|---|---|---|---|---|---|---|
| Example 5 | Ink Solution J | Exemplary Compound 1-1 | S | A | A | A |
| Example 6 | Ink Solution K | Exemplary Compound 1-2 | S | A | A | A |
| Example 7 | Ink Solution L | Exemplary Compound 1-3 | S | A | A | A |
| Example 8 | Ink Solution M | Exemplary Compound 1-4 | S | A | A | A |

TABLE 5-continued

| Sample No. | Colorant | Ozone Resistance | Light Fastness | Moisture Resistance | Density of Print |
|---|---|---|---|---|---|
| Example 9 | Ink Solution N | Exemplary Compound 1-5 | S | A | A | A |
| Example 10 | Ink Solution O | Exemplary Compound 1-6 | S | A | A | A |
| Example 11 | Ink Solution P | Exemplary Compound 1-7 | S | A | A | A |
| Example 12 | Ink Solution Q | Exemplary Compound 1-8 | S | A | A | A |
| Example 13 | Ink Solution R | Exemplary Compound 1-9 | S | A | A | A |
| Example 14 | Ink Solution S | Exemplary Compound 1-10 | S | A | A | A |
| Example 15 | Ink Solution T | Exemplary Compound 1-11 | S | A | A | A |
| Example 16 | Ink Solution U | Exemplary Compound 1-12 | S | A | A | A |
| Example 17 | Ink Solution V | Exemplary Compound 1-15 | S | A | A | A |
| Example 18 | Ink Solution W | Exemplary Compound 1-17 | S | A | A | A |

[Chem. 59]

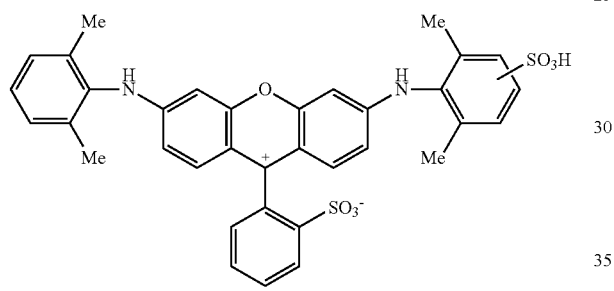

Comparative Compound 1 (C.I. Acid Red 289)

Comparative Compound 2 (Exemplary Compound D-28 in JP-A-9-157562)

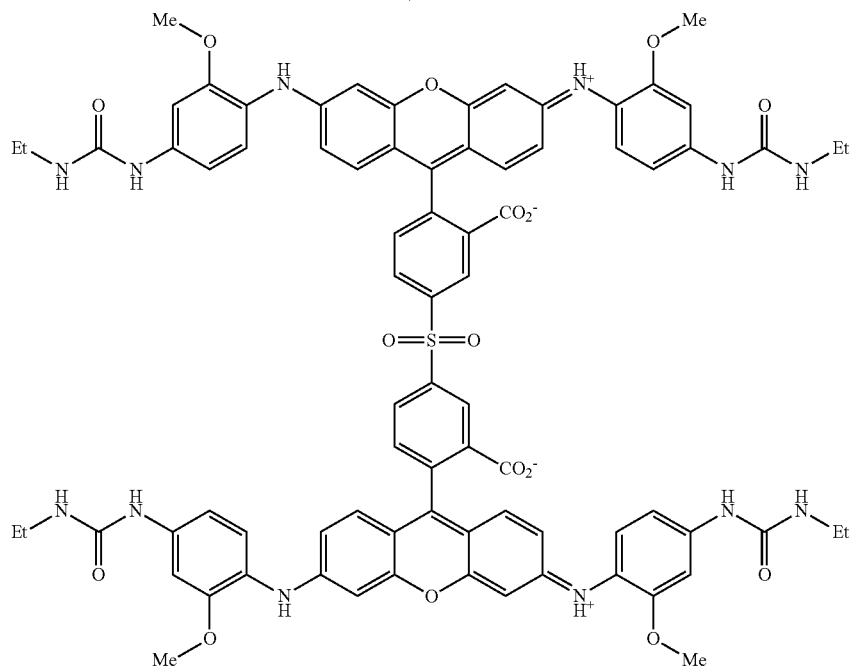

Comparative Compound 3 (Exemplary Compound D-40 in JP-A-9-157562)

[Chem. 60]

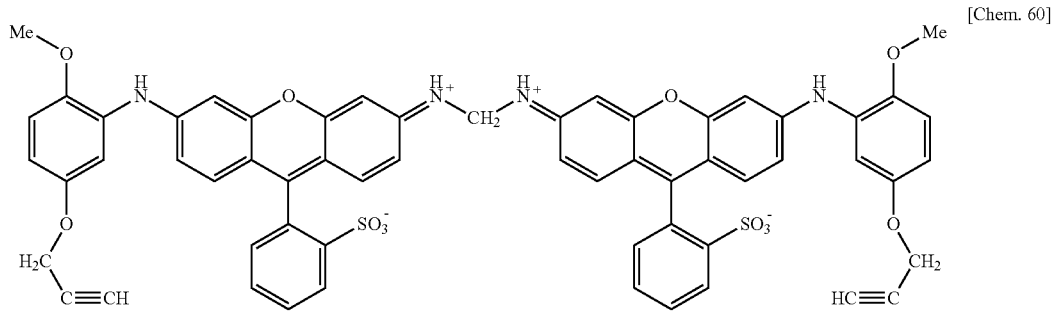

Comparative Compound 4

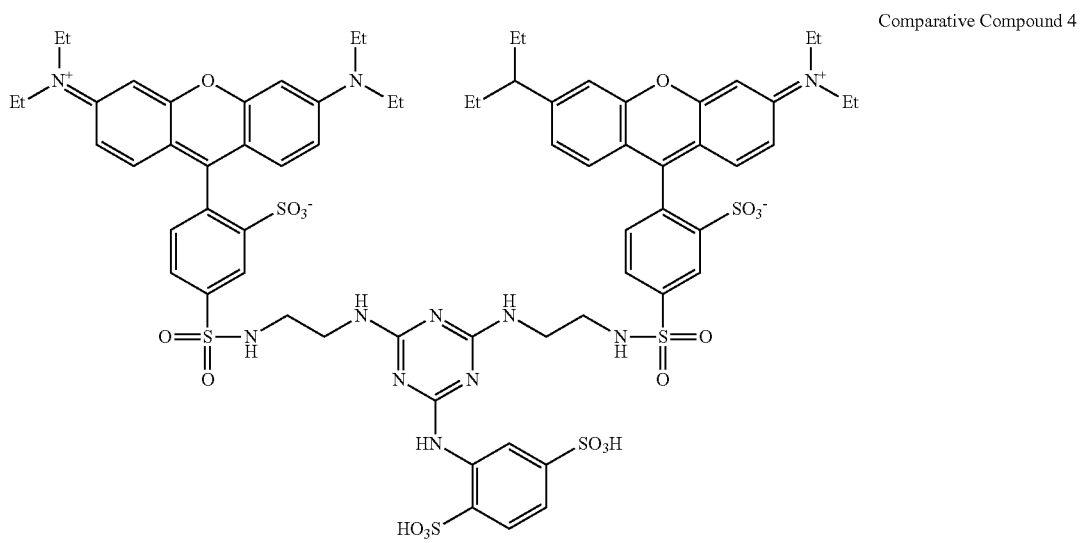

Comparative Compound 5

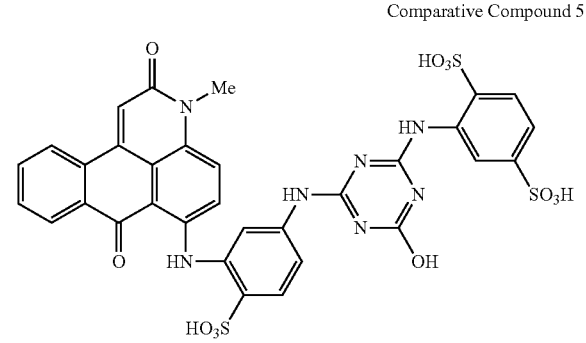 [SMILES: Cn1c(=O)cc2c3c(c(Nc4cc(Nc5nc(O)nc(Nc6cc(S(=O)(=O)O)ccc6S(=O)(=O)O)n5)ccc4S(=O)(=O)O)ccc31)C(=O)c1ccccc1-2]

(Image Recording and Evaluation)

The above inks for inkjet recording in the Examples (Inks A to D, J to W) and Comparative Examples (Inks E to I) were evaluated as follows. The results obtained are shown in Table 4.

In Table 4, every evaluation item was evaluated after recording an image on photo gloss paper (PM Photo Paper <Glossy> (KA420PSK, EPSON), manufactured by EPSON Co., Ltd.) with each ink for inkjet recording and an inkjet printer (PM-700C, manufactured by EPSON Co., Ltd.).

<Ozone Resistance>

The photo gloss paper having formed thereon an image was left to stand for 5 days in a box set to ozone gas concentration of 0.5±0.1 ppm, room temperature, and a dark place, and a Siemens type ozonizer was used to which an ac voltage of 5 kV was applied while passing dry air through the double glass tube. The image density before and after leaving in the ozone gas atmosphere was measured with a reflection densitometer (X-Rite 310TR) and evaluated as the residual rate of colorant. The reflection density was measured at three points of 1, 1.5 and 2.0. The ozone gas concentration in the box was set using an ozone gas monitor (Model OZG-EM-01, manufactured by APPLICS).

Evaluation was performed in three stages, that is, in any density, the case showing the residual rate of the colorant of 85% or more is graded S, the case of 70% or more and less than 85% is graded A, the case where 1 or 2 points are less than 70% is graded B, and the case where all the densities are less than 70% is graded C. The results of evaluation are shown in Table 4 above.

<Light Fastness>

After measuring image density Ci just after recording, the image was irradiated with xenon light (85,000 lux) for seven days with a weather-meter (Atlas C.165), and after that image density Cf was measured again, and the residual rate of colorant {[(Ci−Cf)/Ci]×100 (%)} was computed from the difference in image density before and after xenon light irradiation. The image density was measured with a reflection densitometer (X-Rite 310TR).

The residual rate of colorant was measured at 3 points of 1, 1.5 and 2 of reflection density. The results of evaluation are shown in Table 4 above.

Evaluation was performed in three stages, that is, in any density, the case showing the residual rate of the colorant of 80% or more is graded A, the case where 1 or 2 points are less than 80% is graded B, and the case where all the densities are less than 80% is graded C.

<Moisture Resistance>

In inkjet recording, a checker pattern (a pattern of combining squares of 1.5 mm square having density of 100% and 0% alternately) was formed and a printed matter of checkers of magenta-white having high contrast was obtained. A printed matter having been subjected to drying for 24 hours after printing was left to stand for three days on condition of 80° C., 70% RH, and the degree of blotting from the colored part to the white part was visually evaluated. The case of exhibiting almost no blot is graded A, the case of blotting a little is graded B, and the case of definitely blotting is graded C. The results of evaluation are shown in Table 4 above.

<Density of Print>

The print density at print density of 100% was measured with a reflection densitometer (X-Rite 310TR). The case of print density of 2.2 or more is graded A, the case of 2.0 or more and less than 2.2 is graded B, and the case of less than 2.0 is graded C, in three stage evaluation. The results of evaluation are shown in Table 4 above.

As is apparent from the results in Table 4, in the inks in the Examples using the dyes of the invention, performances of ozone resistance, moisture resistance and print density are in a triangular position and they have extremely high performances as compared with comparative examples.

Example 2

Manufacture and Evaluation of Color Toner

<Manufacture of Color Toner>

Three part by mass of the colorant of the invention (Exemplary compound (I), m=1, n=2), and 100 parts by mass of the resin for toner [styrene-acrylic acid ester copolymer, HIMER TB-1000F (trade name, manufactured by Sanyo Chemical Industries, Ltd.)] were mixed and crushed in a ball mill, and then melt-mixed by heating at 150° C., and then pulverized with a pulverized by an air-jet system. Particles of 1 μm to 20 μm were selected by further classification, to make a toner.

<Evaluation>

Carrier iron powder (900 parts by mass) (EFV250/400, trade name, manufactured by Nippon Teppun Co., Ltd.) was uniformly mixed with 10 parts by mass of the above toner to make a developer. As a result of copying by using the above developer and a dry type electronic plain paper copier (NP-5000, trade name, manufactured by Canon Inc.), it was found that the toner had excellent spectral characteristics and showed excellent properties as toner.

Example 3

Manufacture and Evaluation of Color Filter

<Manufacture of Color Filter>
(Preparation of Positive Resist Composition)

A positive resist composition was prepared by mixing 3.4 parts by mass of a cresol novolak resin obtained from m-cresol/p-cresol/formaldehyde mixture (reaction molar ratio: 5/5/7.5) (polystyrene equivalent mass average molecular weight of 4,300), 1.8 parts by mass of o-naphthoquinonediazido-5-sulfonic ester (having two esterified hydroxyl groups on average) manufactured from the phenol compound having the following formula, 0.8 parts by mass of hexamethoxymethylolated melamine, 20 parts by mass of ethyl lactate, and 1 part by mass of Exemplary Compound (1) (m=1, n=2).

[Chem. 61]

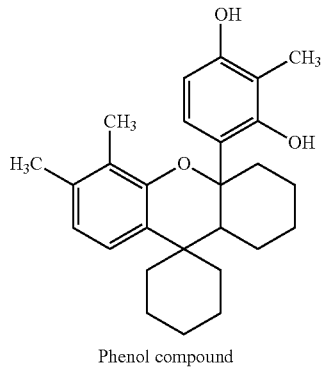

Phenol compound (Manufacture of Color Filter)

After the obtained positive resist composition was spin coated on a silicon wafer, the solvent was evaporated. In the next place, the silicon wafer was subjected to exposure through a mask to decompose the diazide compound. Subsequently, the wafer was heated at 100° C., and the exposed part was removed by alkali development, and a positive colored pattern having resolution of 0.8 μm was obtained. After entire exposure, the wafer was heated at 150° C. for 15 minutes, whereby a color filter of complementary color of magenta was obtained. Exposure was performed by i-ray exposure stepper HITACHI LD-5010-i (trade name, NA=0.40, manufactured by Hitachi, Ltd.). As the developer, SOPD or SOPD-B (trade names, manufactured by Sumitomo Chemical Co., Ltd.) was used.

The obtained color filter exhibited good color purity and high transparency, and had good performances.

INDUSTRIAL APPLICABILITY

The novel compound, coloring composition, ink for inkjet recording, and inkjet recording method of the invention contribute to improve performances concerning image fastness such as ozone resistance and light fastness the more.

Further, the color filter and the color toner of the invention can contain the novel compound.

While the invention has been described in detail with reference to specific embodiments thereof, it will be apparent to one skilled in the art that various changes and modifications can be made therein without departing from the spirit and scope thereof.

The present application is related to Japanese patent application filed on Aug. 30, 2011 (Japanese Patent Application No. 2011-188044) and Japanese patent application filed on Mar. 1, 2012 (Japanese Patent Application No. 2012-045832), and the disclosures of which are incorporated herein for reference.

The invention claimed is:

1. A coloring composition containing a compound represented by formula (1):

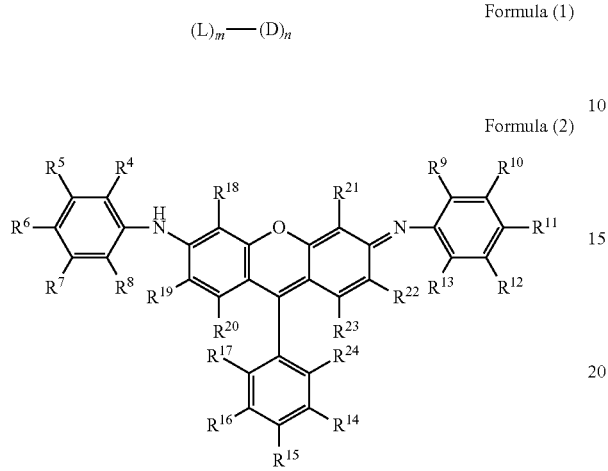

Formula (1)

Formula (2)

in formula (1),

L represents a divalent to tetravalent linking group;

D represents a residue obtained by removing 1 to 5 hydrogen atoms from a compound represented by formula (2);

m represents an integer of 1 to 10, provided that each of a plurality of L's may be the same with or different from every other L;

n represents an integer of 2 to 10, provided that each of a plurality of D's may be the same with or different from every other D;

and in formula (2), each of $R^4$ to $R^{24}$ independently represents a hydrogen atom or a substituent, provided that formula (2) has at least one or more ionic hydrophilic groups.

2. The coloring composition as claimed in claim 1, wherein each of $R^4$, $R^8$, $R^9$ and $R^{13}$ in formula (2) independently represents a hydrogen atom or an alkyl group.

3. The coloring composition as claimed in claim 1, wherein $R^5$ to $R^7$, $R^{10}$ to $R^{12}$, and $R^{14}$ to $R^{23}$ in formula (2) represent a hydrogen atom.

4. The coloring composition as claimed in claim 3, wherein D in formula (1) represents a residue obtained by removing one hydrogen atom from the hydrogen atoms represented by $R^5$ to $R^7$, $R^{10}$ to $R^{12}$, $R^{19}$, $R^{22}$ and $R^{24}$ of the compound represented by formula (2).

5. The coloring composition as claimed in claim 1, wherein the compound represented by formula (1) is a compound synthesized by:

a process of chlorosulfonylating a compound represented by formula (3), a process of reacting the chlorosulfonylated compound with a diamine compound represented by formula (4), and a process of hydrolyzing the residual chlorosulfonyl group:

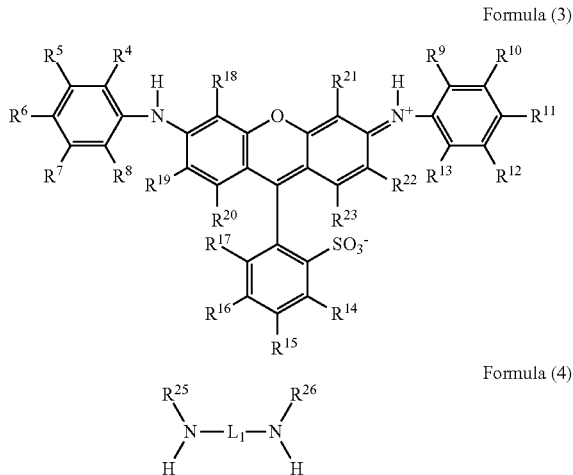

Formula (3)

Formula (4)

in formula (3), each of $R^4$ to $R^{23}$ independently represents a hydrogen atom or a substituent; and in formula (4), each or $R^{25}$ and $R^{26}$ independently represents a hydrogen atom or a substituent, and $L_1$ represents a divalent linking group.

6. An ink for inkjet recording, containing the coloring composition as claimed in claim 1.

7. An inkjet recording method by using the coloring composition as claimed in claim 1 to form an image.

8. A color filter containing the compound represented by formula (1) as claimed in claim 1.

9. A color toner containing the compound represented by formula (1) as claimed in claim 1.

10. A compound represented by formula (1):

Formula (1)

Formula (2)

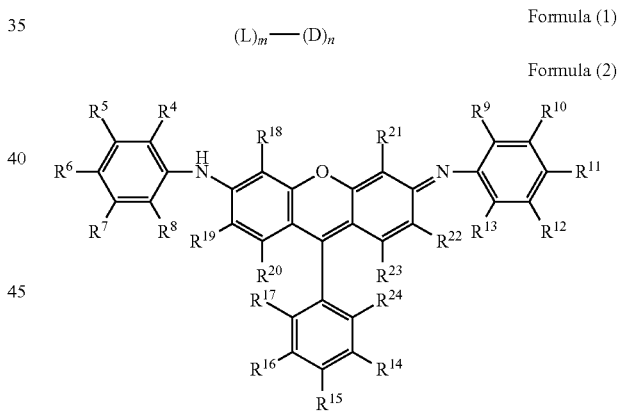

in formula (1),

L represents a divalent to tetravalent linking group;

D represents a residue obtained by removing 1 to 5 hydrogen atoms from a compound represented by formula (2);

m represents an integer of 1 to 10, provided that each of a plurality of L's may be the same with or different from every other L;

n represents an integer of 2 to 10, provided that each of a plurality of D's may be the same with or different from every other D;

and in formula (2), each of $R^4$ to $R^{24}$ independently represents a hydrogen atom or a substituent, provided that formula (2) has at least one or more ionic hydrophilic groups.

* * * * *